(12) United States Patent
Okamoto et al.

(10) Patent No.: US 7,307,655 B1
(45) Date of Patent: Dec. 11, 2007

(54) METHOD AND APPARATUS FOR DISPLAYING A SYNTHESIZED IMAGE VIEWED FROM A VIRTUAL POINT OF VIEW

(75) Inventors: Shusaku Okamoto, Hirakata (JP); Masamichi Nakagawa, Hirakata (JP); Kunio Nobori, Kadoma (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,787

(22) PCT Filed: Jul. 29, 1999

(86) PCT No.: PCT/JP99/04061

§ 371 (c)(1),
(2), (4) Date: Jan. 30, 2001

(87) PCT Pub. No.: WO00/07373

PCT Pub. Date: Feb. 10, 2000

(30) Foreign Application Priority Data

| | | | |
|---|---|---|---|
| Jul. 31, 1998 | (JP) | | 10/217261 |
| Oct. 8, 1998 | (JP) | | 10/286233 |
| Nov. 9, 1998 | (JP) | | 10/317393 |
| Nov. 9, 1998 | (JP) | | 10/317407 |
| Nov. 16, 1998 | (JP) | | 10/324701 |

(51) Int. Cl.
*H04N 5/228* (2006.01)

(52) U.S. Cl. ............... 348/222.1; 348/373; 348/333.01

(58) Field of Classification Search ........... 348/207.99, 348/216, 148, 149, 113, 116, 42–50, 51, 139–141, 348/373, 333.06, 118; 340/929, 903; 358/88, 358/229, 3, 209; 352/57; 382/106, 154; 356/3, 3.14, 12

See application file for complete search history.

(56) References Cited

U.S. PATENT DOCUMENTS 4,926,346 A * 5/1990 Yokoyama .................... 701/28
5,410,346 A * 4/1995 Saneyoshi et al. .......... 348/116

(Continued)

FOREIGN PATENT DOCUMENTS

EP 0 841 648 A2 5/1998

(Continued)

OTHER PUBLICATIONS

International Search Report corresponding to application No. PCT/JP99/04061 dated Oct. 26, 1999.

(Continued)

*Primary Examiner*—Lin Ye
*Assistant Examiner*—Gevell Selby
(74) *Attorney, Agent, or Firm*—RatnerPrestia

(57) ABSTRACT

An image generating apparatus comprising: a camera or a plurality of cameras; space reconstructing means for mapping the input image from said camera, into a predetermined space model of a predetermined three-dimensional space; point-of-view converting means of synthesizing an image viewed from an arbitrary virtual point of view in said predetermined three-dimensional space by referencing to said space data mapped by said space reconstructing means; and displaying means of displaying the image converted by said point-of-view converting means.

61 Claims, 67 Drawing Sheets

U.S. PATENT DOCUMENTS

| | | | | |
|---|---|---|---|---|
| 5,424,952 | A | * 6/1995 | Asayama | 348/113 |
| 5,473,364 | A | * 12/1995 | Burt | 348/47 |
| 5,517,412 | A | * 5/1996 | Unoura | 348/118 |
| 5,530,420 | A | * 6/1996 | Tsuchiya et al. | 348/116 |
| 5,535,144 | A | * 7/1996 | Kise | 348/118 |
| 5,587,938 | A | 12/1996 | Hoetzel | |
| 5,638,116 | A | * 6/1997 | Shimoura et al. | 348/118 |
| 5,647,019 | A | 7/1997 | Iino et al. | |
| 5,692,061 | A | 11/1997 | Sasada et al. | |
| 5,915,033 | A | * 6/1999 | Tanigawa et al. | 348/349 |
| 5,929,784 | A | * 7/1999 | Kawaziri et al. | 340/903 |
| 5,994,701 | A | * 11/1999 | Tsuchimoto et al. | 250/351 |
| 6,169,572 | B1 | * 1/2001 | Sogawa | 348/116 |
| 6,396,535 | B1 | * 5/2002 | Waters | 348/159 |

FOREIGN PATENT DOCUMENTS

| | | |
|---|---|---|
| JP | 3-166534 | 7/1991 |
| JP | 09-114979 | * 2/1997 |
| JP | 9-114979 | 5/1997 |
| JP | 9-305796 | 11/1997 |
| JP | 10-40499 | 2/1998 |
| JP | 10-124704 | 5/1998 |
| JP | 10 244891 A | 9/1998 |
| JP | 10 264841 A | 10/1998 |

OTHER PUBLICATIONS

English translation of Form PCT/ISA/210.

European Search Report corresponding to application EP 99 97 0064, dated Aug. 18, 2005.

European Search Report corresponding to application No. EP 99-93-3145 dated Jan. 31, 2005.

* cited by examiner

Fig. 9

| Camera number | X axis | Y axis | Z axis | Angle α (deg) | Angle β (deg) | Focal length | Distortion κ1 | Distortion κ2 |
|---|---|---|---|---|---|---|---|---|
| Camera 1 | x1 | y1 | 0 | 45 | -30 | f1 | 0 | 0 |
| Camera 2 | -x1 | y1 | 0 | -45 | -30 | f2 | 0 | 0 |
| Camera 3 | -x1 | y1 | z1 | -90 | -30 | f3 | 0 | 0 |
| Camera 4 | -x1 | y1 | z1 | -135 | -30 | f4 | 0 | 0 |
| Camera 5 | x1 | y1 | z2 | 135 | -30 | f5 | 0 | 0 |
| Camera 6 | x1 | y1 | z2 | 90 | -30 | f6 | 0 | 0 |
| Virtual camera | 0 | y1 | 0 | 0 | -20 | f | 0 | 0 |

Fig. 10

| Temperature range (°C) | Focal length correction value | Distortion κ1 correction value | Distortion κ2 correction value |
|---|---|---|---|
| 0 deg or lower | df1 | κ11 | κ21 |
| 40 degs or higher | df2 | κ12 | κ22 |

Fig. 11

| Camera number | X axis | Y axis | Z axis | Angle α (deg) | Angle β (deg) | Focal length | Distortion κ1 | Distortion κ2 |
|---|---|---|---|---|---|---|---|---|
| Camera 1 | x1 | y1 | 0 | 45 | -30 | f1+df1 | κ12 | κ22 |
| Camera 2 | -x1 | y1 | 0 | -45 | -30 | f2+df1 | κ12 | κ22 |
| Camera 3 | -x1 | y1 | z1 | -90 | -30 | f3 | 0 | 0 |
| Camera 4 | -x1 | y1 | z1 | -135 | -30 | f4 | 0 | 0 |
| Camera 5 | x1 | y1 | z2 | 135 | -30 | f5 | 0 | 0 |
| Camera 6 | x1 | y1 | z2 | 90 | -30 | f6 | 0 | 0 |

Fig. 12

| Data number | X axis | Y axis | Z axis | Camera number | U axis | V axis | R | G | B | Time |
|---|---|---|---|---|---|---|---|---|---|---|
| .. | .. | .. | .. | .. | .. | .. | .. | .. | .. | .. |
| A | x3 | 0 | z2 | Camera 1 | u1 | v1 | 80 | 80 | 80 | t1 |
| .. | .. | .. | .. | .. | .. | .. | .. | .. | .. | .. |
| B | x2 | 0 | z2 | Camera 1 | u2 | v2 | 110 | 110 | 110 | t1 |
| .. | .. | .. | .. | .. | .. | .. | .. | .. | .. | .. |
| C1 | 0 | 0 | z2 | Camera 1 | u3 | v3 | 140 | 140 | 140 | t1 |
| C2 | 0 | 0 | z2 | Camera 2 | u4 | v4 | 150 | 150 | 150 | t1 |
| .. | .. | .. | .. | .. | .. | .. | .. | .. | .. | .. |
| D | -x2 | 0 | z2 | Camera 2 | u5 | v5 | 120 | 120 | 120 | t1 |
| .. | .. | .. | .. | .. | .. | .. | .. | .. | .. | .. |
| E | -x3 | 0 | z2 | Camera 2 | u6 | v6 | 90 | 90 | 90 | t1 |
| .. | .. | .. | .. | .. | .. | .. | .. | .. | .. | .. |

Virtual point of view 2 (for rearview)

Actual camera

Illustration of vehicle in question is pasted by proper conversion in order to easily grasp positional relation to surroundings Fig. 21 (b)
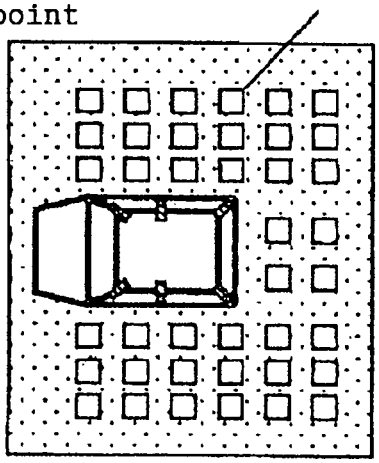
Example of characteristic point
Fig. 21 (a)
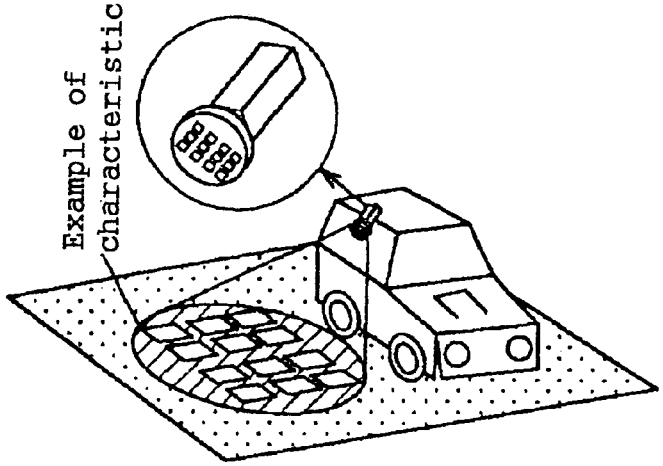
Example of characteristic point
Fig. 21 (c) Example of characteristic point
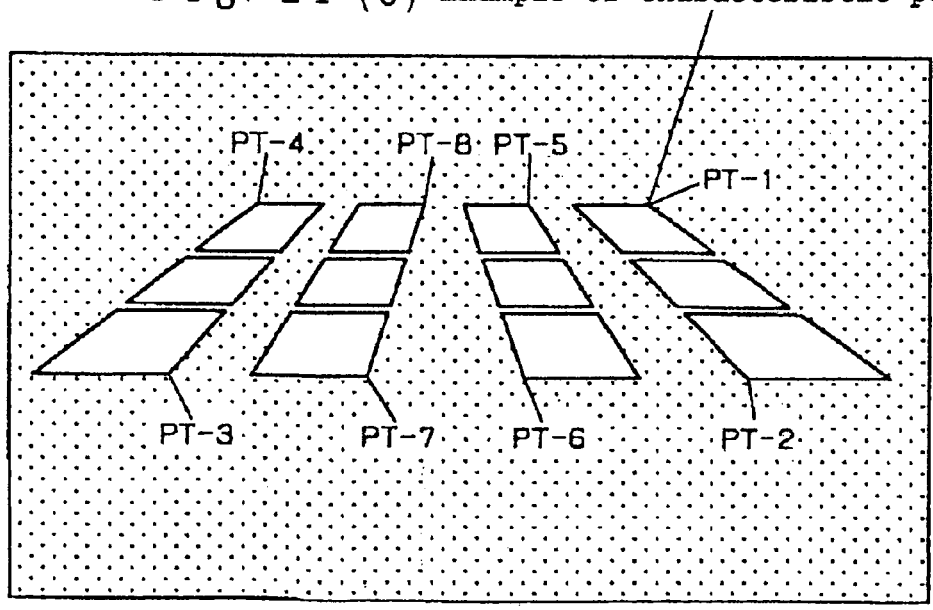

Fig. 45

| Camera number | X axis | Y axis | Z axis | Angle α (deg) | Angle β (deg) | Angle γ (deg) | Focal length | Distortion κ1 | Distortion κ2 |
|---|---|---|---|---|---|---|---|---|---|
| Camera 1 | 0 | y1 | 0 | 0 | -30 | 0 | f1 | 0 | 0 |
| Camera 2 | x1 | y2 | z1 | -45 | -10 | 0 | f1 | 0 | 0 |
| Camera 3 | -x1 | y2 | z1 | 45 | -10 | 0 | f1 | 0 | 0 |

Fig. 46

| | X axis | Y axis | Z axis | Angle α (deg) | Angle β (deg) | Angle γ (deg) | Focal length | Distortion κ1 | Distortion κ2 |
|---|---|---|---|---|---|---|---|---|---|
| Virtual point of view | 0 | 0 | z2 | 0 | -90 | 0 | f2 | 0 | 0 |

Fig. 50

| (1,10,10) | (1,12,12) | | ... | | (3,50,80) |
|---|---|---|---|---|---|
| (1,11,11) | (1,12,13) | | ... | | (3,49,82) |
| (1,12,12) | (1,12,14) | | ... | | (3,48,84) |
| | | | | | |
| . | . | | | | . |
| . | . | | | | . |
| . | . | | | | . |
| . | . | | | | . |
| . | . | | | | . |
| . | . | | | | . |
| | | | | | |
| (2,0,100) | (2,2,102) | | ... | | (3,0,192) |

Part of car-carried camera Synthesize image during camera correction process (before camera parameter correction)

Part of car-carried camera Synthesize image during camera correction process (after camera parameter correction)

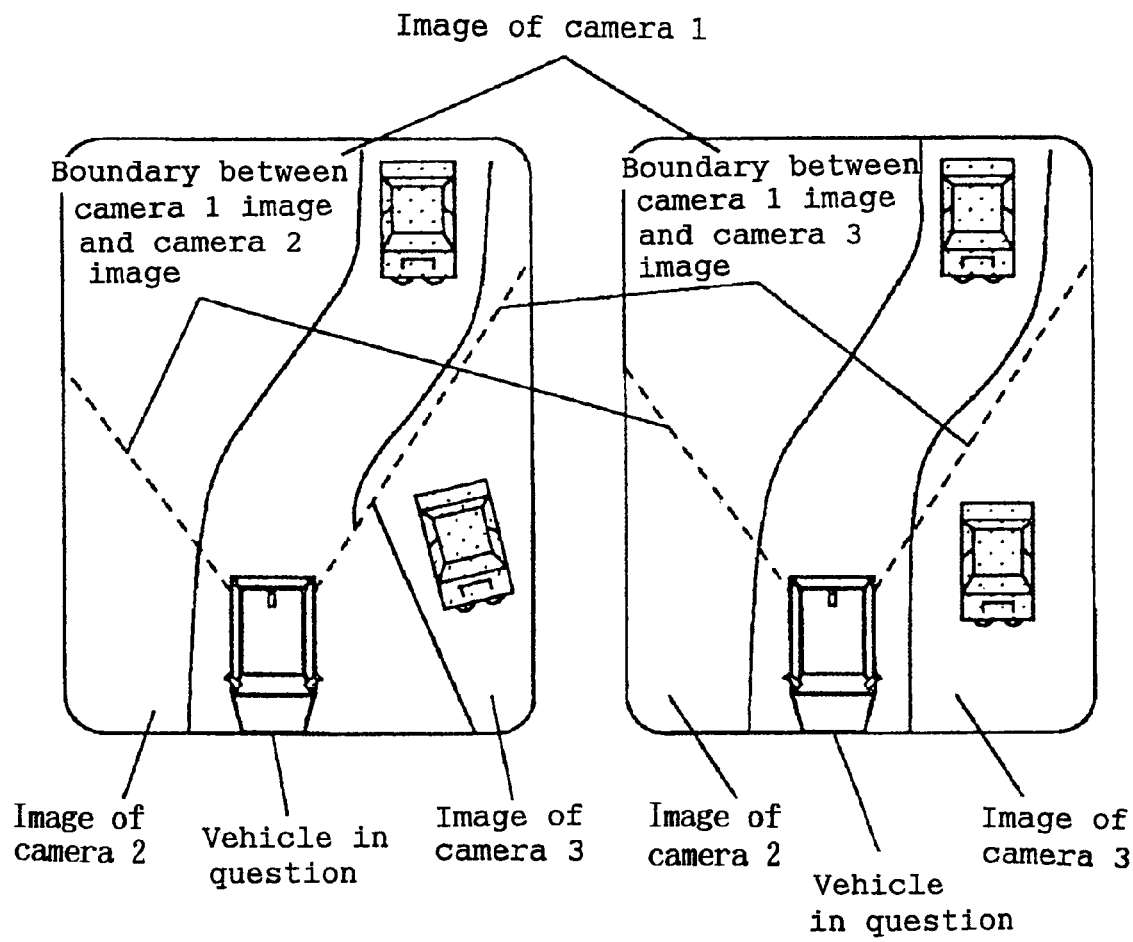

Example of image of camera 2 after calibration

Example of image of camera 1 after calibration

Characteristics extraction (extract luminous parts alone)

Example of generating of guide data 2 by points (used for camera 2 correction)

Example of generating of guide data 1 by points (used for camera 1 correction)

Fig. 57 (a)

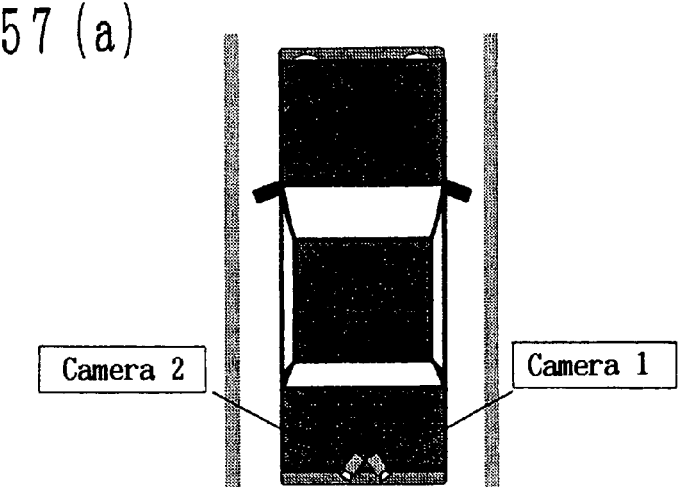

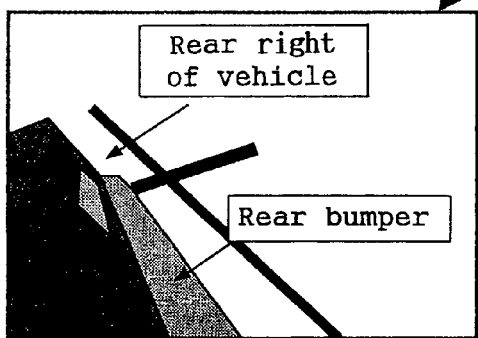 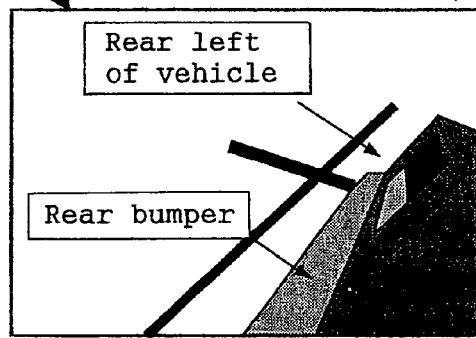

Example of image of camera 2 after calibration    Example of image of camera 1 after calibration Characteristics extraction (extract edges, remove unnecessary parts)

Since guide data needs to be generated only once, manual generation is OK if automatic generation is not available

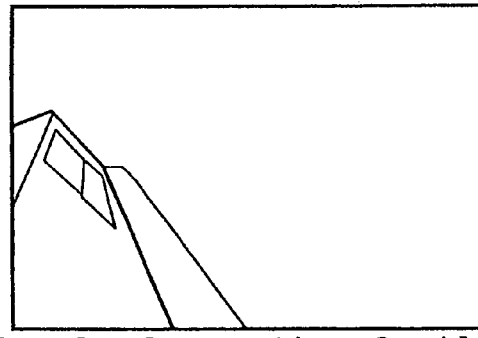 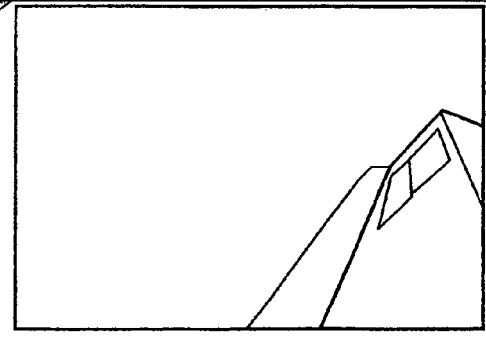

Example of generating of guide data 2 by lines (used for camera 2 correction)

Example of generating of guide data 1 by lines (used for camera 1 correction)

Example in which camera 1 image having camera 1 shifted is displayed with guide data superposed Rotate joystick slightly to left to correct shift by rotation Tilt joystick to up left to correct camera orientation Example of camera 1 image after calibration Example in which camera 1 image having camera 1 shifted is displayed with guide data superposed Rotate joystick slightly to left to correct shift by rotation Tilt joystick to up left to correct camera orientation Example of camera 1 image after calibration

Fig. 61

| | X axis | Y axis | Z axis | Angle α (deg) | Angle β (deg) | Angle γ (deg) | Focal length | Distortion κ1 | Distortion κ2 |
|---|---|---|---|---|---|---|---|---|---|
| Virtual point of view 1 | 0 | 0 | z2 | 0 | −90 | 0 | f2 | 0 | 0 |
| Virtual point of view 2 | 0 | 0 | z2 | 0 | −90 | 0 | f2 | 0 | 0 |
| Virtual point of view 3 | 0 | 0 | z2 | 0 | −90 | 0 | f2 | 0 | 0 |

Fig. 65 (a)
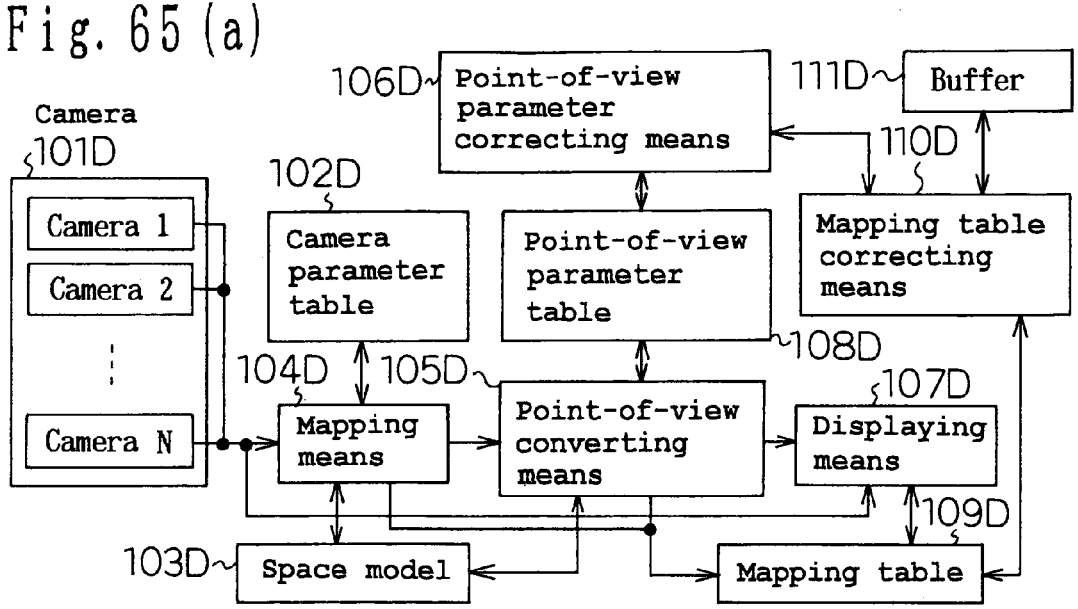
Fig. 65 (b)
Example of car-carried camera Synthesize image (before point-of-view parameter correction)
Fig. 65 (c)
Example of car-carried camera Synthesize image (after point-of-view parameter correction)
----- Boundary between camera 1 image and camera 2 image
——-— Boundary between camera 1 image and camera 3 image
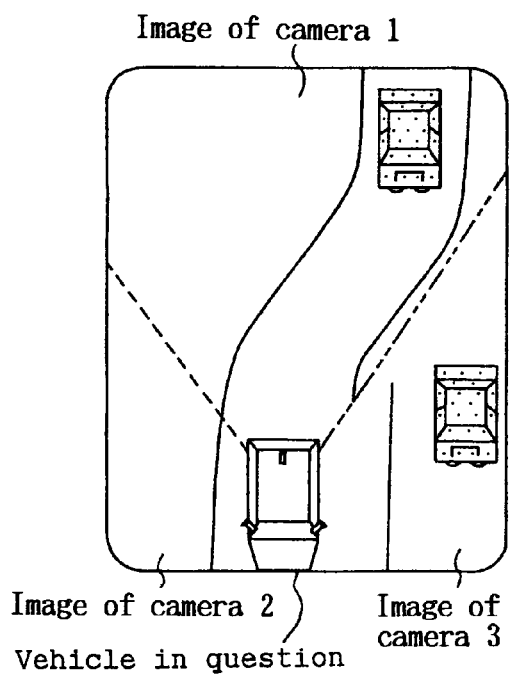
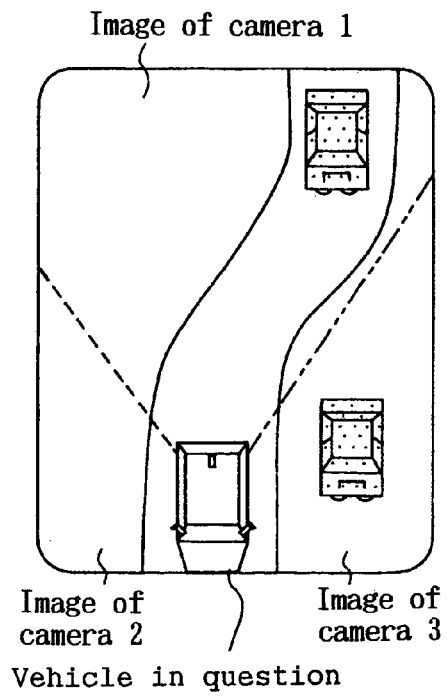

Fig. 66(a)

Point-of-view position before point-of-view correction
Point-of-view position after point-of-view correction (du, dv)

$P_1: (u_1, v_1) \Rightarrow P'_1: (u'_1, v'_1)$

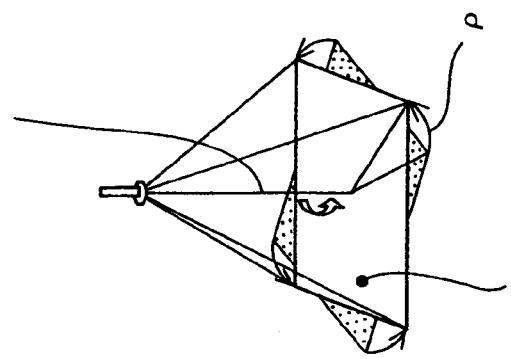

Fig. 66(b)

Direction of line of sight before point-of-view correction (let distance from point of view to plane be d)

Direction of line of sight after point-of-view correction $P_2: (u_2, v_2)$
$P'_2: (u'_2, v'_2)$

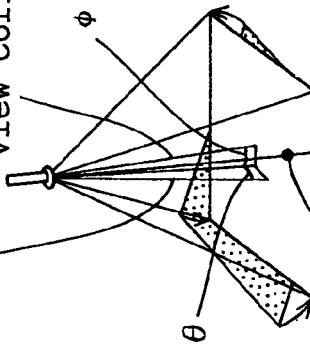

Fig. 66(c)

Direction of line of sight is same before and after point-of-view correction $P_3: (u_3, v_3) \Rightarrow P'_3: (u'_3, v'_3)$

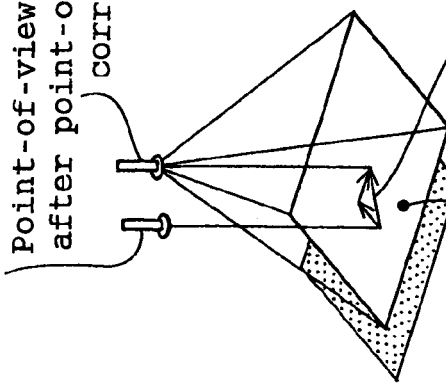

---- Boundary between camera 1 image and camera 2 image
____ Boundary between camera 1 image and camera 3 image Screen before point-of-view parameter correction Screen after rotation around line-of-sight axis Screen on completion of correction after parallel displacement of line-of-sight axis

1

METHOD AND APPARATUS FOR DISPLAYING A SYNTHESIZED IMAGE VIEWED FROM A VIRTUAL POINT OF VIEW

This application is a U.S. national phase application of THIS APPLICATION IS A U.S. NATIONAL PHASE APPLICATION OF PCT international application PCT/JP99/04061.

TECHNICAL FIELD

The present invention relates to an apparatus and a method for displaying a synthesized single image composed of a plurality of images shot by plural cameras, instead of displaying the images independently, so that the overall situation of the area shot by said plural cameras can be intuitionally understood, and for example, to a monitoring apparatus in a shop or a vehicle's surroundings monitoring apparatus, etc. for the assistance of the safety confirmation during the driving of a vehicle.

BACKGROUND ART

A prior art general monitoring apparatus is generally configured so that a monitoring objective part in a shop and the like is shot by a camera or plural cameras and that the image(s) is displayed on a monitor screen. In this case, for example, when plural cameras are installed, the same number of monitor screens as the number of said cameras are generally prepared. When the same number of monitor screens as the number of the cameras can not be prepared, the images of said plural cameras are integrated into a single image using a separator and the like, the camera images are sequentially switched, or another method is used. However, there has been such a problem or the like that a manager needs to consider the continuity between the independently displayed images during the monitoring of the image of each camera in such a prior art apparatus.

To resolve the problem, for example, Japanese Laid-Open Patent Publication No. Hei 10-164566, etc. discloses a monitoring apparatus in which a plurality of cameras are installed so that the images thereof overlap at the edge parts and in which the images of the plurality of cameras are integrated and displayed into a single image by superposing said overlapping parts, thereby resolving said problem of continuity.

Another example of the application of a monitoring apparatus is the case of the installation on a vehicle. One of the prior art example is as follows. That is a monitoring apparatus in which a camera is installed for monitoring the surroundings of a vehicle and the image acquired by said camera is displayed on a TV monitor installed near the driver's seat. An apparatus is known in which a place, such as the rear side of the vehicle, unseen to the driver with the own eyes or a mirror is shot by said camera and displayed on said monitor. In particular, many are used on a vehicle, such as a large truck and a van (one-box wagon), having a narrow field of view seen with the eyes and a mirror.

FIG. 69 shows a prior art example in which monitoring cameras are installed on a vehicle. The example of FIG. 69 is a method in which the images of four monitoring cameras (C1-C4) mounted on the body of the vehicle are synthesized into a single image through a separating adapter and the images are separately displayed on a TV monitor (D1-D4). In particular, with regard to the image of the rear side camera, an invention is made so that the right and left of the image is reversed in order that the positional relation of the objects viewed in the image becomes the same as viewed in a mirror. Further, with regard to a place unseen due to the limitation in the angle of field of the camera, an invention is made so that each camera is turned by manual operation by the driver thereby permitting to obtain the image of the desired place. Such a monitoring apparatus mentioned above is disclosed, for example, in Japanese Laid-Open Patent Publication No. Hei 5-310078, and so on.

However, in a prior art monitoring apparatus such as the above-mentioned example, the images of respective cameras are displayed independently of each other. Accordingly, it is difficult to understand instantaneously the overall situation of the space shot by the cameras by watching each image.

In addition, in case of synthesizing the respective images into a single image, the apparatus cannot treat, for example, a request by the manager to watch an integrated image viewed from a desired point of view depending on the situation, because the apparatus does not calculate the spatial position of an object shot by the camera.

The same problem occurs in a monitoring apparatus installed on a vehicle. That is, in a prior art monitoring apparatus such as the above-mentioned example, the images input from respective cameras are displayed independently of each other. Accordingly, for example, in case of using said displayed images as assistance during the parking of a vehicle in a parking space, said images merely serve to provide a view otherwise unseen. That is, the only effect is to reduce the area unseen to the driver in comparison with the conventional case by visual inspection and a mirror.

Meanwhile, a wide-angle lens is generally used in order to overcome the narrowness of the field. The image from the wide-angle lens does not provide the detail in a specific part. However, the overall situation of the surroundings of the vehicle is easily understood because of the wideness of the field of the wide-angle lens.

However, even if an ordinary lens is replaced by the wide-angle lens, the image of the camera still depends on the position on the body of a vehicle where the camera is installed, and accordingly, it is not possible to obtain a virtual image viewed from a position where the camera is not installed. That is, the only effect of using the camera equipped with the wide-angle lens is to reduce the number of the cameras.

Another prior art apparatus is further disclosed in Japanese Laid-Open Patent Publication No. Hei 3-99952. FIG. 70 is a block diagram showing an embodiment of the prior art apparatus for monitoring the surroundings of a vehicle. The images input from cameras 1-N 2201 into an image converting section 2202 are converted into another coordinates by a conversion, and synthesized into a single image by an image displaying section 2203. It is then displayed on a TV monitor 2204 installed at the driver's seat. In the image displaying section, an invention is possible in which the displayed position of the vehicle in question is shifted from the center of the screen or the like, depending on gear position, vehicle speed, and winker operation in order to widen the area of interest of the surroundings of the vehicle, and the like.

Further another prior art example developed further is disclosed in Japanese Laid-Open Patent Publication No. Hei 7-186833. In this example, in the presentation of the situation of the surroundings to the driver, road surface part is distinguished from the other part. Then, the road surface part is converted into an image viewed downward from the point of view above the vehicle center by a coordinate transformation. The part other than the road surface of the raw video from the camera is altered properly with regard to place and size, and displayed in superposition on said converted image. As such, it accurately informs the situation of an obstacle in the surroundings of the vehicle, especially another vehicle and the like approaching from behind the vehicle.

However, in the above-mentioned another prior art apparatus for monitoring the surroundings of a vehicle, there has been a problem that it can be difficult to find the correspondence of the obtained synthesized image to the actual object.

In the above-mentioned further another example, by separating the road surface part and the part other than the road surface, the viewed image of the objects outside of the road surface is cut out and pasted into a synthesized image. However, the cutting-out of the objects outside of the road surface is one of the difficult problems in the field of image recognition, and hence difficult to realize practically.

On the other hand, there is a problem that the shift of the camera during the running causes a shift in the synthesized image. A method for resolving this is disclosed, for example, in Japanese Laid-Open Patent Publication No. Hei 5-310078. In this method, a mechanism for changing the orientation of a camera is provided, whereby the driver manually directs the camera into a desired direction while viewing a synthesized image. The problem in this case is, however, that the mechanisms for changing the orientation are necessary to installed in the same number as the number of the cameras, which causes a higher cost.

To resolve such problems, in case of an apparatus installed on a vehicle for example, an object of the present invention is to compose a single image showing what objects are present near the vehicle in the all surroundings of the vehicle, as realistically and understandably as possible, thereby displaying it to the driver.

The present invention further provides a method for easily obtaining camera parameters, such as the attachment position and the attachment angle of the camera, and also an apparatus and a method for detecting and correcting the shift of said camera parameters due to vibration, temperature and the like, if it occurs during the running.

DISCLOSURE OF INVENTION

To solve the above-described problems, the present invention is an image generating apparatus comprising: a camera or a plurality of cameras; space reconstructing means for mapping the input image from said camera, into a predetermined space model of a predetermined three-dimensional space; point-of-view converting means for synthesizing an image viewed from an arbitrary virtual point of view in said predetermined three-dimensional space by referencing to said space data mapped by said space reconstructing means; and displaying means for displaying the image converted by said point-of-view converting means.

Further, to solve the above-described problems, an image generating method of the present invention comprises: a space reconstructing step of mapping the input image from a camera locating in a predetermined three-dimensional space, into a predetermined space model of said predetermined three-dimensional space; and a point-of-view converting step of synthesizing an image viewed from an arbitrary virtual point of view in said predetermined three-dimensional space by referencing to said space data.

The basic configuration of the present invention is characterized by comprising: image inputting means of inputting an image or images from a camera or a plurality of cameras installed on a vehicle; a camera parameter table for storing the camera parameters indicating the characteristics of said camera or cameras; space model generating means of generating a space model in a coordinate system with the reference on the vehicle; mapping means of mapping the image input from said camera, into said space model; point-of-view converting means of setting a point of view and synthesizing a single image viewed from said point of view using the data converting means.

The first applied configuration of a monitoring apparatus of the present invention, is characterized by comprising: a distance sensor for measuring the distance; and obstacle detecting means for measuring, as the situation of the surroundings of a vehicle, at least the distance to an obstacle existing in the surroundings of the vehicle by said distance sensor.

In an apparatus in accordance with the present invention, the space model generating means generates a model previously set properly or a model set depending on the distance of an obstacle in the surroundings of the vehicle sensed by an obstacle sensing means. The mapping means maps, into said space model, the image of the surroundings of the vehicle input by the image inputting means from the camera installed on the vehicle. Then, the point-of-view converting means composes a single image viewed from a predetermined point of view using the mapped image, and the displaying means displays it. Here, the crew of the vehicle can cause displaying the image viewed from a desired point of view.

In order to resolve the above-mentioned problems, the basic configuration of the present invention is characterized by comprising: image inputting means of inputting an image or images from a camera or a plurality of cameras installed on a vehicle; a camera parameter table for storing the camera parameters indicating the characteristics of said camera or cameras; road-surface characteristics detecting means of detecting the characteristics on the road surface as the situation of the surroundings of the vehicle; space model generating means of generating a space model corresponding to the process result of said road-surface characteristics detecting means in a coordinate system with the reference on the vehicle; mapping means of mapping the image input from said camera, into said space model; point-of-view converting means of setting a point of view and synthesizing a single image viewed from said point of view using the data generated by said mapping means; and displaying means of displaying the image converted by said point-of-view converting means.

The first applied configuration of the present invention is characterized by further comprising: movement direction detecting means for detecting the movement direction of said vehicle; and movement distance detecting means for detecting the movement distance of the vehicle in a unit time; and wherein said apparatus successively corrects said space model depending on the present position of the characteristics on the road surface obtained from the process results of said movement direction detecting means and said movement distance detecting means.

The second applied configuration of the present invention is characterized by comprising characteristics correcting means for correcting the process result while displaying the process result of said road-surface characteristics detecting means on said displaying means.

In the present invention, the road-surface characteristics detecting means detects the characteristics, such as a white line, on the road surface, and the space model generating means generates a space model correspondingly to said detected characteristics. The mapping means maps, into said space model, the image of the surroundings of the vehicle input by the image inputting means from the camera installed on the vehicle. Then, the point-of-view converting means composes a single image viewed from a predetermined point of view using the mapped image, and the displaying means displays it. Since the positional relation between the vehicle and the road surface characteristics changes as the vehicle moves, the space model is corrected in response to the change, and an image is synthesized using the corrected space model and then displayed.

In order to achieve the above-mentioned object, the present invention is characterized by comprising: image inputting means of inputting an image or images from a camera or a plurality of cameras installed on a vehicle; a camera parameter table for storing the camera parameters indicating the characteristics of said camera or cameras; mapping means of mapping the image input from said camera, into a space model generated by modeling the surroundings of said vehicle; point-of-view converting means of synthesizing a single image viewed from a desired virtual point of view using the data generated by said mapping means; camera parameter correcting means of correcting the parameters of said camera or cameras for each camera independently; and displaying means of displaying the image converted by said point-of-view converting means.

Said point-of-view converting means is characterized by switching said virtual point of view according to the time of process or the time of normal operation of said camera parameter correcting means.

Said point-of-view converting means makes said virtual point of view consistent with the camera parameter of any of said cameras on a vehicle in the time of process of said camera parameter correcting means.

Said point-of-view converting means makes said virtual point of view consistent with the yet-corrected camera parameter of the camera being under the correction, in the time of process of said camera parameter correcting means.

The direction of the operation of changing the direction of the point of view is set to be reverse to the direction of said point of view, in said point-of-view converting means.

Said displaying means displays a mark indicating a boundary, in superposition on the synthesized image in the boundary part where respective images contact when displaying the image from each camera.

In order to achieve the above-mentioned object, the present invention is characterized by comprising: image inputting means of inputting an image or images from a camera or a plurality of cameras installed on a vehicle; a camera parameter table for storing the camera parameters indicating the characteristics of said camera or cameras; mapping means of mapping the image input from said camera, into a space model generated by modeling the surroundings of the vehicle; a point-of-view parameter table for storing the point-of-view parameters including at least the position and the orientation; point-of-view converting means of synthesizing an image viewed from a desired virtual point of view using the result of the mapping process by said mapping means; point-of-view parameter correcting means of correcting the parameters of said virtual point of view; and displaying means of displaying the image converted by said point-of-view converting means.

The present invention is characterized by said set of the point-of-view parameters being distinguished so as to correspond to any one of the cameras installed on the vehicle and stored in said point-of-view parameter table.

The direction of operation is set to be reverse to the actual alteration of point-of-view parameter at least for the operations in orientation, position, and rotation among the operations of changing said virtual-point-of-view parameter in said point-of-view parameter correcting means.

Said point-of-view parameter correcting means corrects said virtual-point-of-view parameter, a fixed tentative virtual point of view is provided, and the progress of the correction of the virtual point of view being under the correction is successively displayed as a synthesized image viewed from said tentative virtual point of view.

Said displaying means displays a mark indicating a boundary, in superposition on the synthesized image in the boundary part where respective images contact when displaying the image from each camera.

Furthermore, the present invention is characterized by comprising a mapping table for retaining the pixel correspondence relation between the camera input image and the synthesized image, whereby said correspondence relation obtained in the processes by said mapping means and said point-of-view converting means is stored in said mapping table.

Further, the present invention is characterized by comprising mapping table correcting means of re-calculating said mapping table using the point-of-view parameters altered in the process by the point-of-view parameter correcting means.

BRIEF DESCRIPTION OF DRAWINGS

FIG. 9 is a diagram showing the data stored in a camera parameter table 103, in the form of a table.

FIG. 10 is a diagram showing an example of a temperature correction table 111, in the form of a table.

FIG. 11 is a diagram showing an example of a camera parameter table 103 renewed using a temperature degree [sic; temperature] correction table, in the form of a table.

FIG. 12 is a diagram showing an example of the description of a space data buffer 105 for storing space data, in the form of a table.

(a) [sic; (a)] a conceptual diagram showing the case that a camera is installed above the approximate center of a vehicle downwardly, as an example of the place of installation of a virtual camera;

(b) [sic; (b)] a conceptual diagram showing the case that a camera is installed obliquely above the approximate front side of a vehicle, directing the camera to the vehicle, as an example of the place of installation of a virtual camera; and (c) [sic; (c)] a conceptual diagram showing an example of the synthesized image of the above-mentioned case (b) [sic;(b)].

FIG. 21 shows:

(a) a conceptual diagram showing the situation that a pattern light irradiating apparatus as characteristic point generating means is attached on top of a side body of a vehicle;

(b)—a conceptual diagram showing the situation that plural pattern light irradiating apparatuses are attached on top of a body of a vehicle thereby irradiating the pattern light onto the road surface, viewed from top of the vehicle; and (c) a conceptual diagram showing the situation that the rectangle patterns irradiated onto the road surface are shot by a camera.

Figure 22:
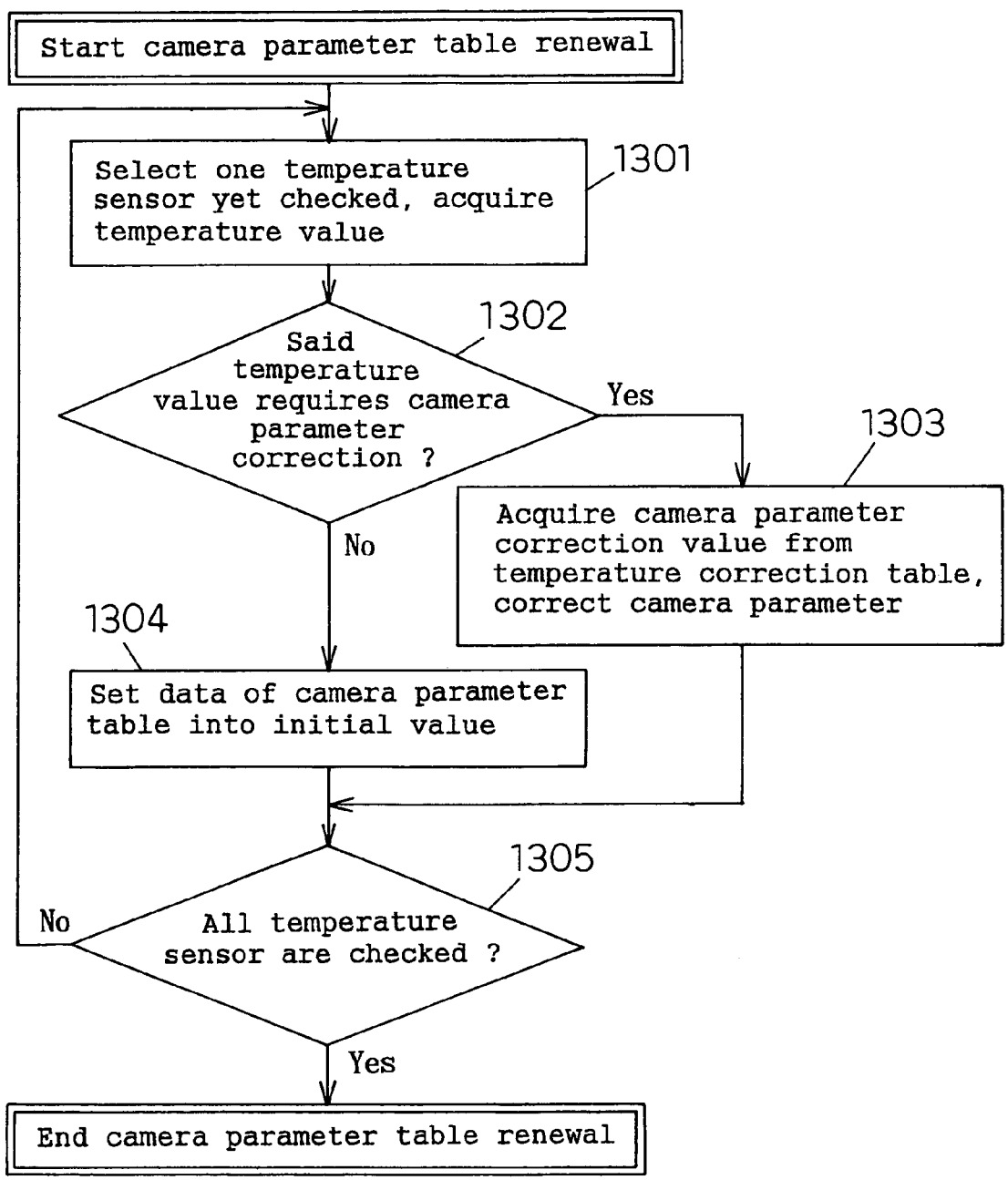

FIG. 22 is a flow chart showing the procedure of the process of renewing a camera parameter table 103 depending on the temperature, in calibrating means 102.

Figure 23:
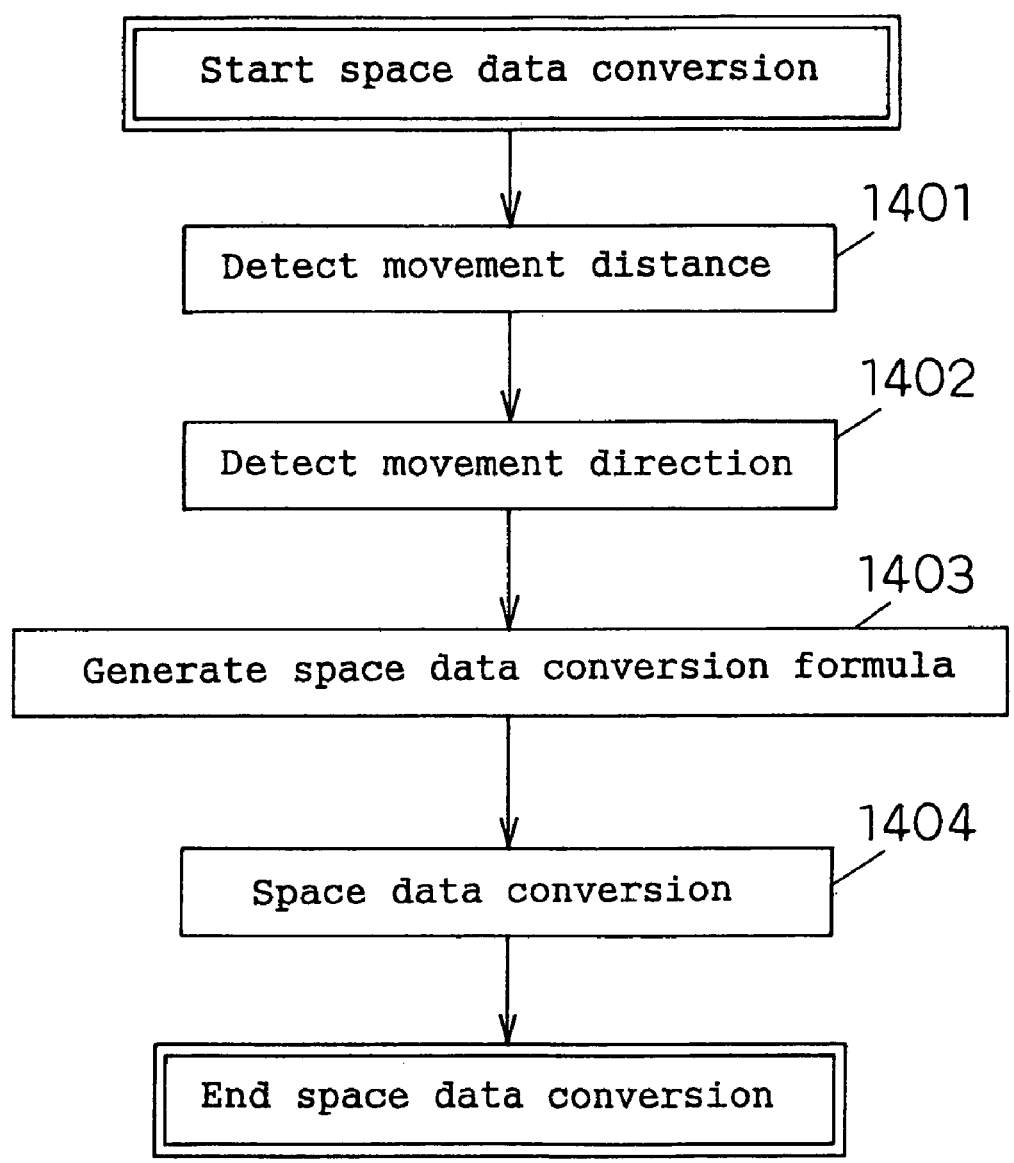

FIG. 23 is a flow chart showing the procedure of the process in space data converting means 114.

Figure 24:
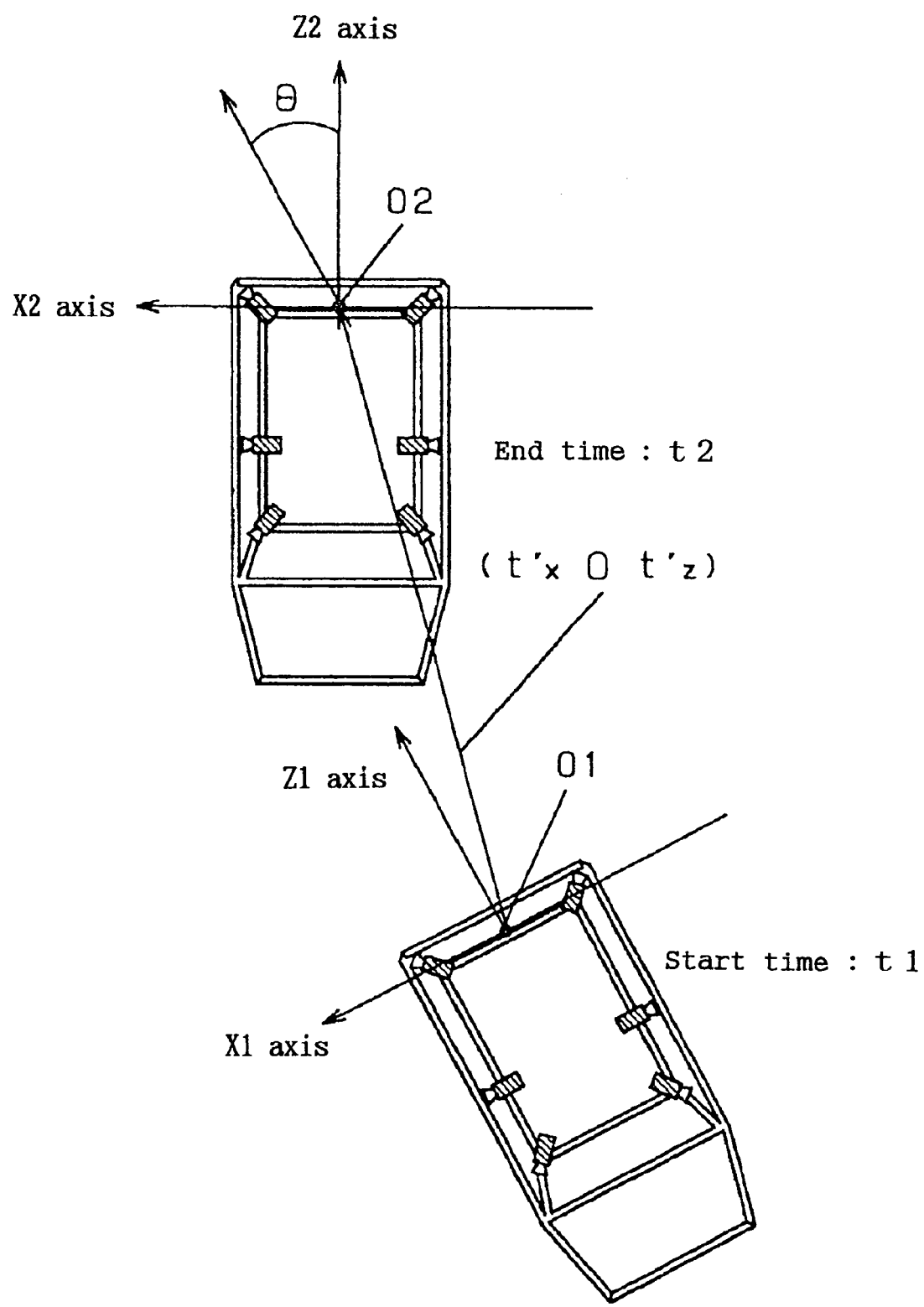

FIG. 24 is a conceptual diagram used for the assistance of the description of space data converting means 114.

Figure 25:
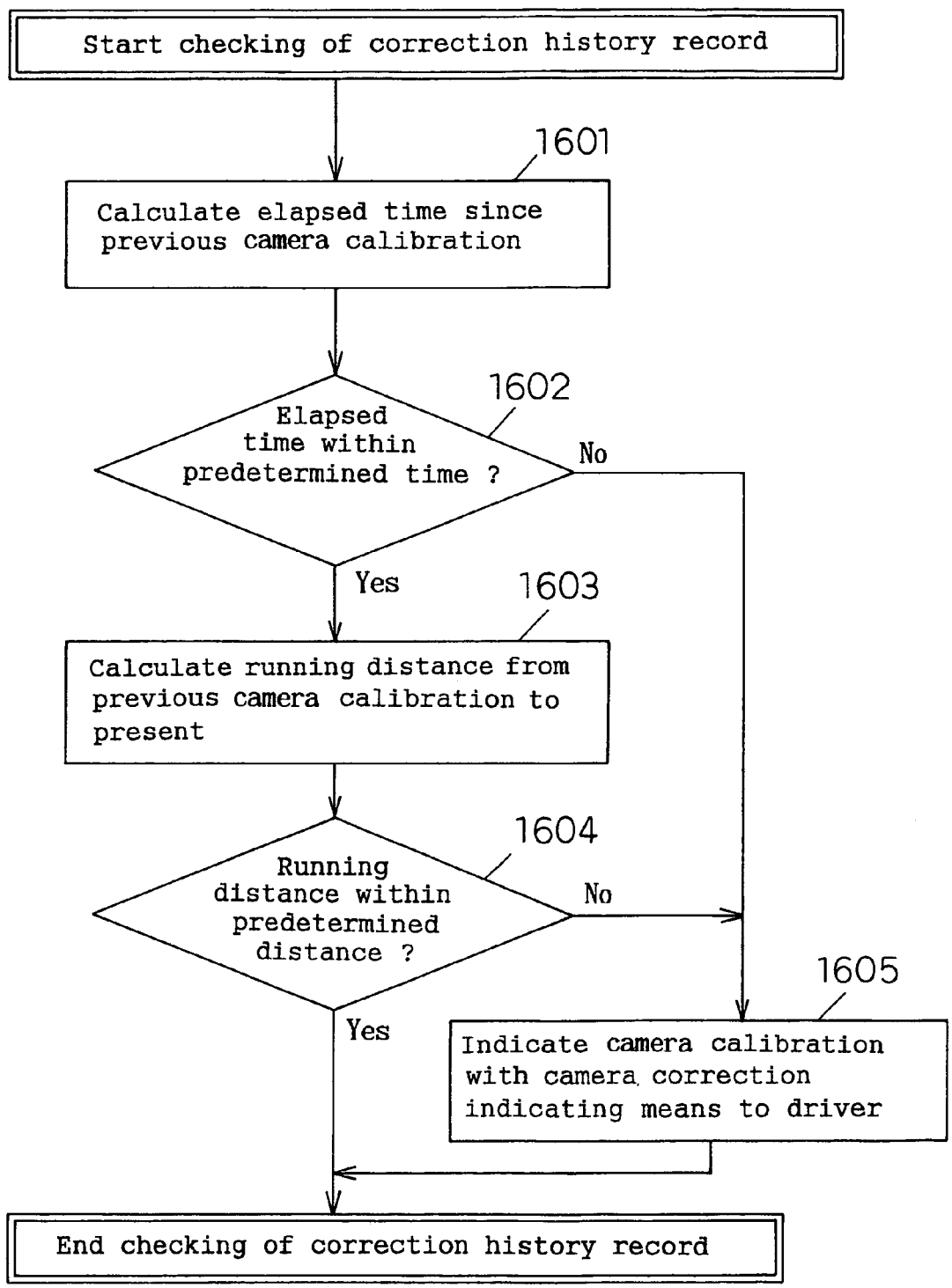

FIG. 25 is a flow chart showing the procedure of the process of checking the record of correction history thereby issuing a correction indication when necessary.

Figure 26:
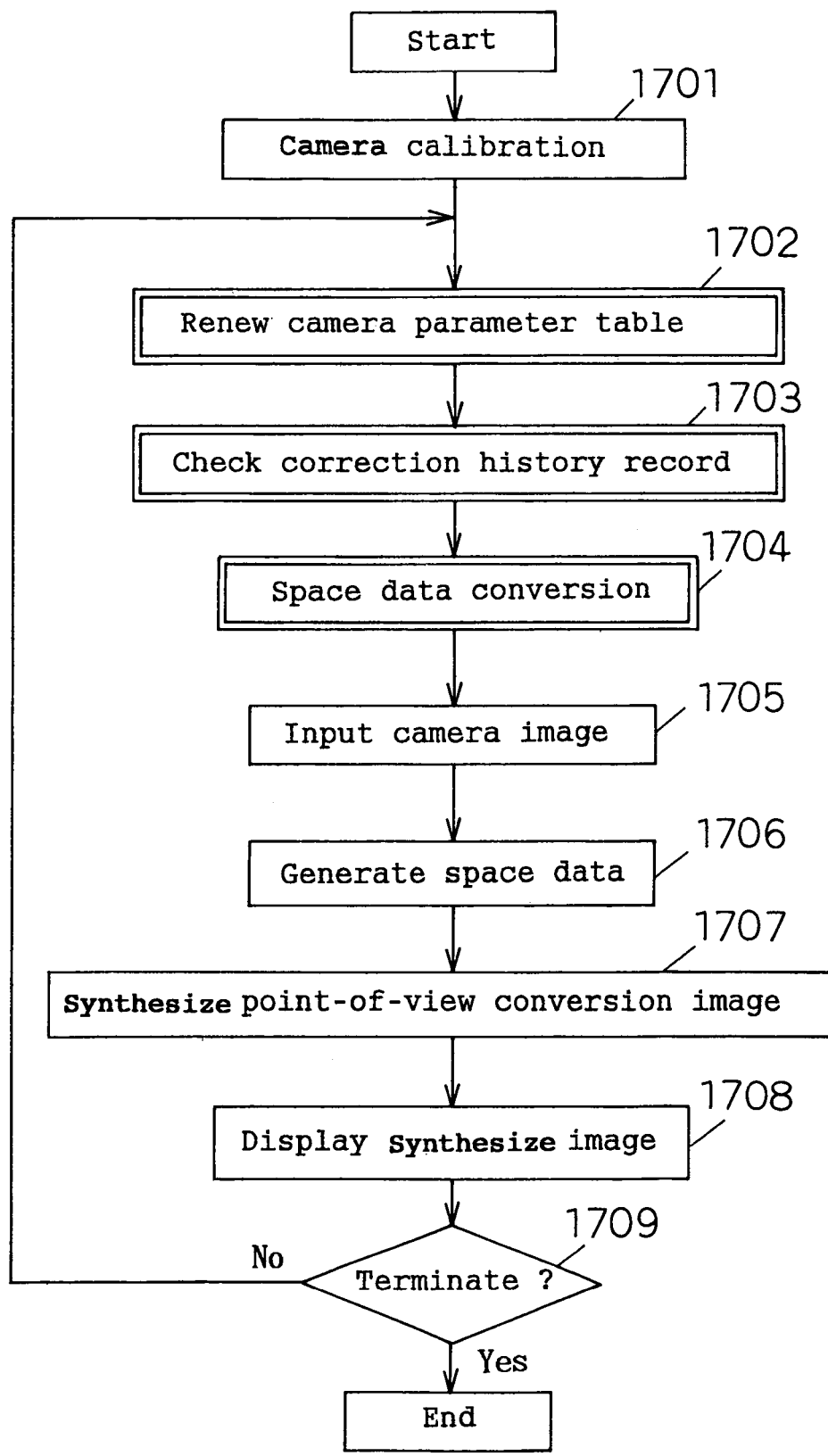

FIG. 26 is a flow chart showing the flow of the overall process of an image generating apparatus in accordance with the present invention.

FIG. 27 shows:

(a) a block diagram showing an example of the basic configuration of an image generating apparatus in accordance with the present invention (Claim 34); and (b) a block diagram showing an example of the configuration of an image generating apparatus in accordance with the present invention (Claim 37).

FIGS. 28(a) to 28(d) are conceptual diagrams showing a space model in a bird's eye view.

Figure 29:
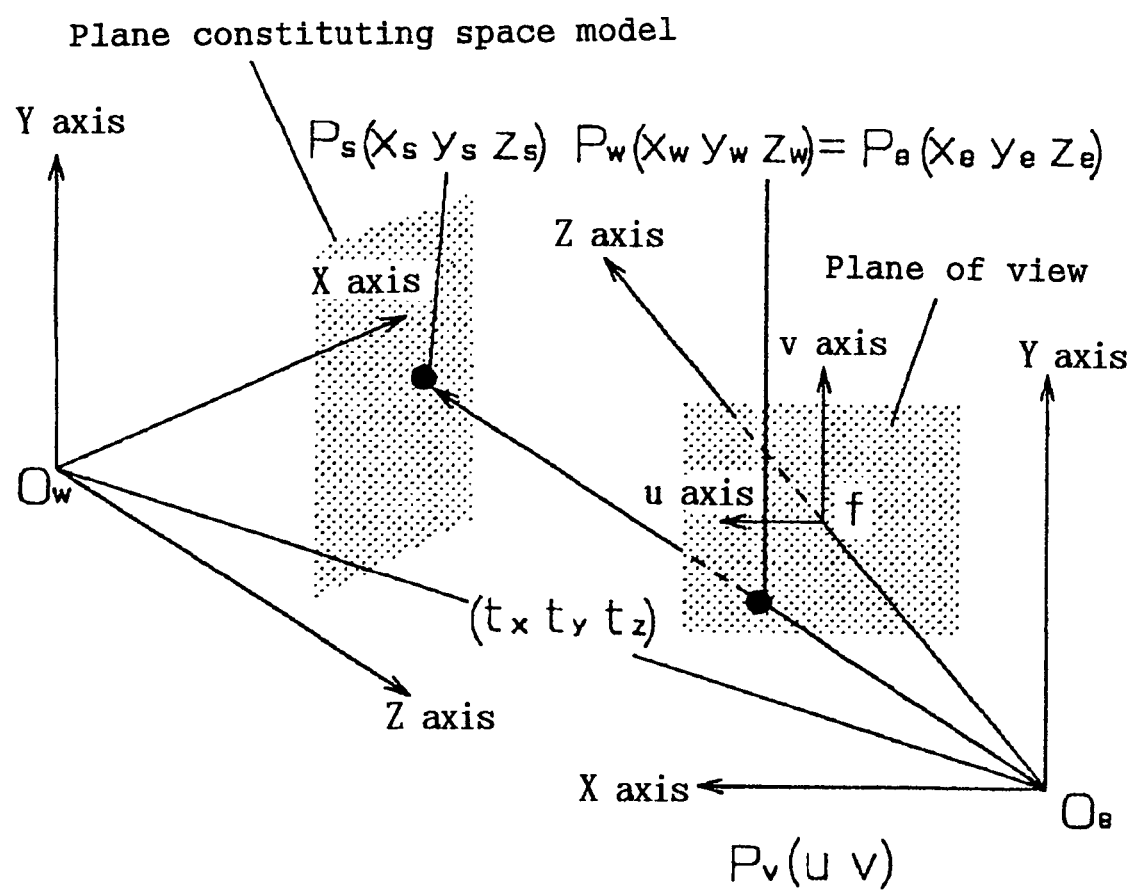

FIG. 29 is a conceptual diagram representing the correspondence relation between a point in the U-V coordinate system being set in the plane including an image shot by a camera and a point in the three-dimensional space coordinate system.

Figure 30:
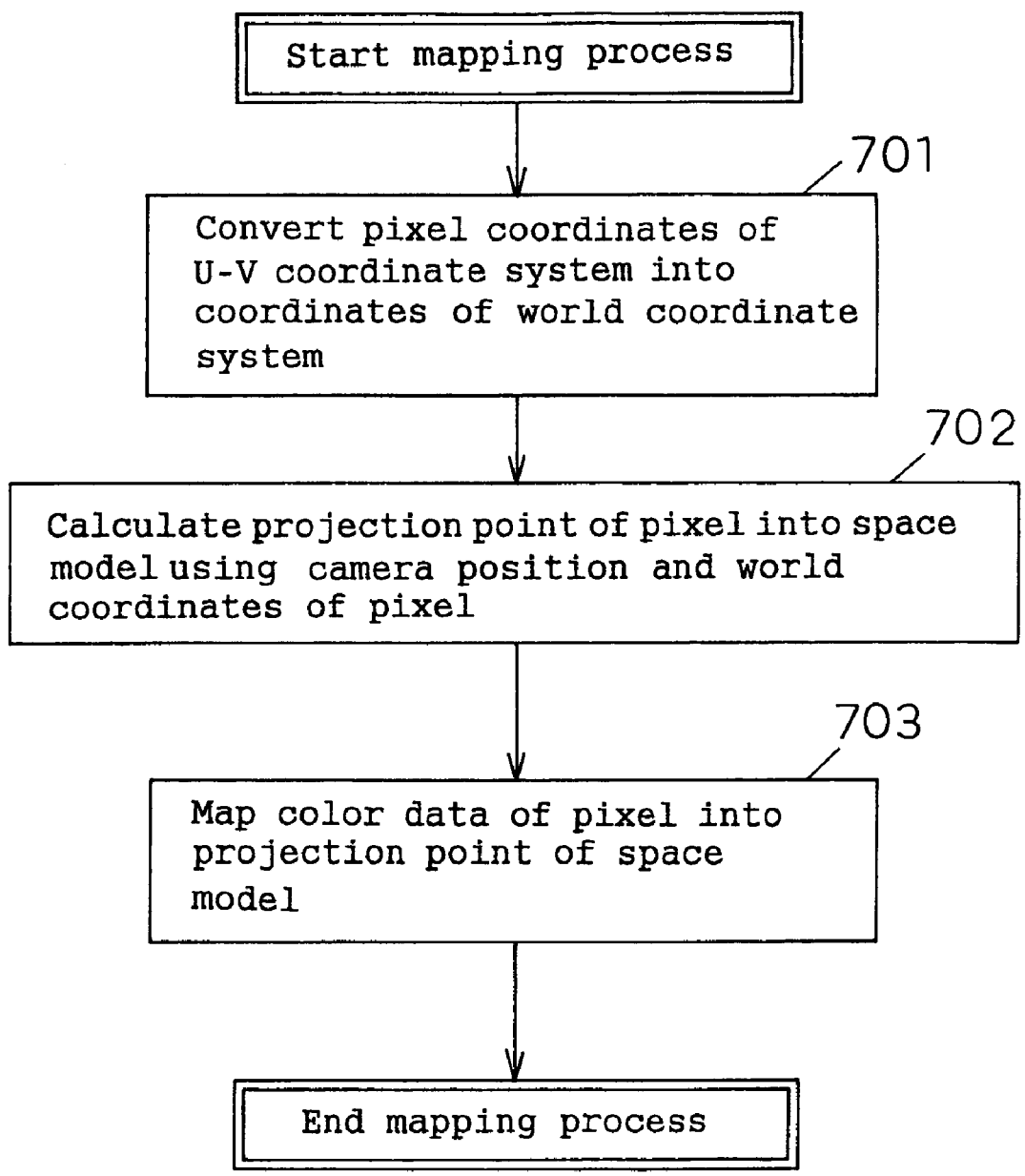

FIG. 30 is a flow chart showing the procedure of the mapping process in mapping means 104A.

Figure 31:
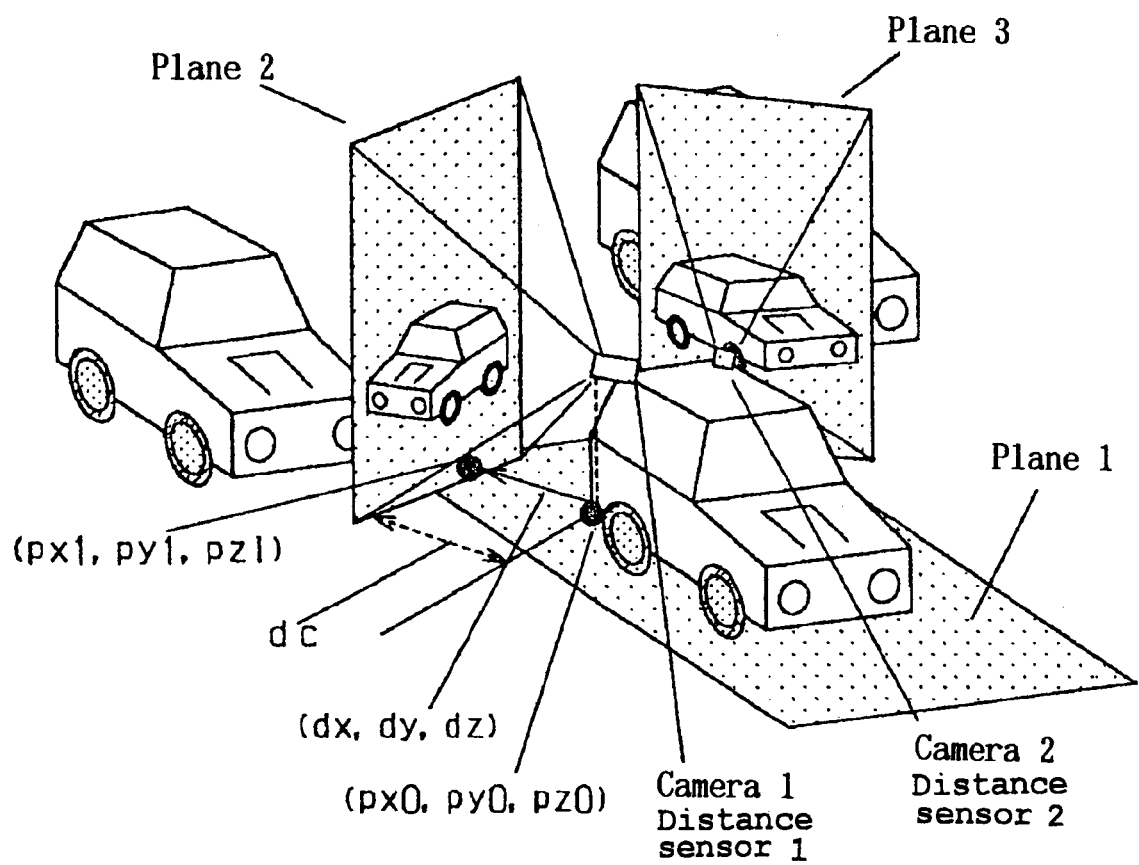

FIG. 31 is a conceptual diagram showing a method of setting a screen plane in the three-dimensional space depending on the distance between a vehicle and an obstacle existing in the surroundings of the vehicle.

Figure 32:
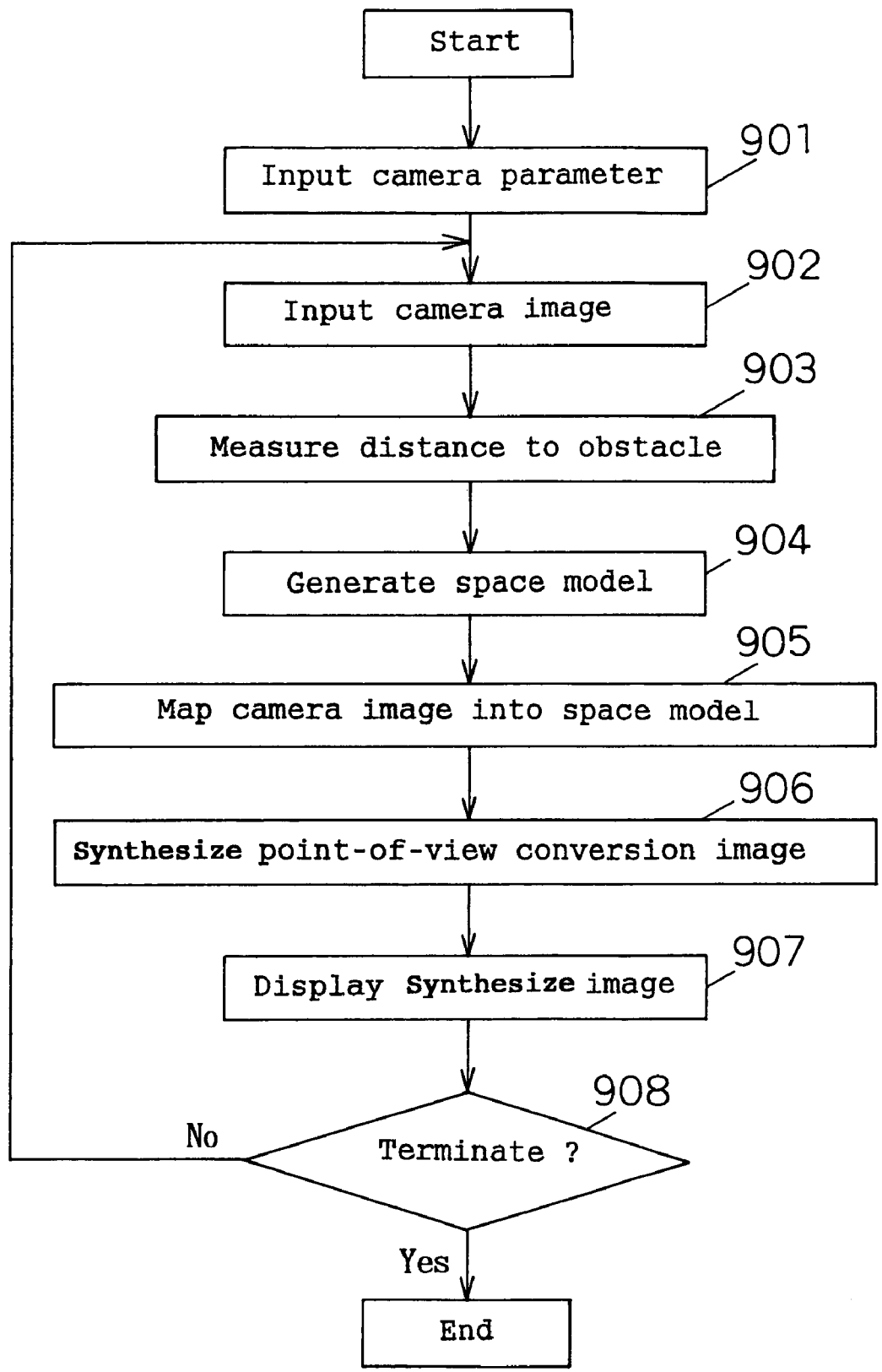

FIG. 32 is a flow chart showing the flow of the overall process of an image generating apparatus in accordance with the present invention.

FIG. 33 shows:

(a) a block diagram showing an example of the configuration of an apparatus for monitoring the surroundings of a vehicle in accordance with the present invention (Claim 39);

(b) a block diagram showing an example of the configuration of an apparatus for monitoring the surroundings of a vehicle in accordance with the present invention (Claim 41); and (c) a block diagram showing an example of the configuration of an apparatus for monitoring the surroundings of a vehicle in accordance with the present invention (Claim 44).

FIG. 34 shows:

(a) a conceptual diagram showing a space model in accordance with the present invention, in a bird's eye view; and (b) a conceptual diagram showing a space model in accordance with the present invention, in a perspective projection view from above the vehicle downwardly.

FIGS. 35(a) to 35(d) are diagrams showing an example of the process of extracting a characteristic point by road-surface characteristics detecting means 103B.

Figure 36:
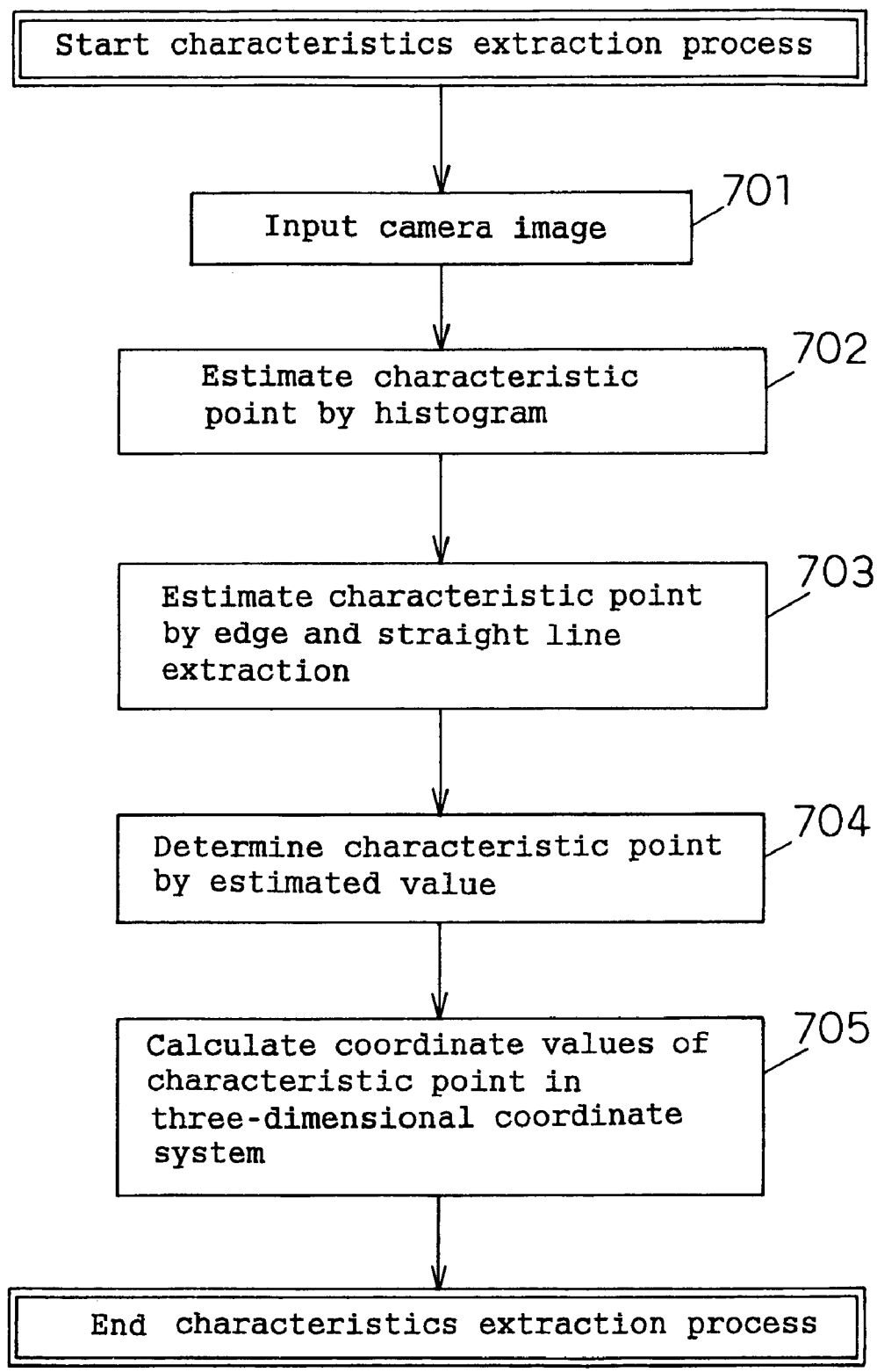

FIG. 36 is a flow chart showing the flow of the process of extracting a characteristic point.

Figure 37:
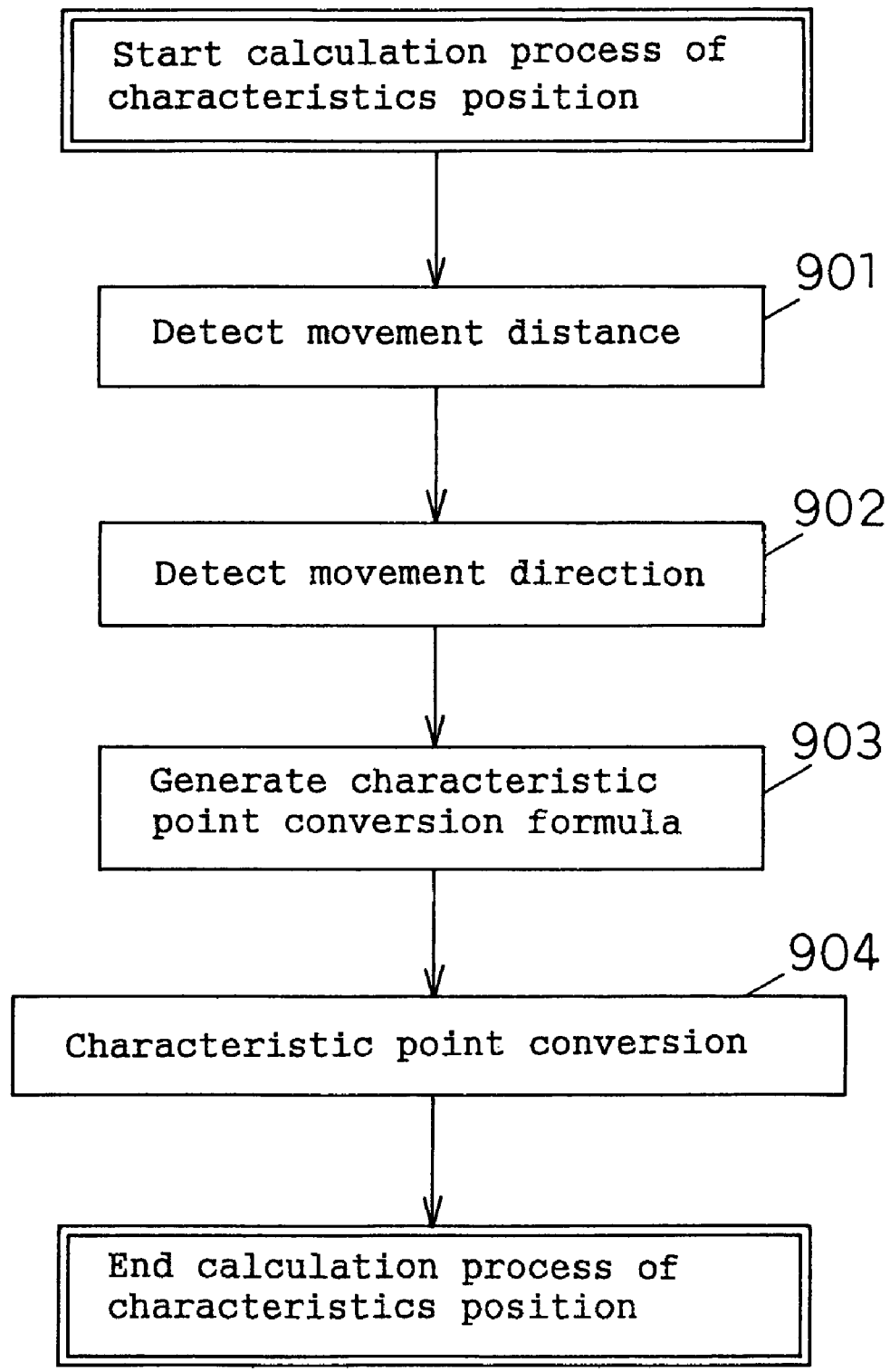

FIG. 37 is a flow chart showing the procedure of the process of calculating the position of a characteristic point as the vehicle moves, in an apparatus for monitoring the surroundings of a vehicle in accordance with the present invention (Claim 41).

Figure 38:
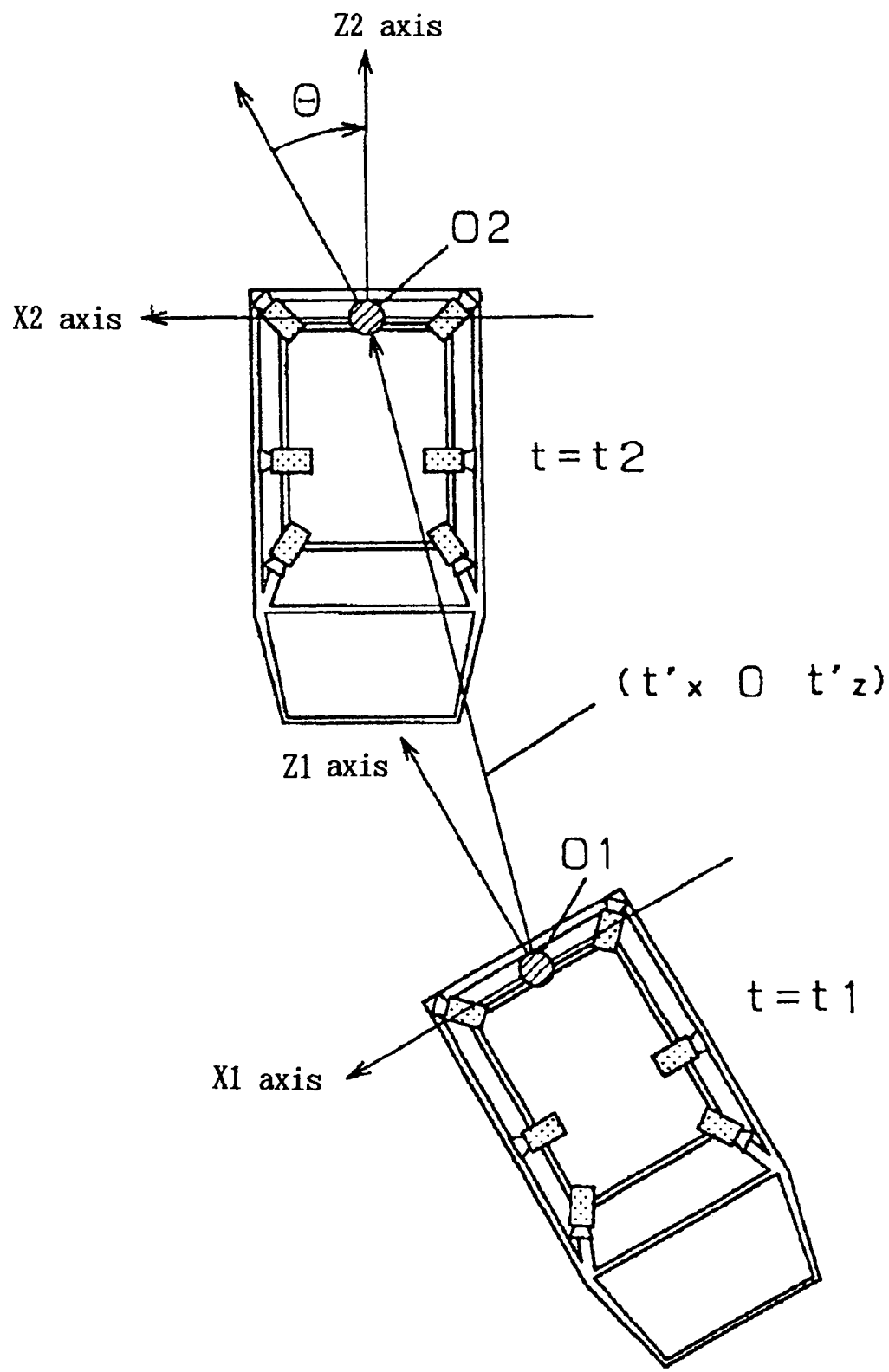

FIG. 38 is a diagram showing the process in characteristics position calculating means.

Figure 39:
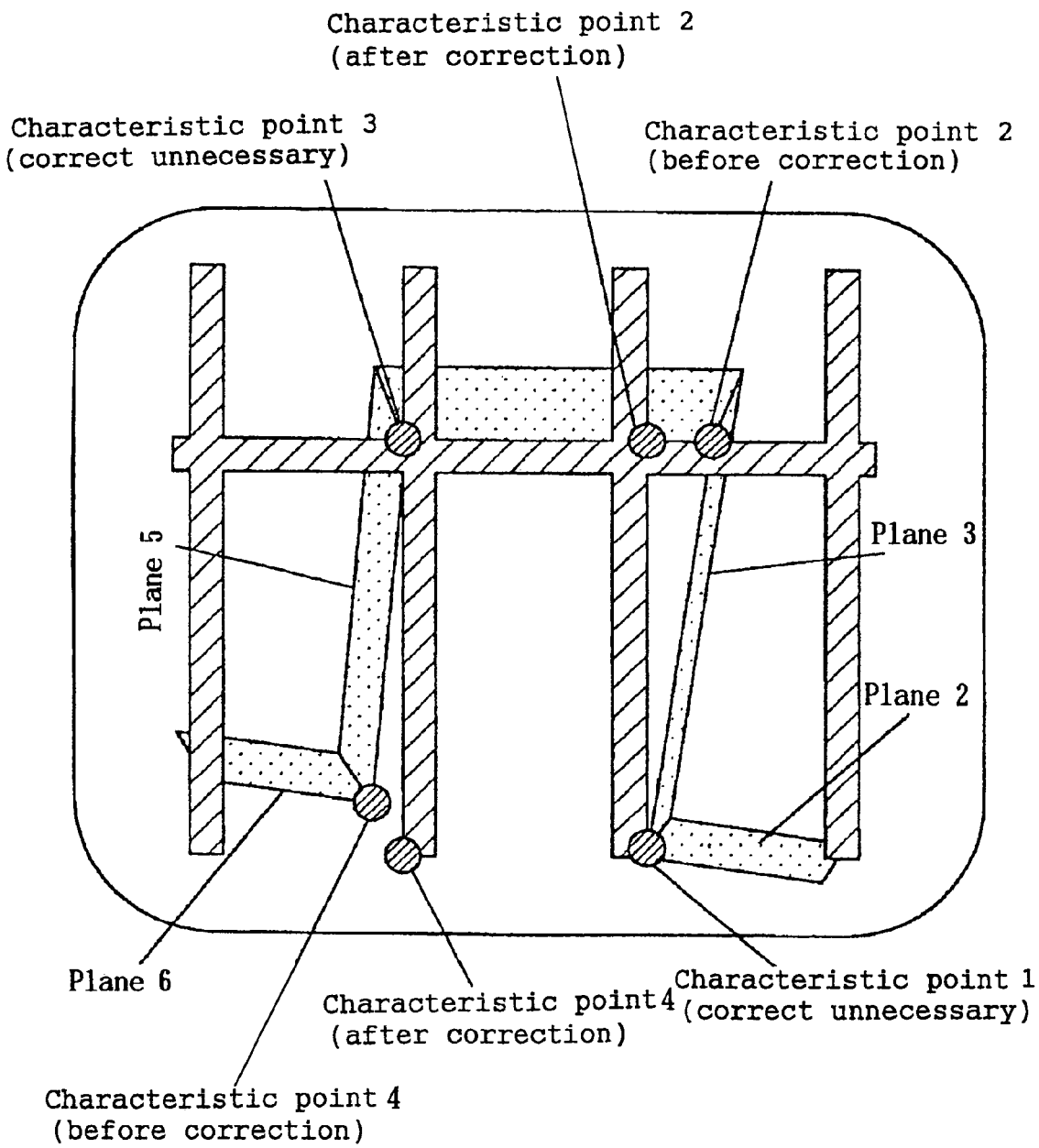

FIG. 39 is a conceptual diagram showing the situation that a characteristics correcting process is displayed on displaying means 107B.

Figure 40:
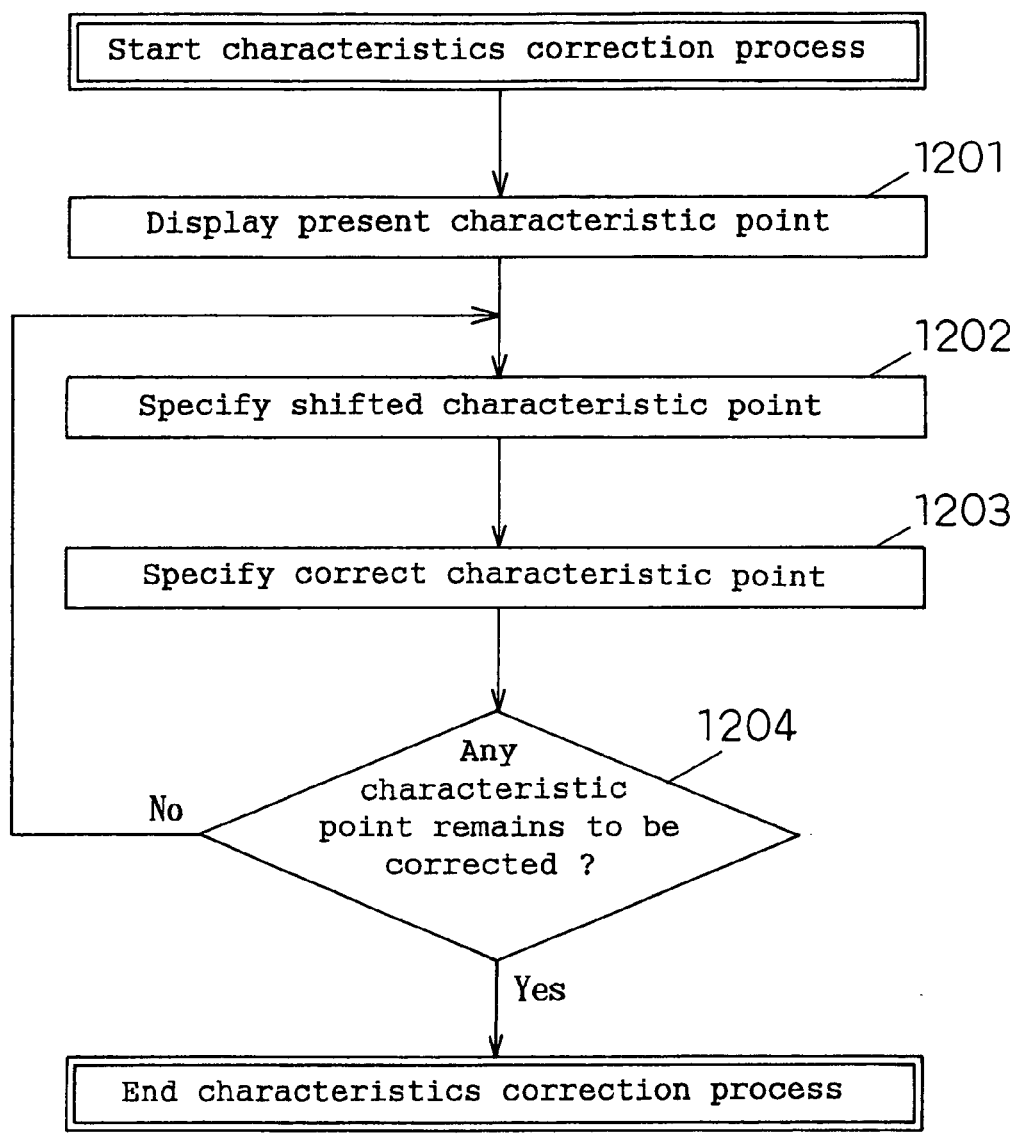

FIG. 40 is a flow chart showing the flow of the process in a characteristics correcting process.

Figure 41:
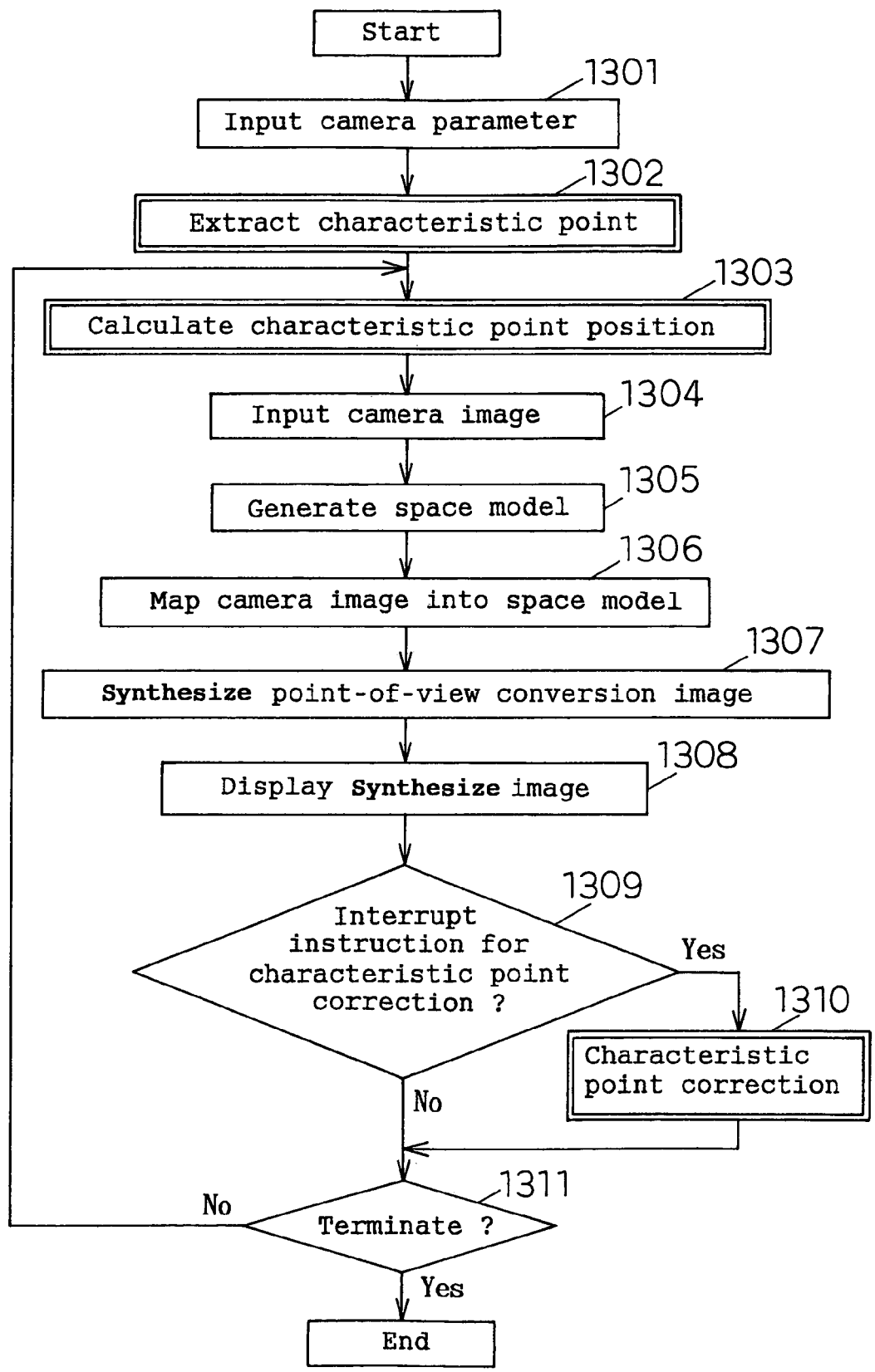

FIG. 41 is a flow chart showing the flow of the overall process of an apparatus for monitoring the surroundings of a vehicle in accordance with the present invention.

Figure 42:
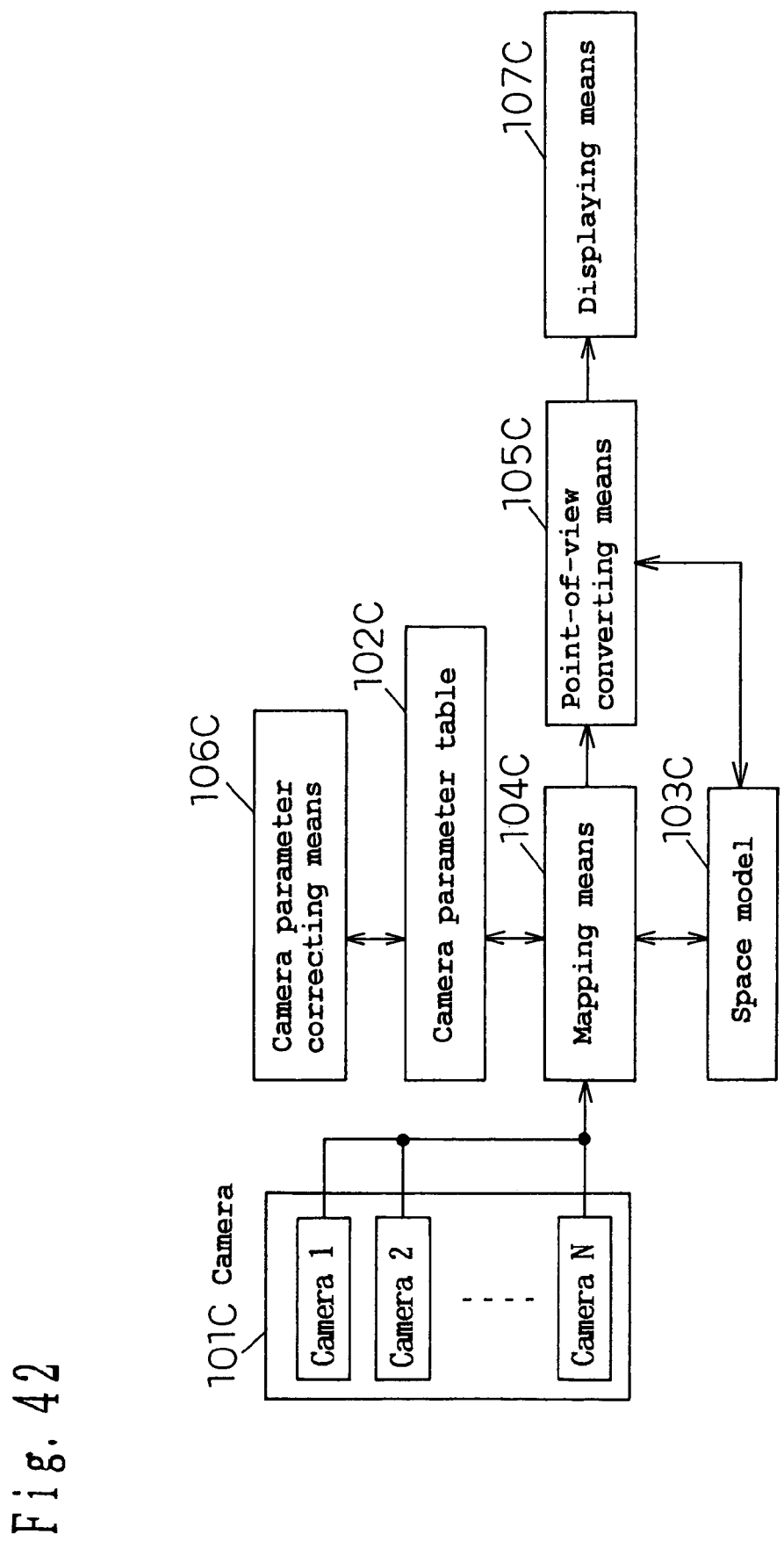

FIG. 42 is a block diagram showing an example of the configuration of an image generating apparatus in accordance with the present invention (Claim 45).

FIG. 43 shows:

(a) a conceptual diagram showing an example of car-carried cameras installed on a vehicle; and (b) a conceptual diagram showing the displayed region on a monitor of the image of each car-carried camera.

Figure 44:
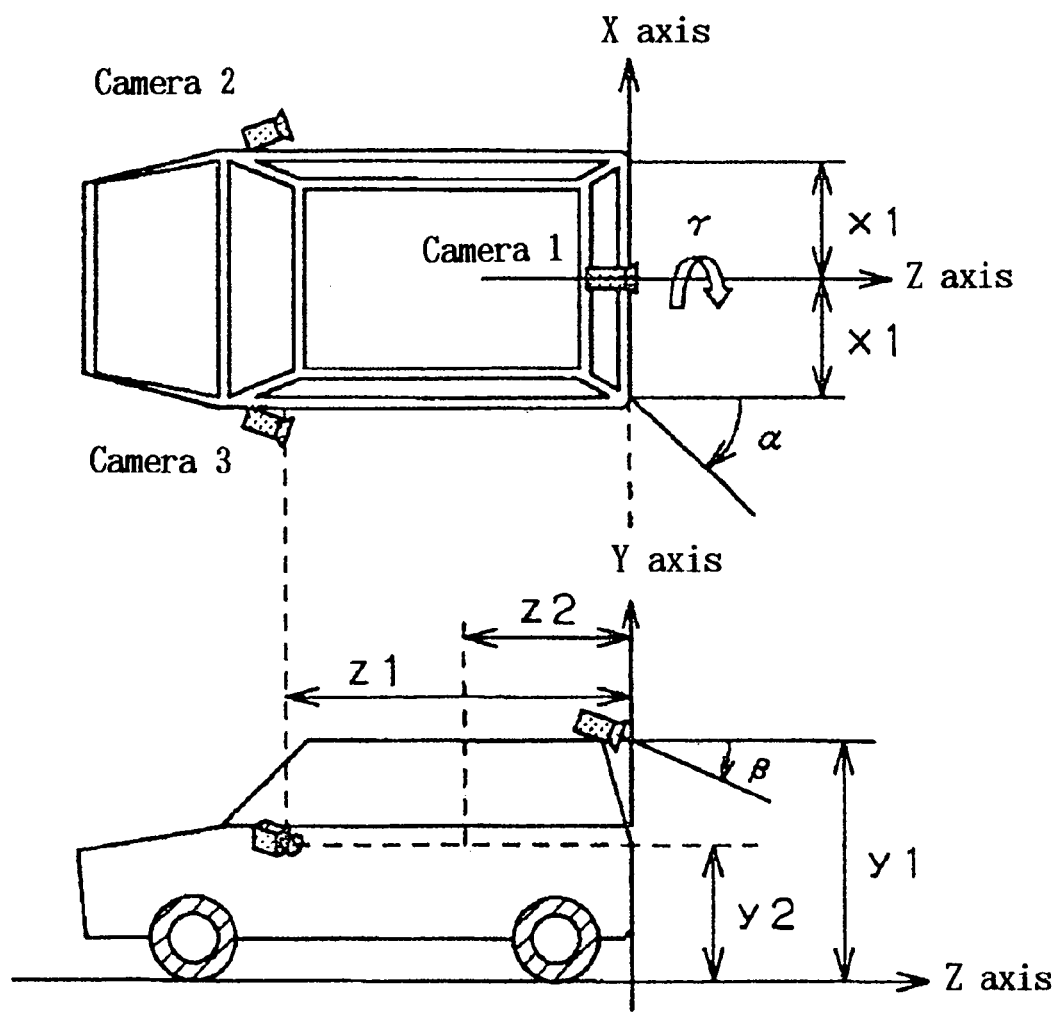

FIG. 44 is a conceptual diagram showing the three-dimensional space coordinate system based on a vehicle.

FIG. 45 is a diagram showing the data stored in a camera parameter table 102C, in the form of a table.

FIG. 46 is a diagram showing the data stored in a point-of-view parameter table, in the form of a table.

Figure 47:
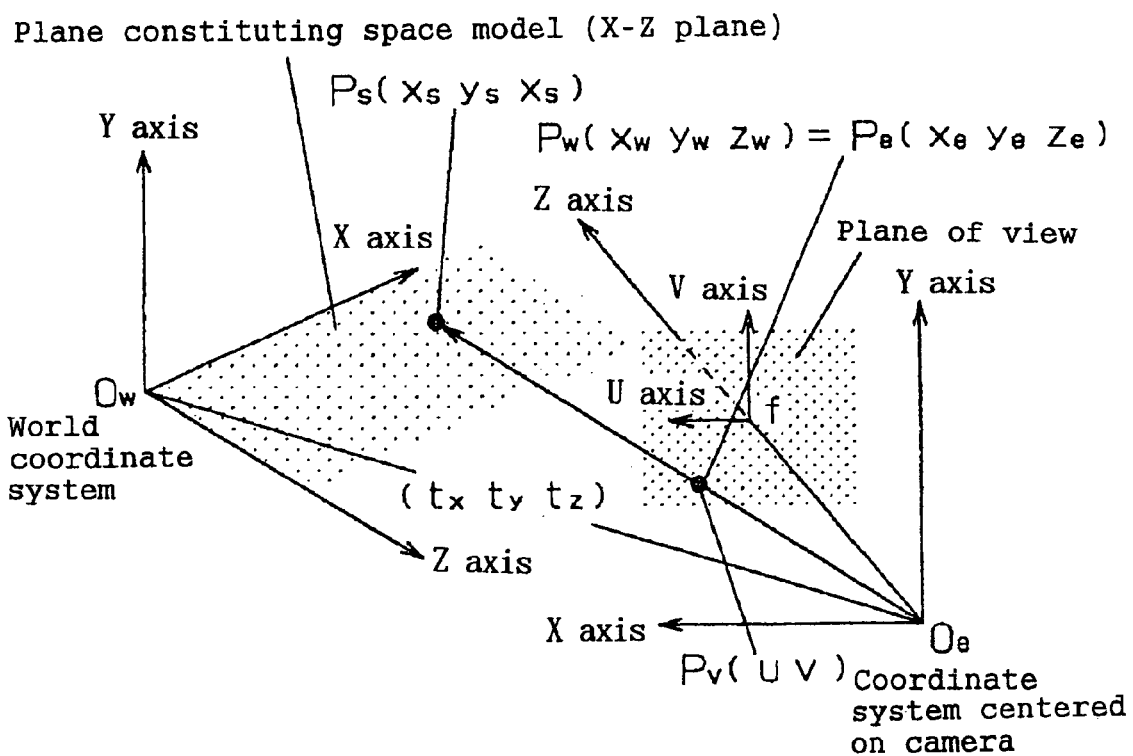

FIG. 47 is a conceptual diagram representing the correspondence relation between a point in the U-V coordinate system being set in the plane including an image shot by a camera and a point in the three-dimensional space coordinate system.

Figure 48:
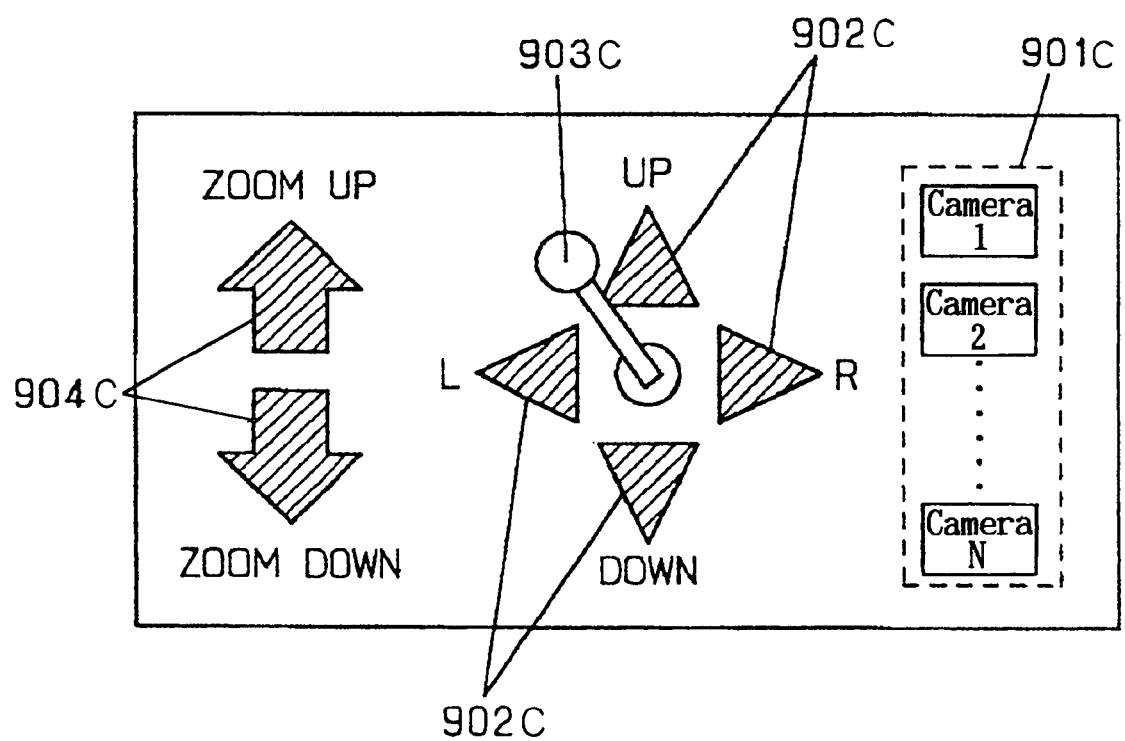

FIG. 48 is a conceptual diagram showing an example of the configuration of an operating section for correcting a camera parameter by camera parameter correcting means 106C.

Figure 49:
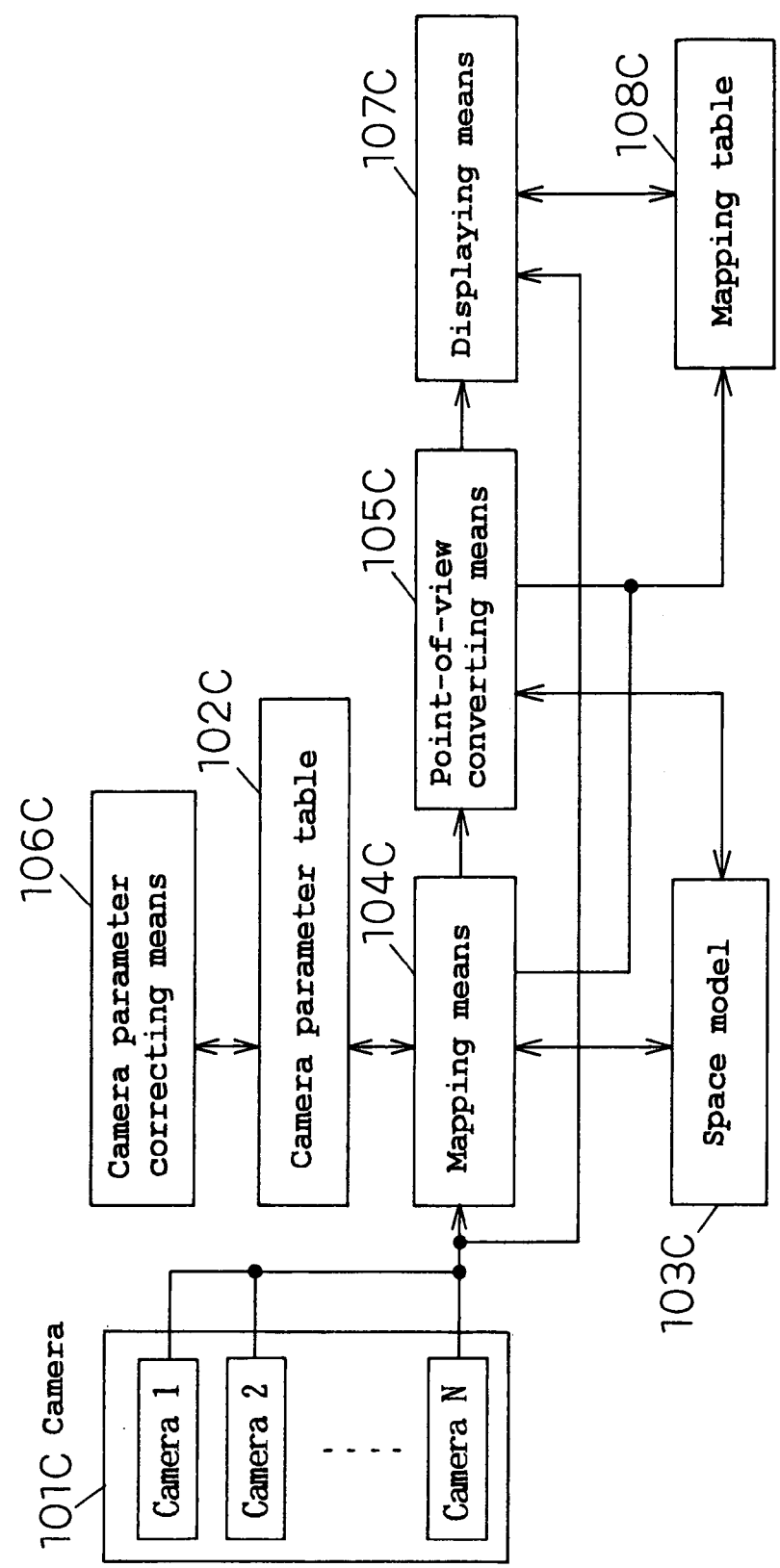

FIG. 49 is a block diagram showing an example of the configuration of an art relevant to an image generating apparatus in accordance with the present invention.

FIG. 50 is a conceptual diagram showing a mapping table 108C, in the form of a table.

Figure 51:
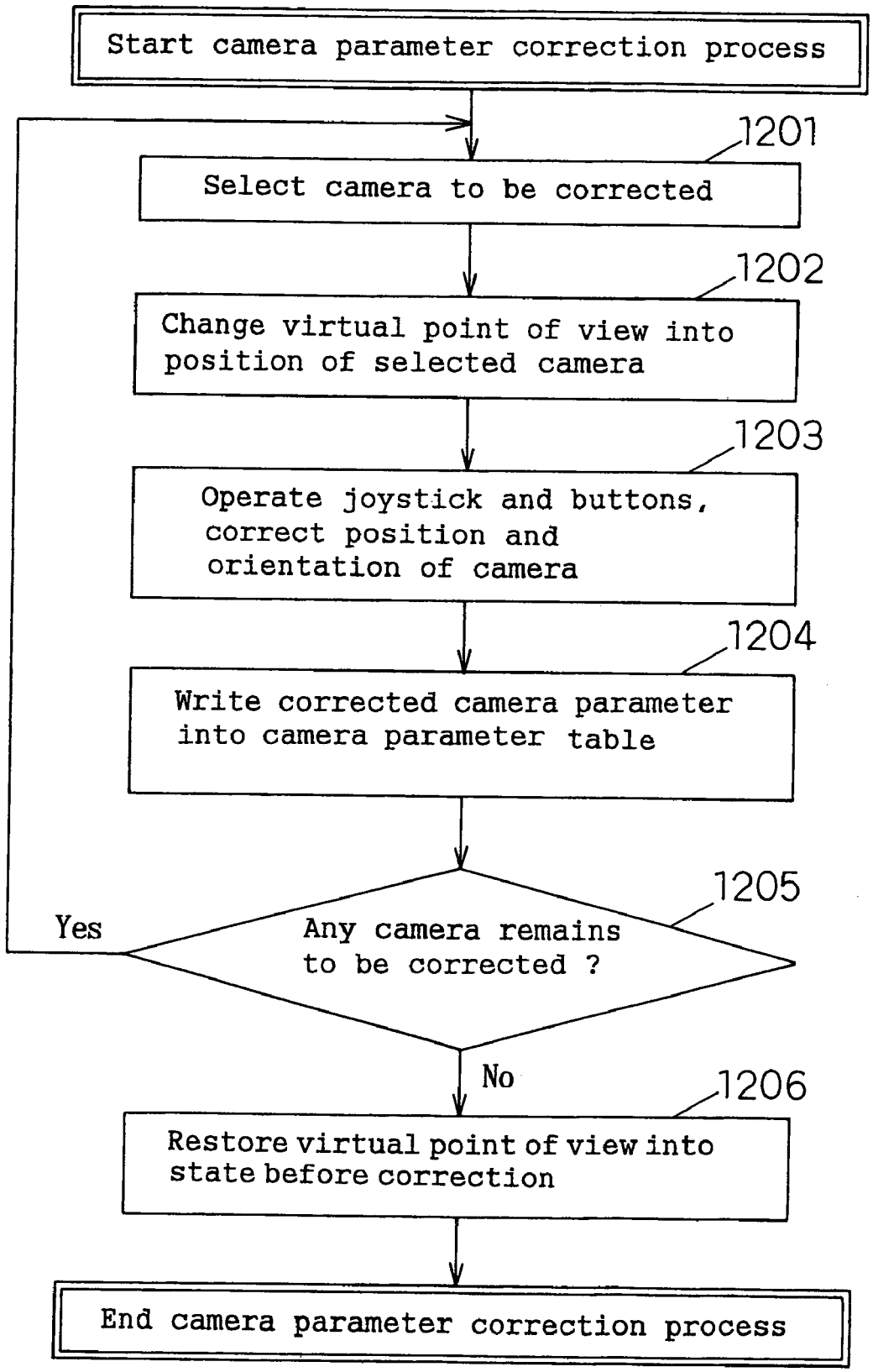

FIG. 51 is a flow chart showing the flow of the process of correcting a camera parameter.

Figures 52A, 52B:
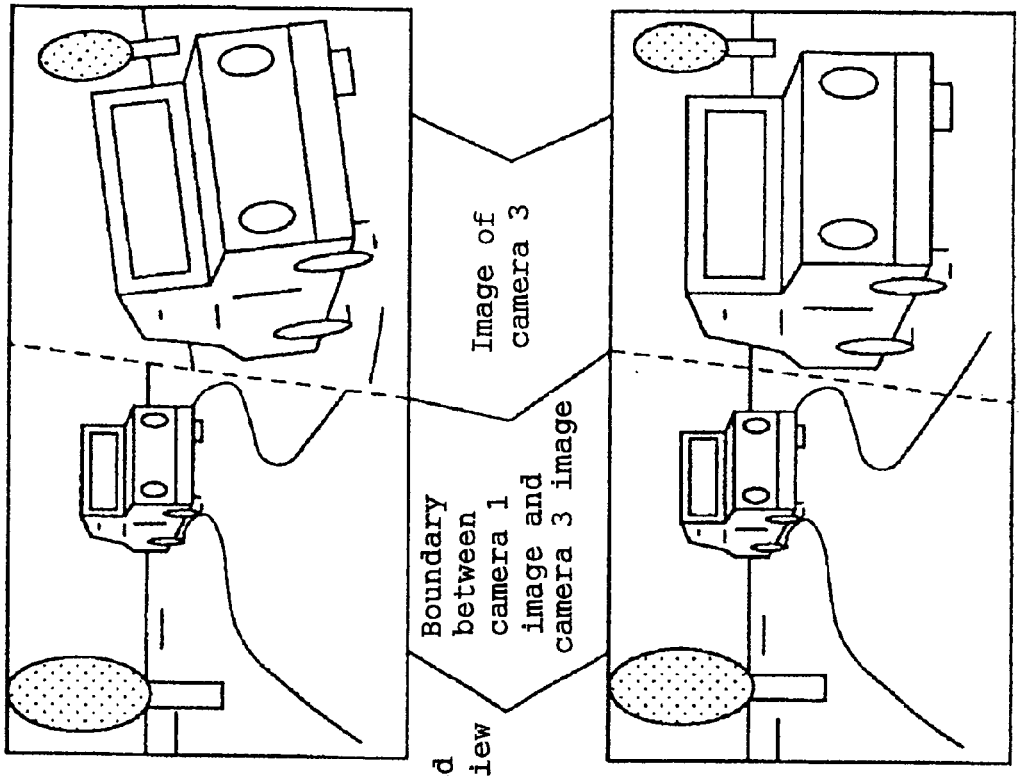

FIGS. 52(a) and 52(b) are conceptual diagrams showing an example of a display screen during the correction of a camera parameter.

FIGS. 53(a) and 53(b) are conceptual diagrams showing a display screen during the time without the correction of a camera parameter (that is, normal state).

Figure 54:
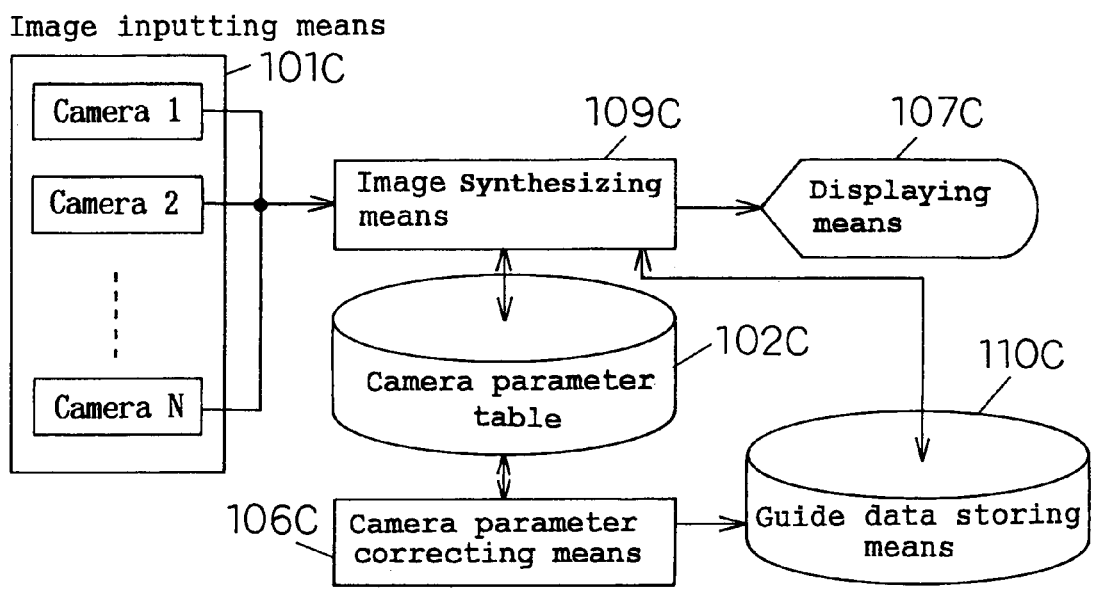

FIG. 54 is a block diagram showing an example of the basic configuration of an image generating apparatus in accordance with the present invention (Claim 51).

Figure 55:
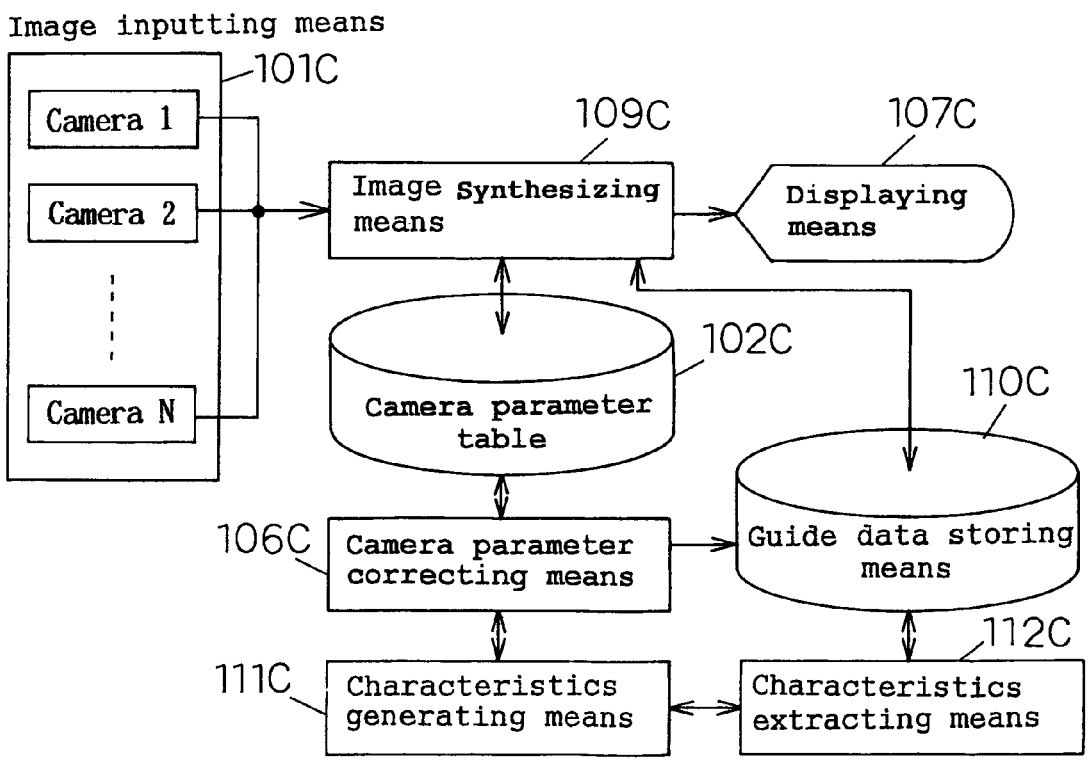

FIG. 55 is a block diagram showing an example of the basic configuration of an image generating apparatus in accordance with the present invention (Claim 54).

Figure 56:
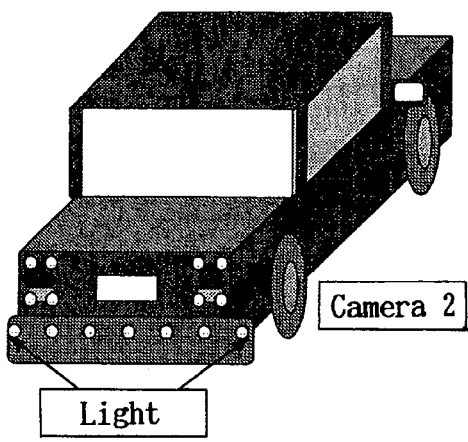
Figure 56:
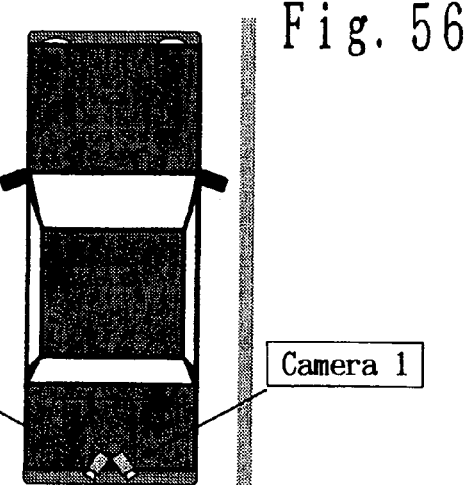
Figure 56:
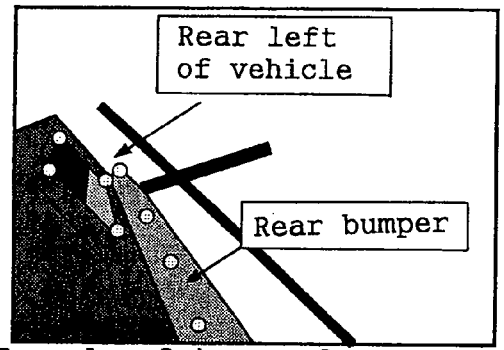
Figure 56:
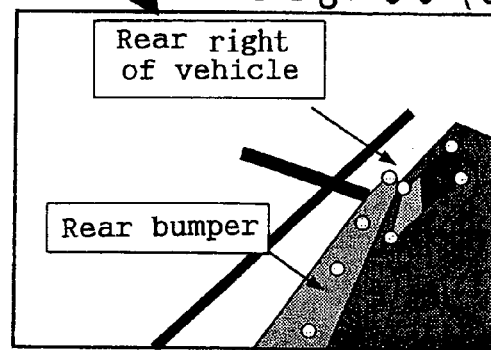
Figure 56D:
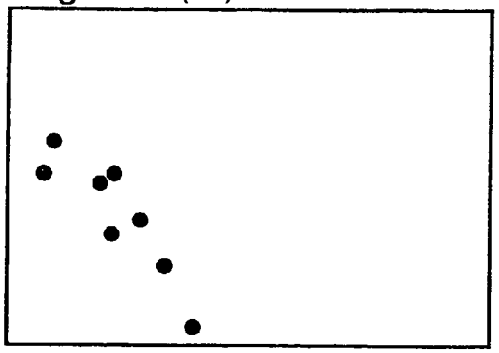
Figure 56:
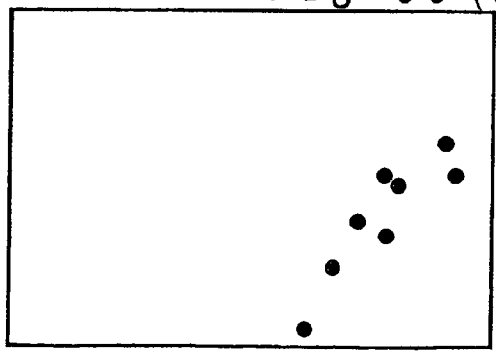

FIG. 56 is a conceptual diagram showing the case that the guide data is generated using a point source of light.

FIG. 57 is a conceptual diagram showing the case that the guide data is generated using an edge line of a body of a vehicle.

Figure 58:
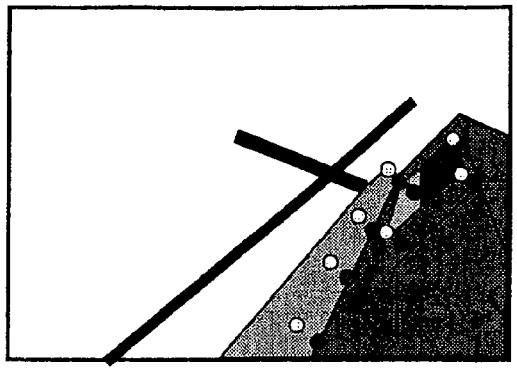
Figure 58:
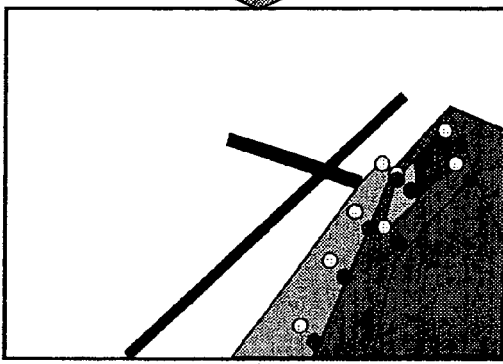
Figure 58:
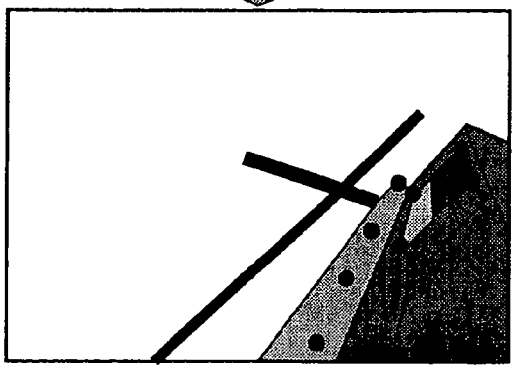

FIG. 58 is a conceptual diagram showing the situation that the calibration is performed by using the guide data using a point source of light.

FIG. 59 is a conceptual diagram showing the situation that the calibration is performed by using the guide data using an edge line.

Figure 60:
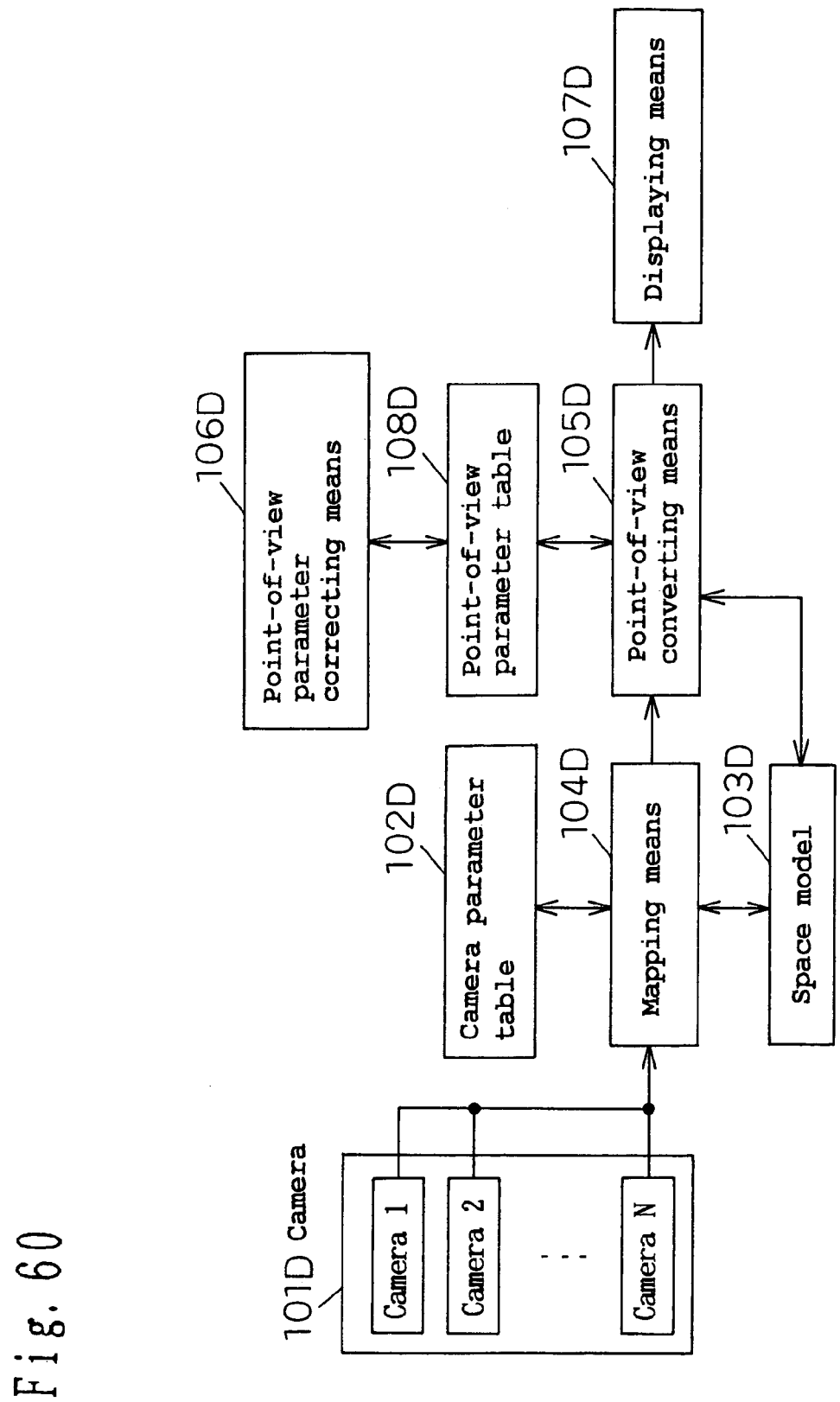

FIG. 60 is a block diagram showing an example of the configuration of an image generating apparatus in accordance with the present invention (Claim 55).

FIG. 61 is a diagram showing the data stored in a point-of-view parameter table 108D, in the form of a table.

Figure 62:
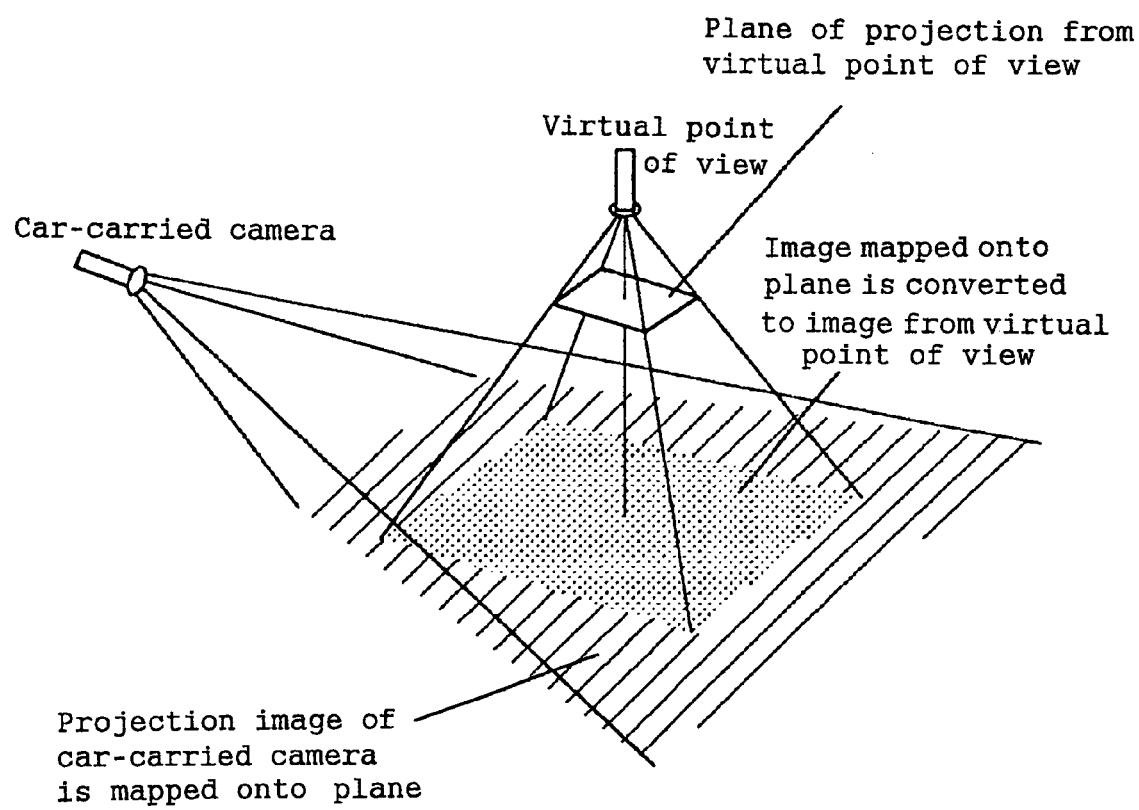

FIG. 62 is a conceptual diagram showing the situation that the image from a car-carried camera is converted to an image viewed from a virtual point of view.

Figure 63:
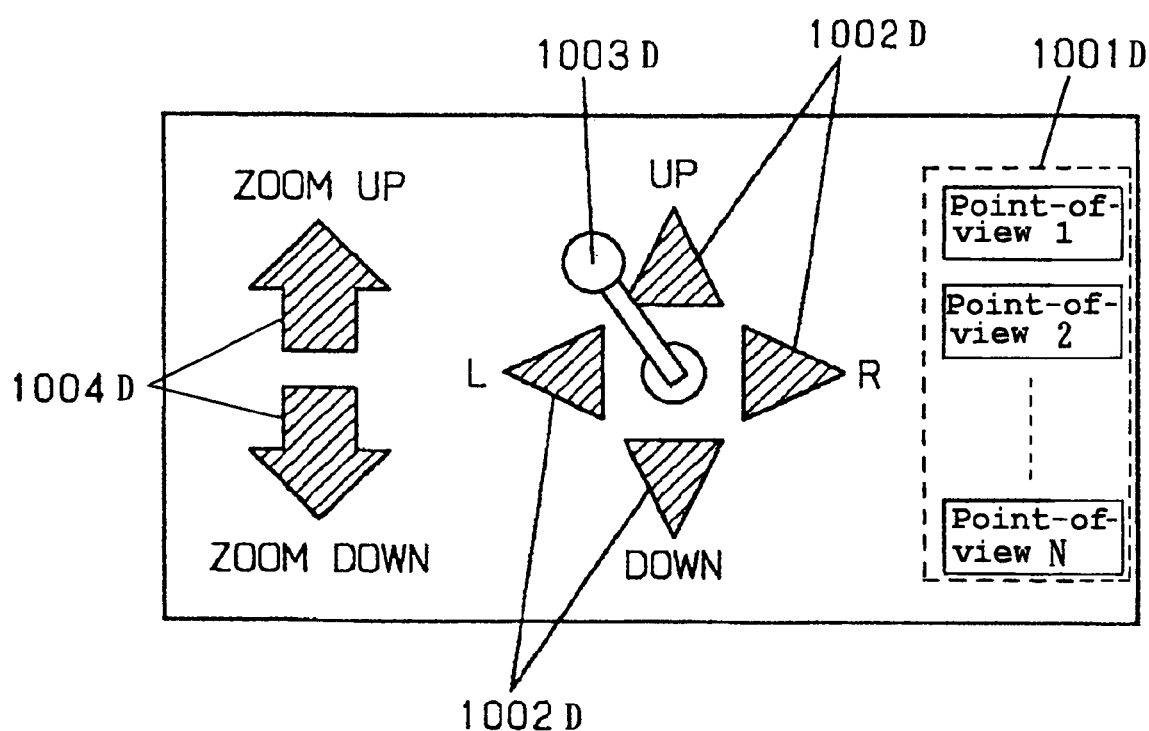

FIG. 63 is a conceptual diagram showing an example of the configuration of an operating section for correcting a point-of-view parameter by point-of-view parameter correcting means 106D.

Figure 64:
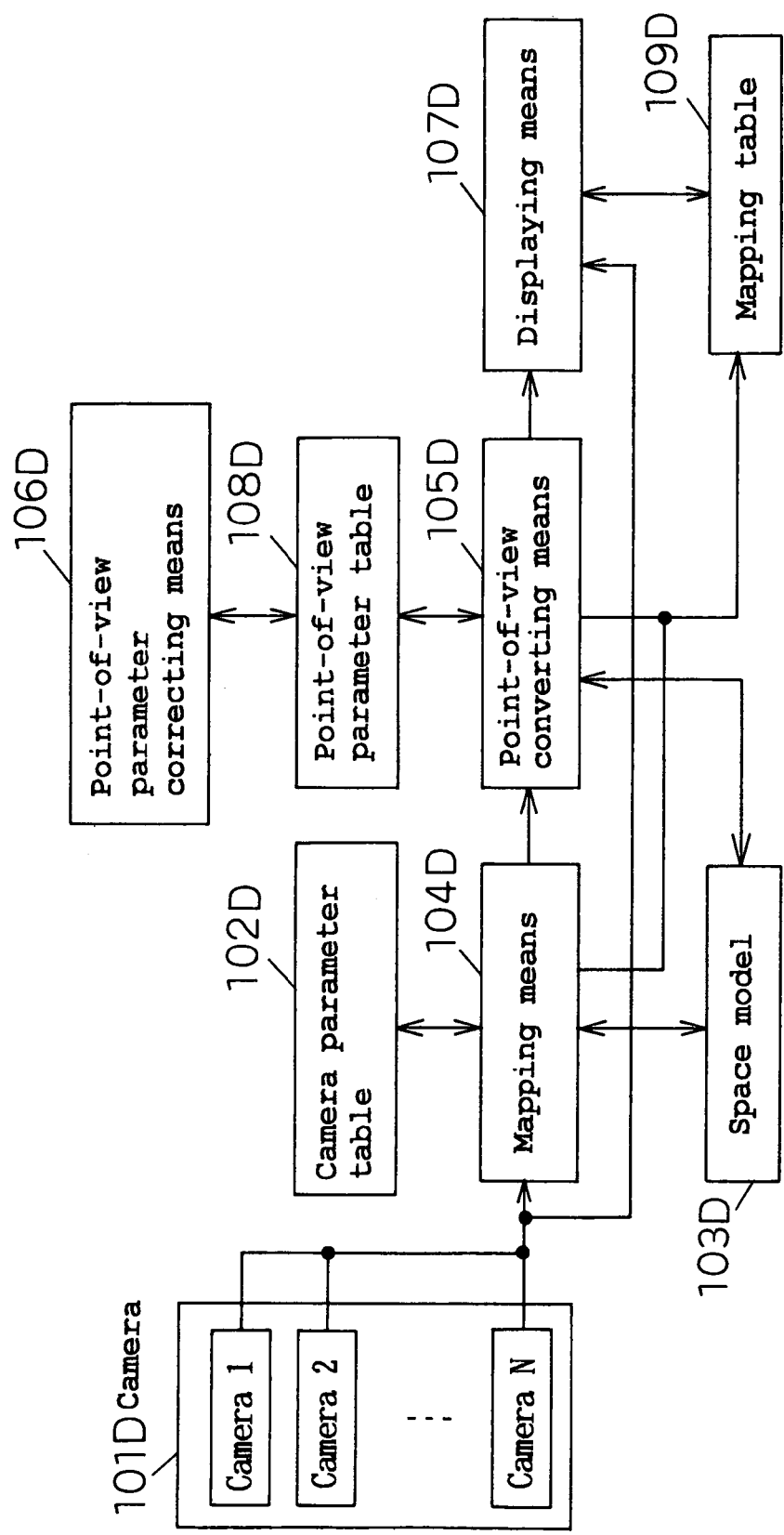

FIG. 64 is a block diagram showing an example of the configuration of an art relevant to an image generating apparatus in accordance with the present invention.

FIG. 65 shows:

(a) a block-diagram showing an example of the configuration of an art relevant to an image generating apparatus in accordance with the present invention;

(b) a conceptual diagram showing an example of a car-carried camera synthesized image before point-of-view parameter correction; and (c) a conceptual diagram showing an example of a car-carried camera synthesized image after point-of-view parameter correction FIGS. 66(a) to 66(c) are conceptual diagrams showing a method of altering a mapping table 109D.

Figure 67:
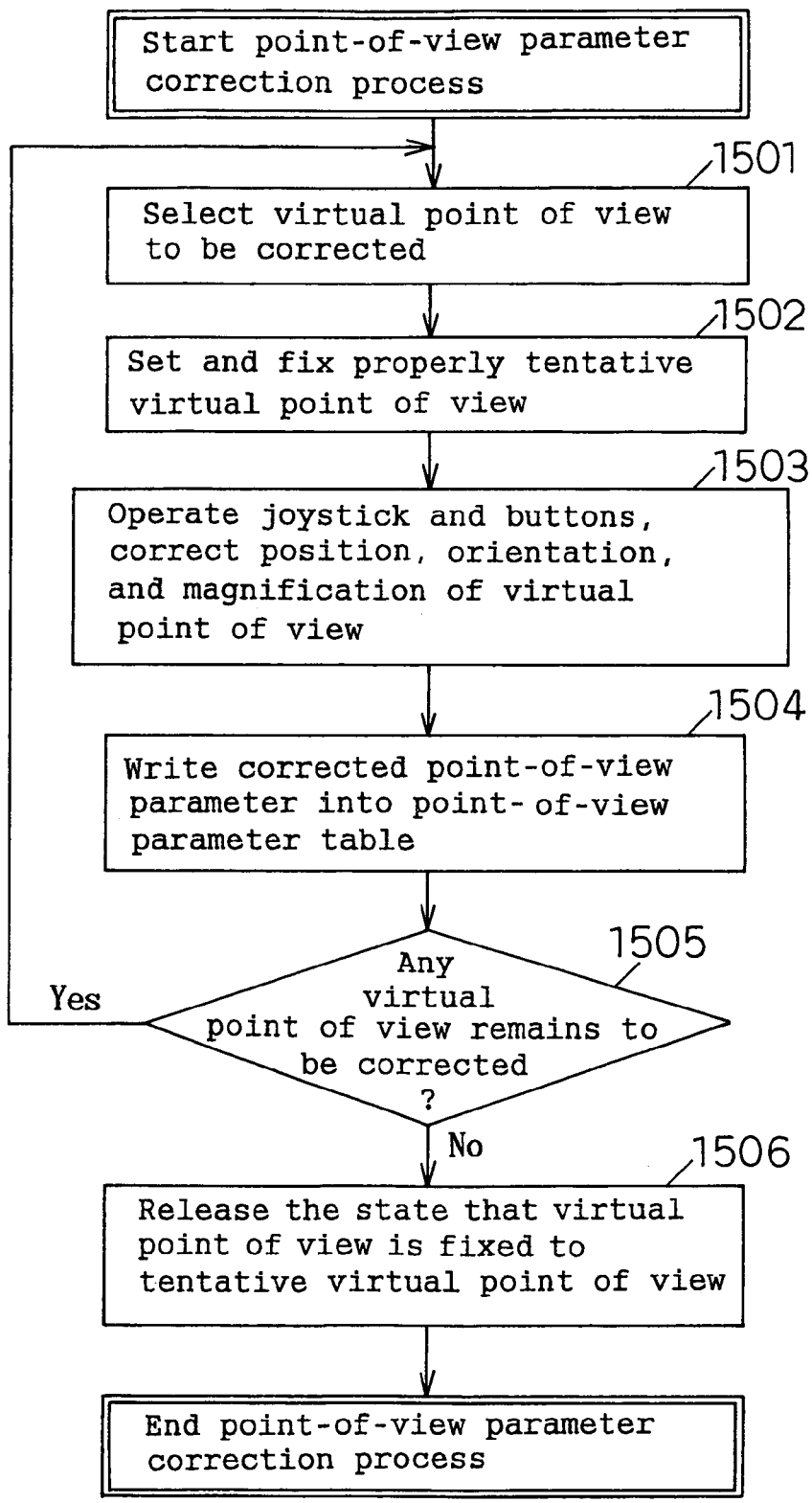

FIG. 67 is a flow chart showing the flow of the process of correcting a point-of-view parameter.

Figure 68:
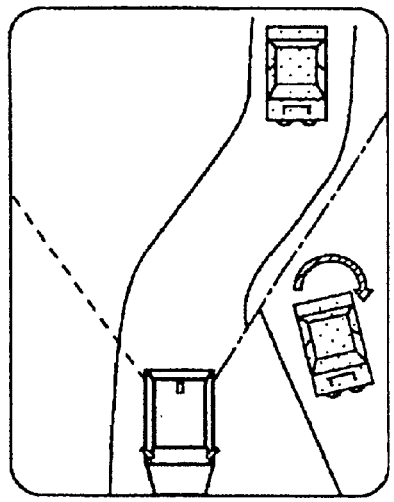
Figure 68:
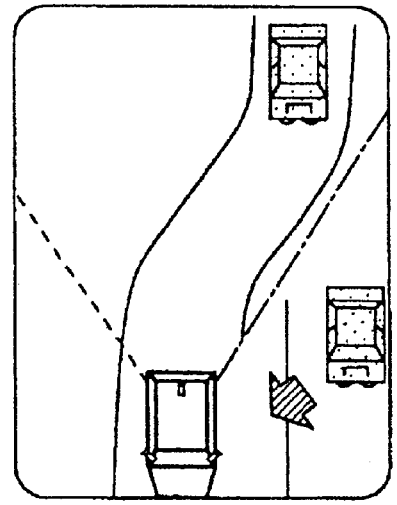
Figure 68:
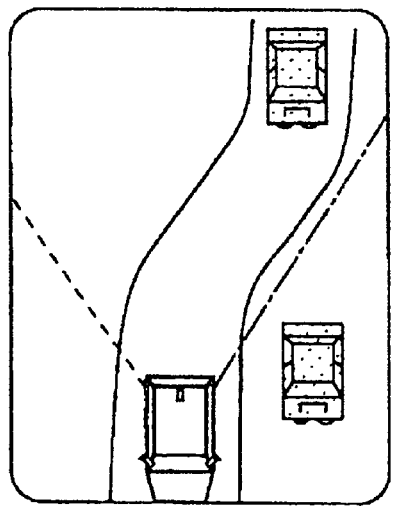

FIGS. 68(a) to 68(c) are conceptual diagrams showing the process of correcting a point-of-view parameter.

Figure 69:
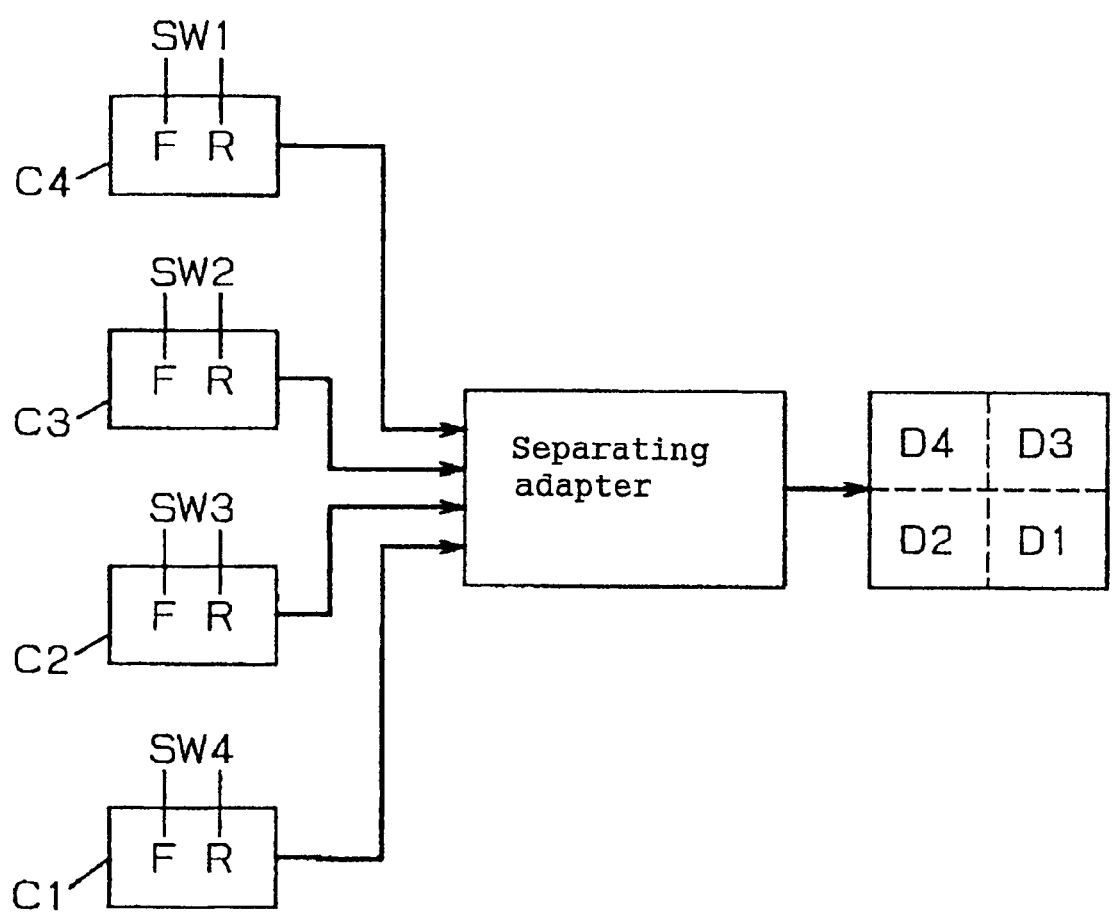

FIG. 69 is a block diagram showing an example of the configuration of a prior art image generating apparatus.

Figure 70:
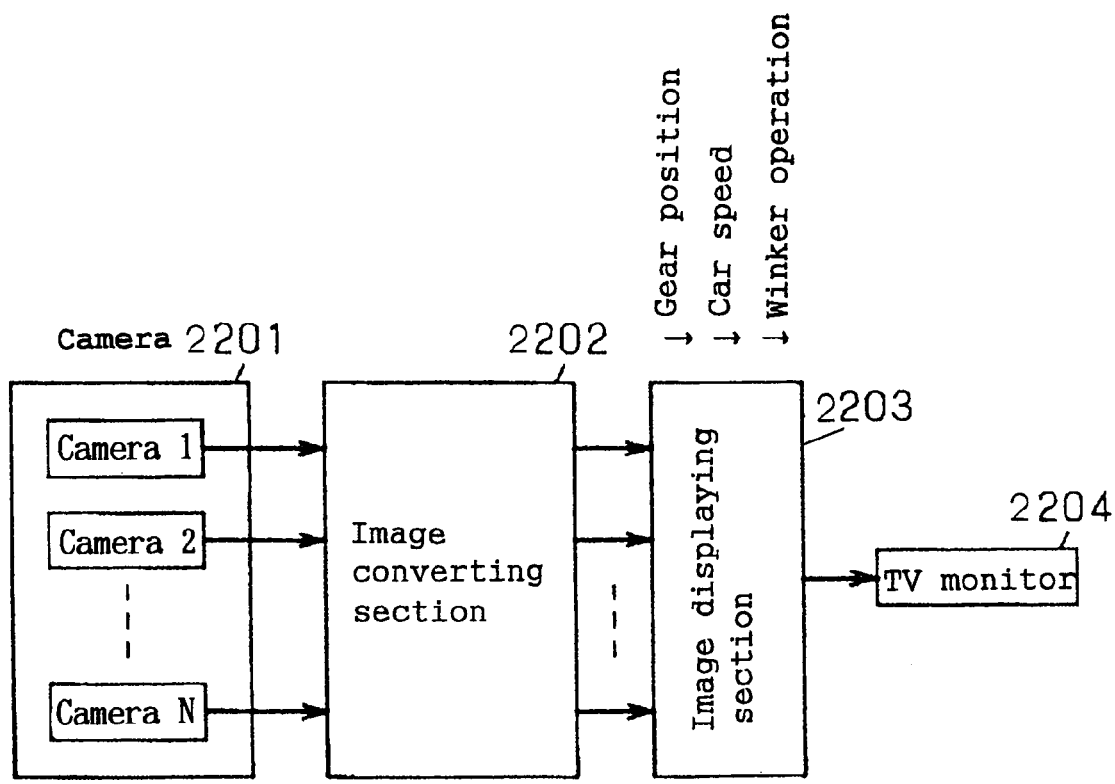

FIG. 70 is a block diagram showing an example of the configuration of a prior art apparatus for monitoring the surroundings of a vehicle.

LEGEND OF REFERENCE NUMERALS

101 Camera
102 Calibrating means
103 Camera parameter table
104 Space reconstructing means
105 Space data buffer
106 Point-of-view converting means
107 Displaying means
108 Characteristic point extracting means
109 Characteristic point generating means
110 Temperature sensor
111 Temperature correction table
112 Movement direction detecting means
113 Movement distance detecting means
114 Space data converting means
115 Correction history recording means
116 Camera correction indicating means
101A Camera
102A Camera parameter table
103A Space model generating means
104A Mapping means
105A Point-of-view converting means
106A Displaying means
107A Distance sensor
108A Obstacle detecting means
101B Camera
102B Camera parameter table
103B Road-surface characteristics detecting means
104B Space model generating means
105B Mapping means
106B Point-of-view converting means
107B Displaying means
108B Movement distance detecting means
109B Movement direction detecting means
110B Characteristics correcting means
101C Camera
102C Camera parameter table
103C Space model
104C Mapping means
105C Point-of-view converting means
106C Camera parameter correcting means
107C Displaying means
108C Mapping table
901C Camera selection button
902C Parallel displacement button
903C Joystick
904C Zoom button
101D Camera
102D Camera parameter table
103D Space model
104D Mapping means
105D Point-of-view converting means
106D Point-of-view parameter correcting means
107D Displaying means 108D Point-of-view parameter table
109D Mapping table
110D Mapping table correcting means
111D Buffer
1001D Camera selection button
1002D Parallel displacement button
1003D Joystick
1004D Zoom button

BEST MODE FOR CARRYING OUT THE INVENTION

The basic configuration of the present invention is characterized by comprising: a camera or a plurality of cameras; a camera parameter table for storing the camera parameters indicating the characteristics of said camera or cameras; space reconstructing means of mapping the image input from said camera, into a space model of three-dimensional space depending on said camera parameters thereby generating space data; a space data buffer for temporarily storing the space data generated by said space reconstructing means; point-of-view converting means of synthesizing an image viewed from an arbitrary point of view by referencing to said space data; and displaying means of displaying the image converted by said point-of-view converting means.

A first application configuration of an image generating apparatus in accordance with the present invention is characterized by comprising calibrating means for obtaining the camera parameters indicating the camera characteristics by an input or a calculation.

A second application configuration of an image generating apparatus in accordance with the present invention is characterized by comprising: characteristic point generating means of generating, within the field of view of the camera, a plurality of points the three-dimensional coordinates of which are identifiable; and characteristic point extracting means of extracting those characteristic points.

A third application configuration of an image generating apparatus in accordance with the present invention is characterized by comprising a temperature sensor and a temperature correction table.

A fourth application configuration of an image generating apparatus in accordance with the present invention is characterized by comprising: movement direction detecting means of detecting the direction of the movement of a vehicle; movement distance detecting means of detecting the distance of the movement of the vehicle in a unit time; and space data converting means of converting the space data stored in said space data buffer using the direction and the distance of the movement of the vehicle.

A fifth application configuration of an image generating apparatus in accordance with the present invention is characterized by comprising: camera correction indicating means of indicating a camera calibration to the driver when detecting a situation requiring the calibration of the camera; and correction history recording means of recording the date, time, and running distance when the camera calibration was performed.

An image generating method of the present invention is characterized by comprising: a space reconstructing step of reconstructing the space data in which each pixel constituting the image input from a camera is corresponded to a point of the three-dimensional space depending on the camera parameters indicating the camera characteristics; and a point-of-view converting step of synthesizing an image viewed from an arbitrary point of view by referencing to said space data.

A first application configuration of an image generating method in accordance with the present invention is characterized by comprising a calibrating step for obtaining the camera parameters indicating said camera characteristics by an input or a calculation and for correcting said camera parameters depending on the temperature when necessary.

A second application configuration of an image generating method in accordance with the present invention is characterized by comprising a characteristic point extracting step of extracting a plurality of characteristic points necessary for the calculation of said camera parameters in said calibrating means.

A third application configuration of an image generating method in accordance with the present invention is characterized by comprising a characteristic point generating step of generating, within the field of view of the camera, a plurality of points the three-dimensional coordinates of which are identifiable.

A fourth application configuration of an image generating method in accordance with the present invention is characterized by comprising: a movement direction detecting step of detecting the direction of the movement of a vehicle; a movement distance detecting step of detecting the distance of the movement of the vehicle in a unit time; and a space data converting step of converting said space data using the direction of the movement of the vehicle detected in said movement direction detecting step and the distance of the movement of the vehicle detected in said movement distance detecting means.

A fifth application configuration of an image generating method in accordance with the present invention is characterized by comprising: a camera correction indicating step of indicating a camera calibration to the driver when detecting a situation requiring the calibration of the camera; and a correction history recording step of recording the date, time, and running distance when the camera calibration was performed.

An image generating apparatus of the present invention (an example of Claim 1) performs the procedure consisting of the following three steps, thereby composing the respective fields of view of plural cameras installed, thereby synthesizing a single image.

1. The space reconstructing means calculates the correspondence relation between each pixel constituting an image obtained from a camera and a point in the three-dimensional coordinate system, thereby generating the space data. Said calculation is performed for all the pixels of the images obtained by the cameras.

2. The point-of-view converting means indicates a desired point of view. That is, it indicates from what position, in what angle, and in what magnification in said three-dimensional coordinate system the image is required to view.

3. The point-of-view converting means also reproduces the image viewed from said point of view using said space data, and the displaying means displays it.

In an example of an image generating apparatus in accordance with the combination of the inventions described in Claims 8, 9, and 12, the characteristic point generating means generates a plurality of points the three-dimensional coordinates of which are identifiable, in the surroundings of a body of a vehicle and the like. The characteristic point extracting means extracts those characteristic points, thereby automatically obtaining the camera parameters indicating the characteristics of each camera.

An image generating apparatus of the present invention (an example of Claim 14) comprises a temperature sensor and a temperature correction table, thereby correcting the slight lens distortion which occurs due to the rise or fall of the temperature, thereby optimizing the lens.

An image generating apparatus of the present invention (an example of Claim 17) provides a method of viewing the image of a part which is a dead angle of a camera, as an example of the application of the image generating apparatus to a vehicle. That is, the movement direction and the movement distance of the vehicle are detected, and the previously acquired image is converted into an image viewed from the present position using a calculation formula obtained from the detection result. More specifically, the space data of a place which was seen previously but is unseen presently is supplied by converting, through the space data converting means, the space data of the image of said place previously shot which is stored as space data in the space data buffer.

An image generating apparatus of the present invention (an example of Claim 18), which is an example of the application of the image generating apparatus to a vehicle, detects a situation requiring a camera calibration or the correction of camera parameters indicating the camera characteristics, and informs it to the driver.

An embodiment of the present invention is described below with reference to the drawings. The present embodiment is described for an image generating apparatus in which cameras are provided for monitoring the surroundings of a vehicle and the image acquired by the cameras is displayed on a TV monitor installed near the driver's seat.

Figure 1:
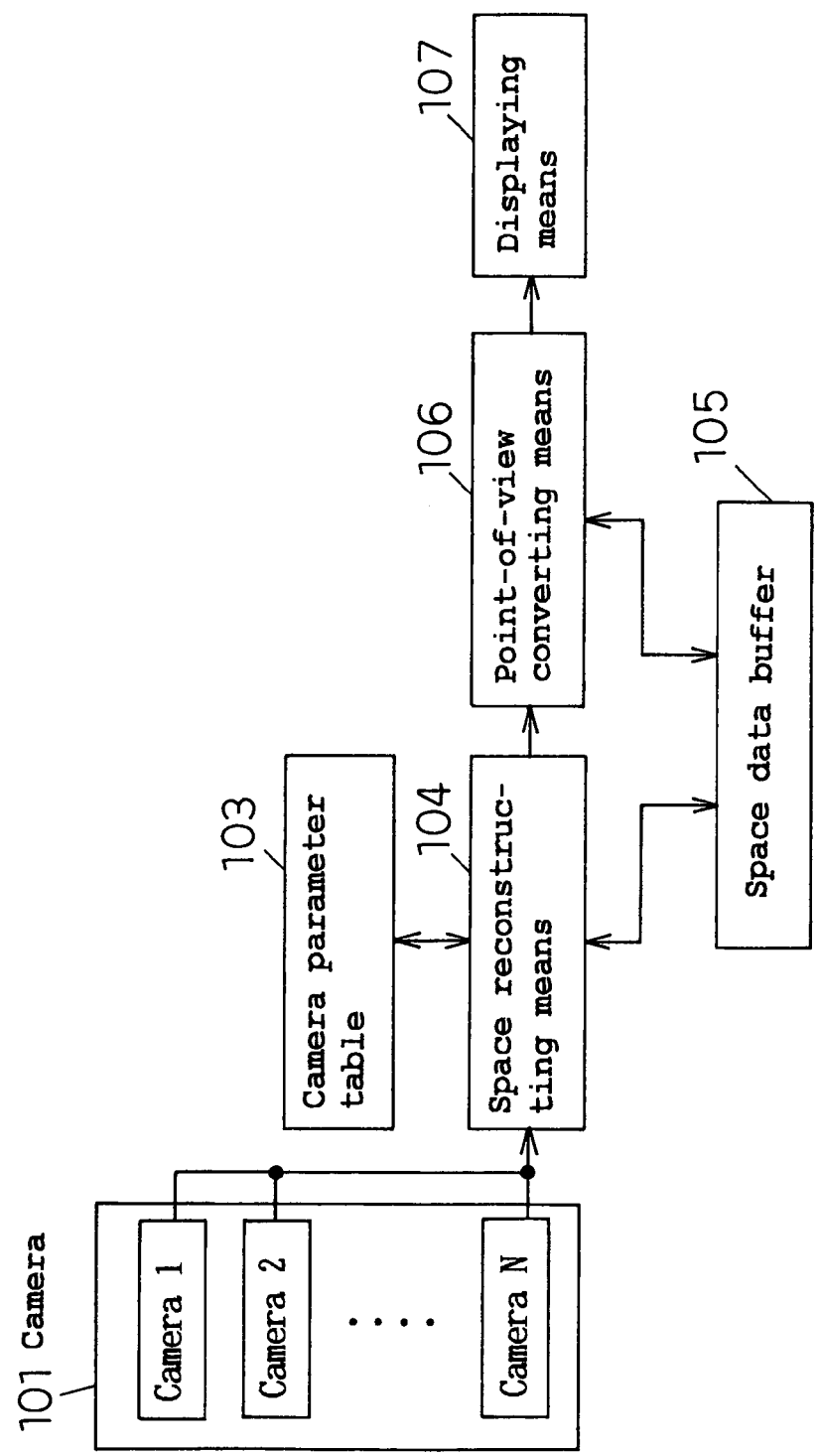
FIG. 1 is a block diagram showing an example of the basic configuration of an image generating apparatus in accordance with the present invention (Claim 1).

FIG. 1 is a block diagram showing an example of the basic configuration of an image generating apparatus in accordance with the present invention (Claim 1).

An image generating apparatus in accordance with the present invention, as an example of the basic configuration, comprises: a plurality of cameras 101 attached for grasping the situation of a monitoring objective region; a camera parameter table 103 for storing the camera parameters indicating the characteristics of said cameras; space reconstructing means 104 of generating space data in which the image input from said camera is mapped into a space model of three-dimensional space depending on said camera parameters; a space data buffer 105 of temporarily storing the space data generated by said space reconstructing means 104; point-of-view converting means 106 of synthesizing an image viewed from an arbitrary point of view by referencing to the space data; and displaying means 107 of displaying the image converted by said point-of-view converting means 106.

Figure 2:
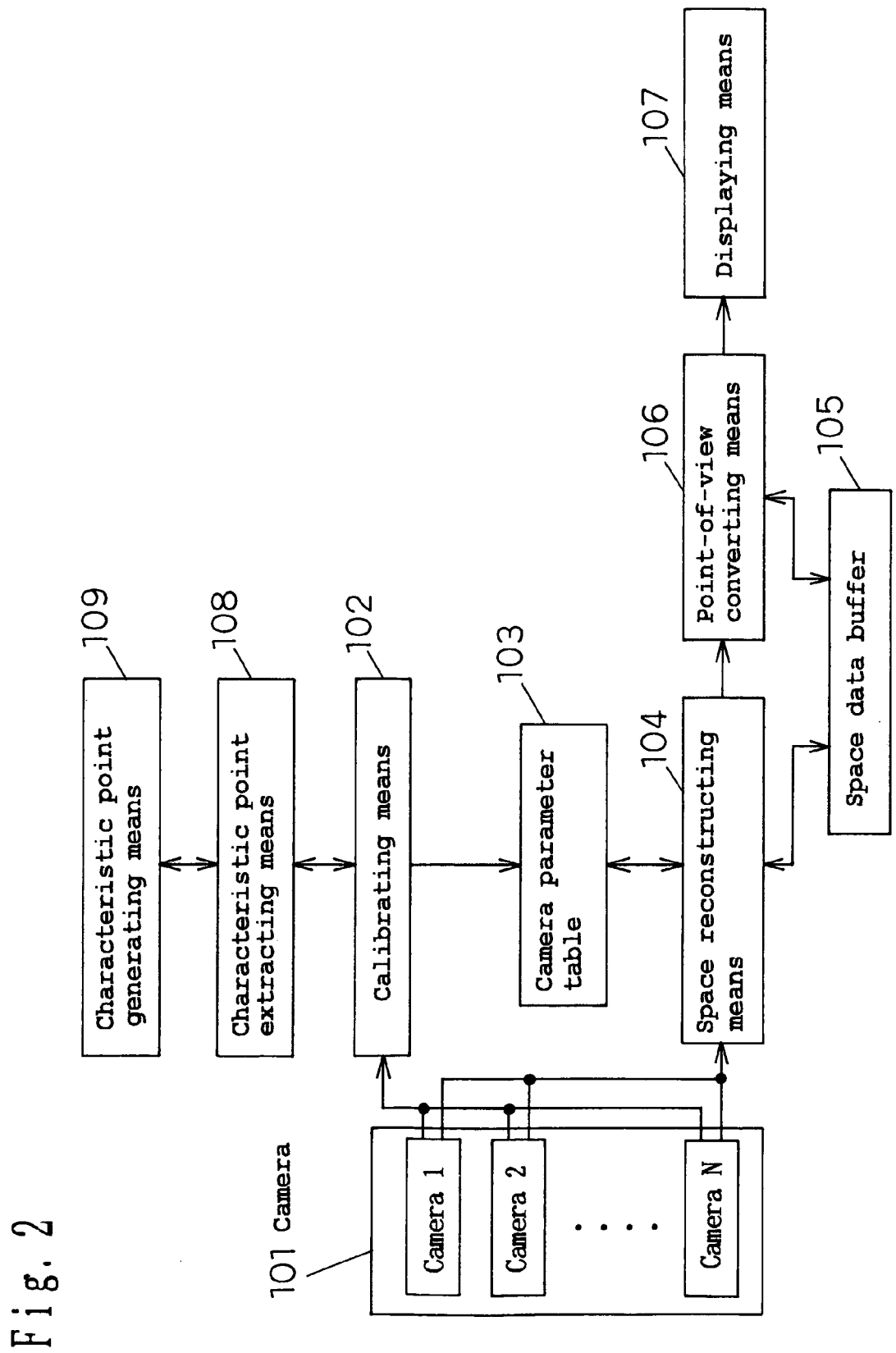
FIG. 2 is a block diagram showing an example of the configuration of an image generating apparatus in accordance with the combination of the present inventions of Claims 8, 9 and 12 [sic; 8,9 and 12].

FIG. 2 is a block diagram showing an example of the configuration of an image generating apparatus in accordance with the combination of the present inventions described in Claims 8, 9 and 12.

In the example of FIG. 2, the image generating apparatus shown in FIG. 1 further comprises: calibrating means 102 of obtaining the camera parameters indicating said camera characteristics, such as a camera attachment position, a camera attachment angle, a camera lens distortion correction value, and a camera lens focal length, by an input or a calculation; characteristic point generating means 109 of generating, within the field of view of said camera, a plurality of points the three-dimensional coordinates of which are identifiable; and characteristic point extracting means 108 of extracting those characteristic points; thereby permitting to easily obtain the camera parameters indicating the characteristics of each camera.

The detail of a method for obtaining the camera parameters by the function of the characteristic point generating means 109 and the characteristic point extracting means 108 is described later.

Figure 3:
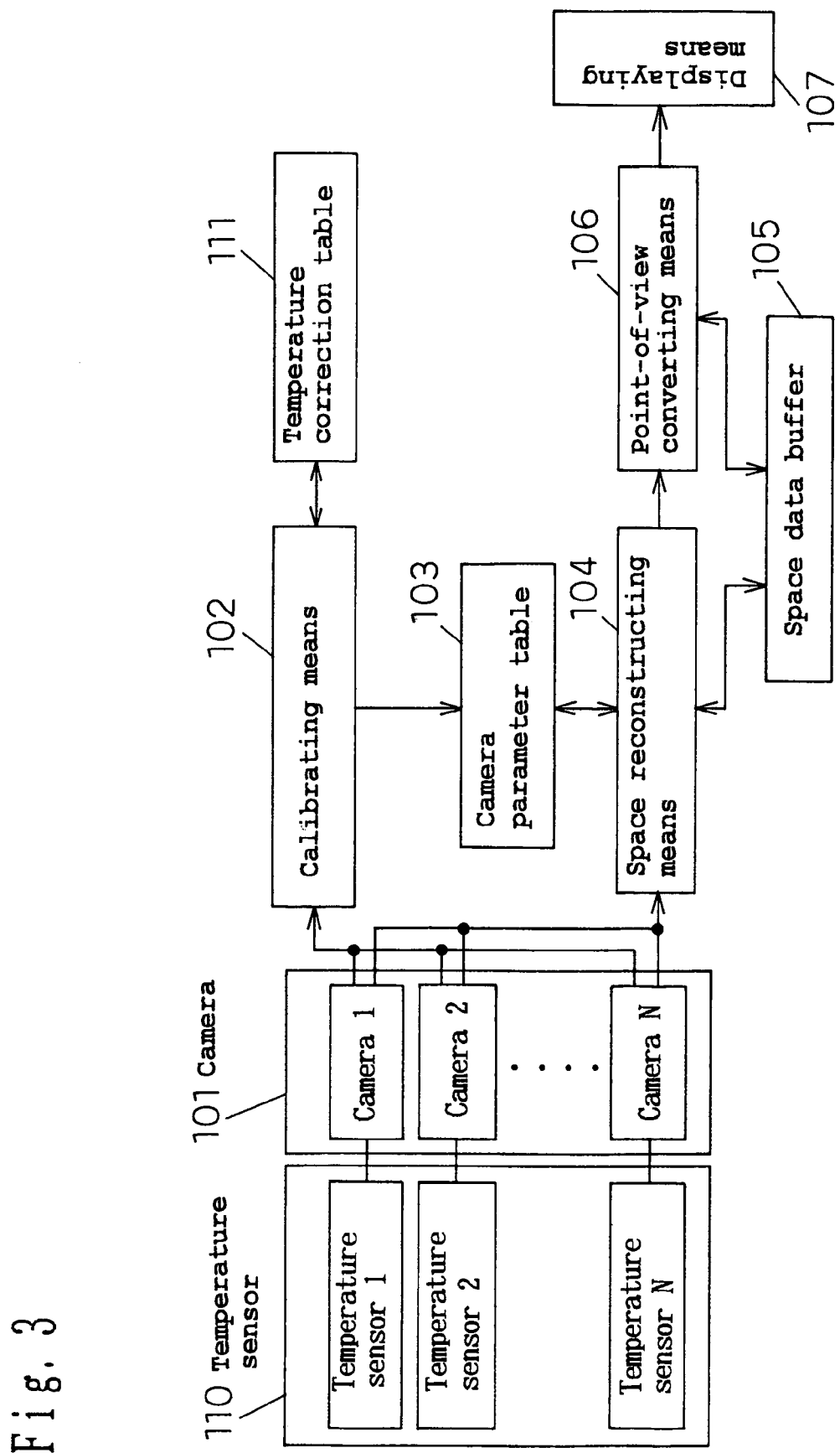
FIG. 3 is a block diagram showing an example of the configuration of an image generating apparatus in accordance with the present invention (Claim 14).

FIG. 3 is a block diagram showing an example of the configuration of an image generating apparatus in accordance with the present invention (an example of Claim 14). In the example of FIG. 3, the image generating apparatus shown in FIG. 1 further comprises a temperature sensor 110 and a temperature correction table 111, thereby permitting to correct the slight lens distortion which occurs due to the rise or fall of the temperature, thereby optimizing the lens. The detail of a method of correcting the lens distortion due to the temperature by the calibrating means 102 is described later.

Figure 4:
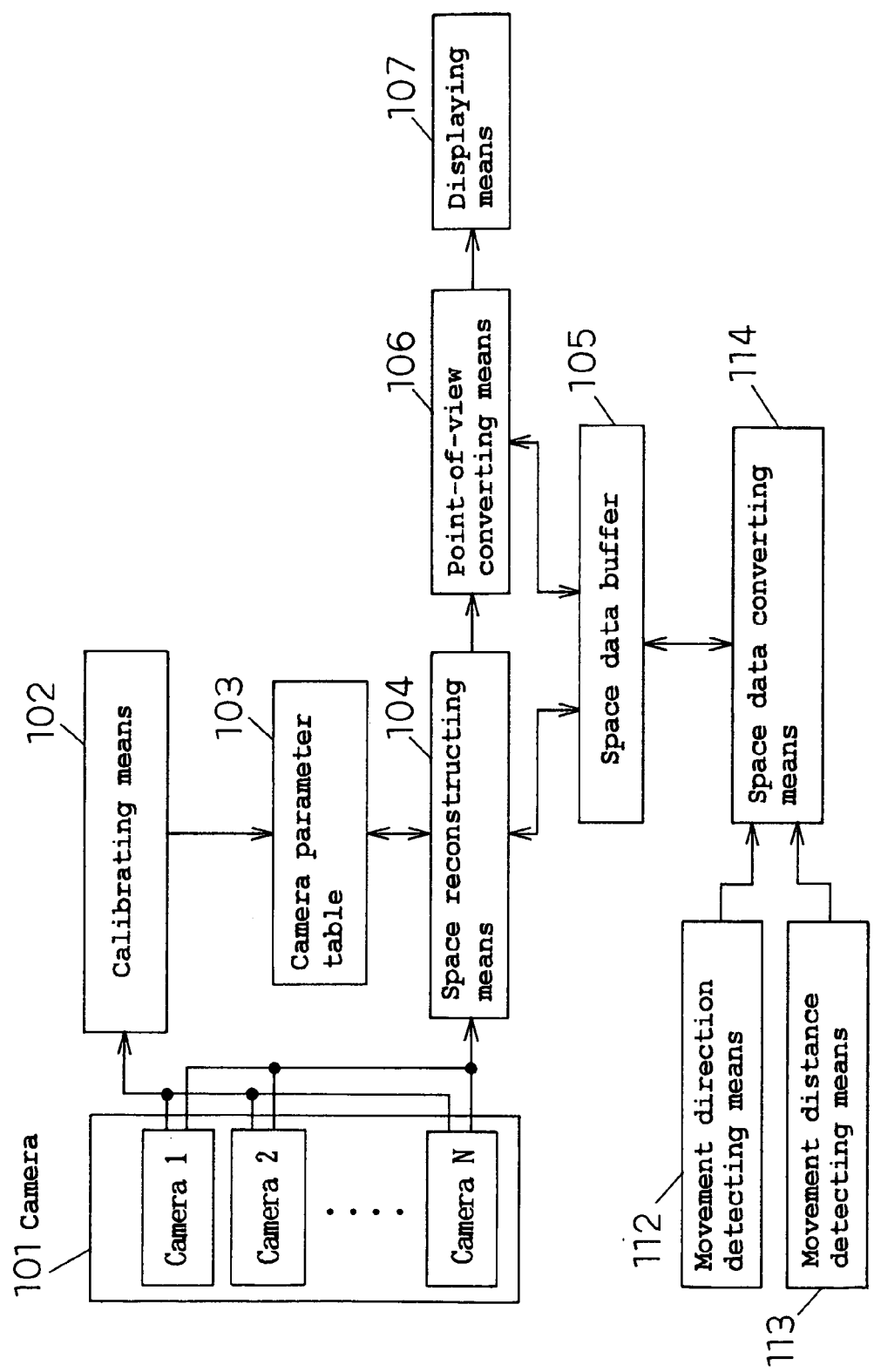
FIG. 4 is a block diagram showing an example of the configuration of an image generating apparatus in accordance with the present invention (Claim 17).

FIG. 4 is a block diagram showing an example of the configuration of an image generating apparatus in accordance with the present invention (an example of Claim 17). FIG. 4 is an example of the configuration of an image generating apparatus as an example of the application to a vehicle. The image generating apparatus shown in FIG. 1 further comprises: movement direction detecting means 112 of detecting the direction of the movement of a vehicle; movement distance detecting means 113 of detecting the distance of the movement of the vehicle in a unit time; and space data converting means 114 of converting the space data stored in said space data buffer using the direction and the distance of the movement of the vehicle.

Using these means, the space data of a place which was seen previously but is unseen presently can be supplied by converting, through the space data converting means 114 constituting the present invention, the space data of the previously seen image which is stored as space data in the space data buffer 105. The detail of a method of supplying is described later.

Figure 5:
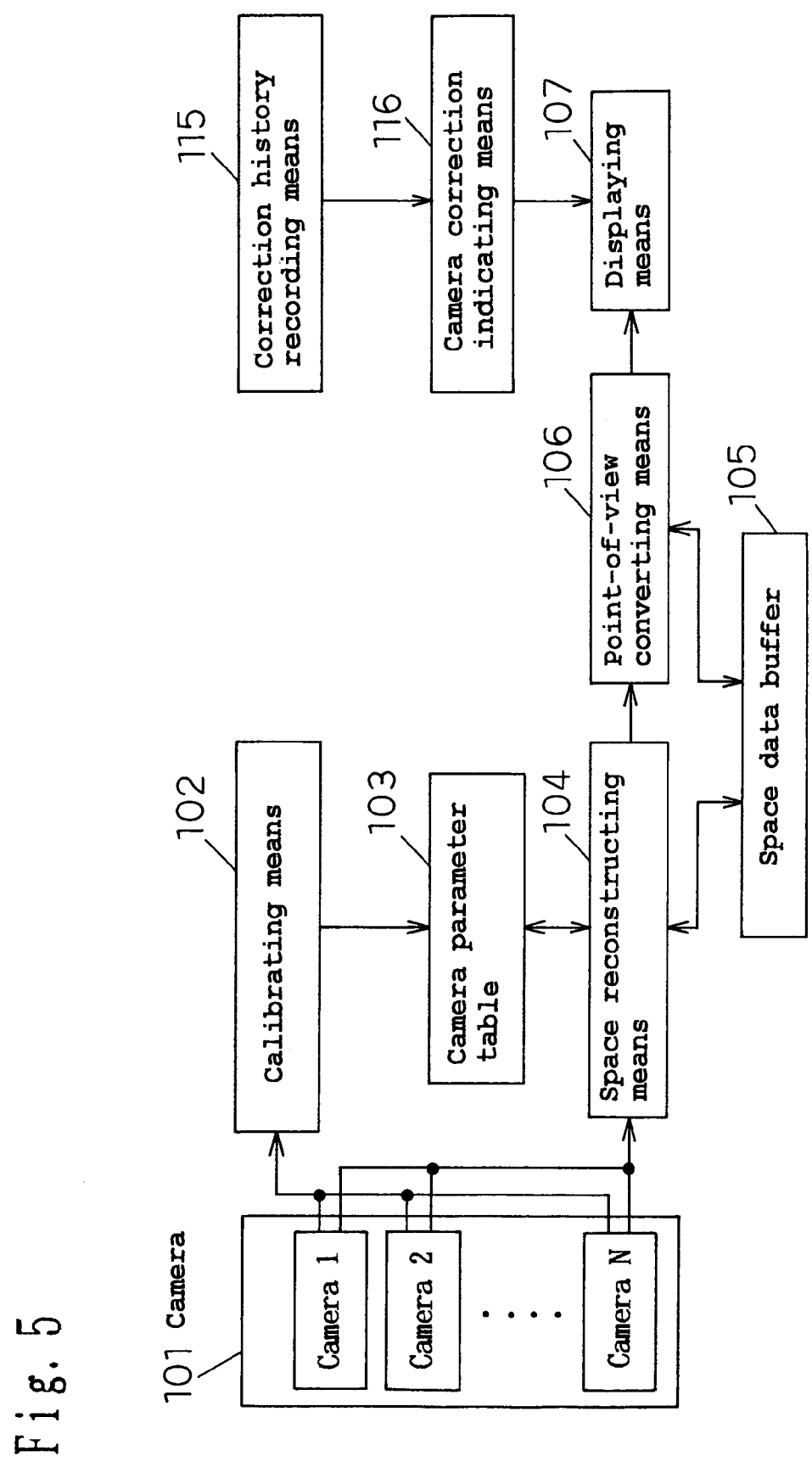
FIG. 5 is a block diagram showing an example of the configuration of an image generating apparatus in accordance with the present invention (Claim 18).

FIG. 5 is a block diagram showing an example of the configuration of an image generating apparatus in accordance with the present invention (an example of Claim 18) as an example of the application to a vehicle.

In the example of the apparatus of FIG. 5, the image generating apparatus shown in FIG. 1 further comprises: camera correction indicating means 116 of indicating a camera calibration to the driver when detecting a situation requiring the calibration of the camera; and correction history recording means 115 of recording the date, time, and running distance when the camera calibration was performed. Using these means, a situation requiring a camera calibration or the correction of camera parameters indicating the camera characteristics is detected and informed to the driver.

Figure 6:
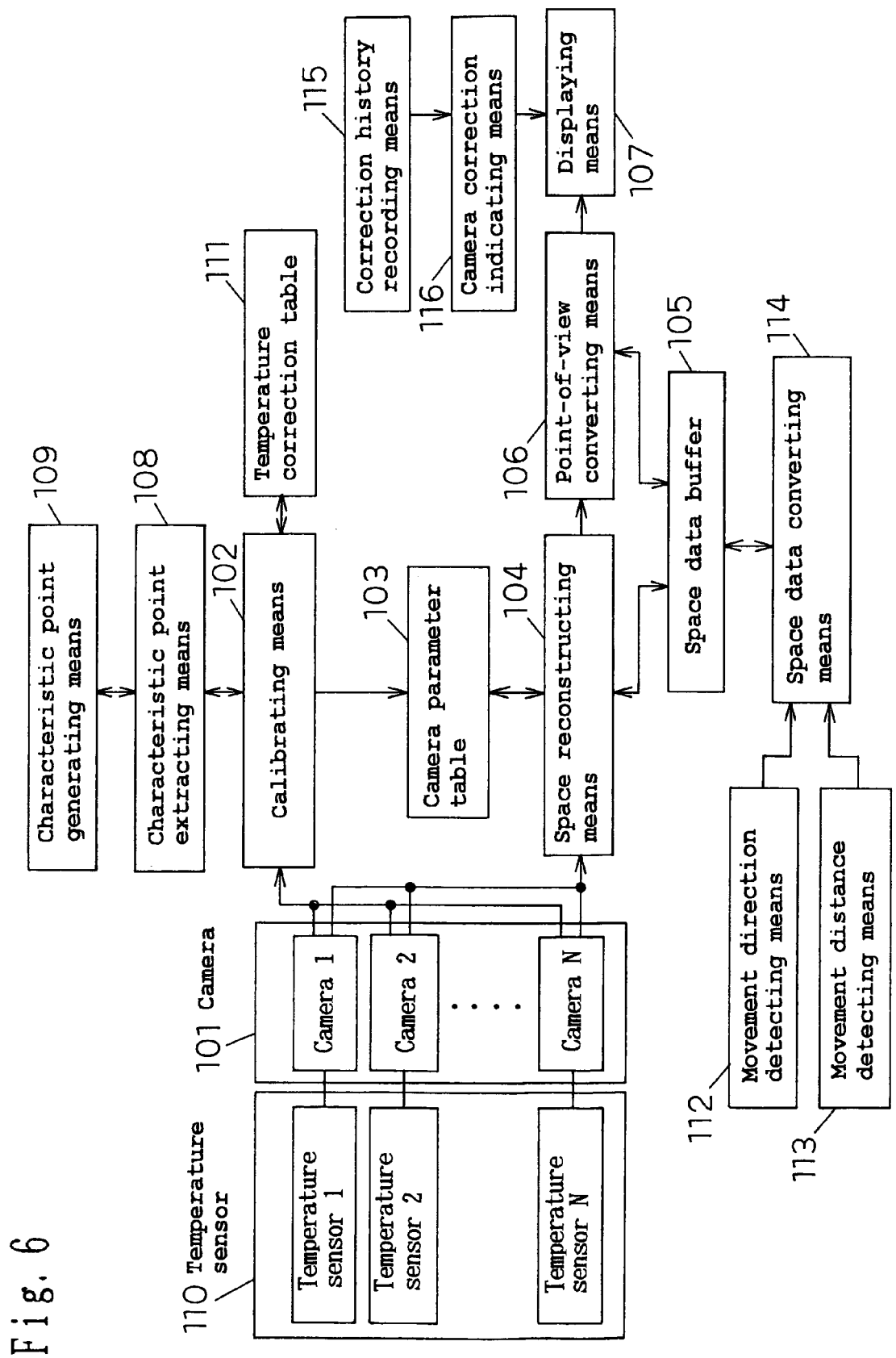
FIG. 6 is a block diagram showing an image generating apparatus as the integration of FIGS. 1 to 5.

FIG. 6 is a block diagram showing an image generating apparatus as the integration of FIGS. 1 to 5. This is an example of a combination of the image generating apparatuses of FIGS. 1 to 5, and permits the utilizing of the integrated effects obtained by respective configurations. At the last of the present invention, an example of the operation of an image generating apparatus in accordance with the present invention will be described with reference to the configuration example of this FIG. 6.

The detail of each component constituting the present invention is described below.

Figure 7:
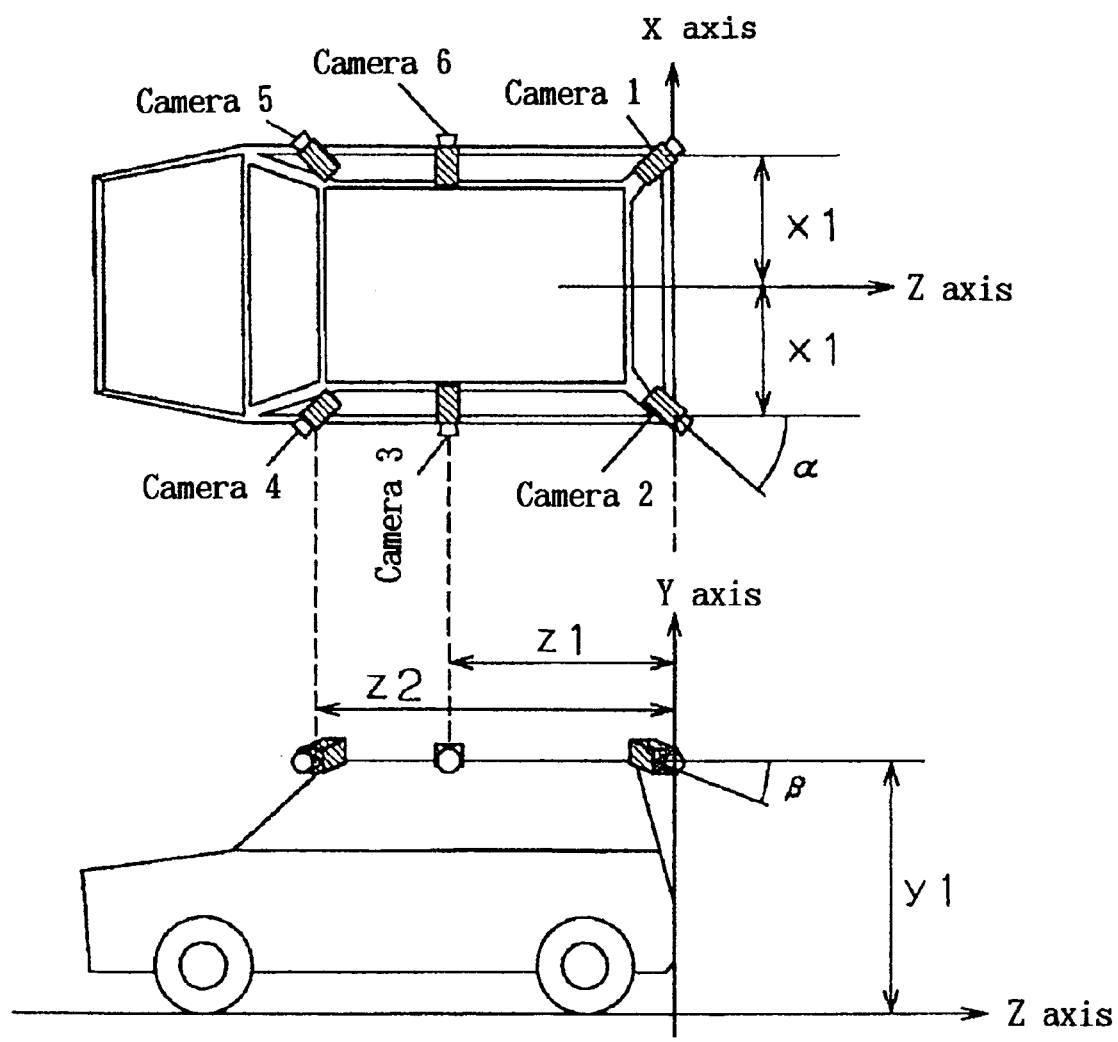
FIG. 7 is a conceptual diagram showing an example of the mounting of a camera onto a vehicle.

The camera is a TV camera for shooting an image of a space to be monitored, such as the surroundings of a vehicle. The camera used has preferably a large angle of field in order to obtain a large field of view. FIG. 7 is a conceptual diagram showing an example of the attaching of a camera onto a vehicle.

FIG. 7 shows an example in which six cameras are installed on the roof of a vehicle so as to overviewing the surroundings from the vehicle. When the attachment position onto the vehicle is a boundary portion between the roof and the side surface or between the roof and the rear surface as shown in the example of FIG. 7, a wide field of view is obtained and a smaller number of cameras will do.

The calibrating means 102 in accordance with the present invention performs camera calibration. The camera calibration is the process of determining and correcting the camera parameters indicating said camera characteristics, such as a camera attachment position and a camera attachment angle in the real three-dimensional world, a camera lens distortion correction value, and a camera lens focal length, for each camera installed in the real three-dimensional world.

The camera parameter table 103 in accordance with the present invention is a table for storing the camera parameters obtained by the calibrating means 102 (the detail of the process is described later).

As a preparation for the detailed description of the camera parameter table 103, a three-dimensional space coordinate system is defined. The above-mentioned FIG. 7 is a conceptual diagram showing the situation of the installation of cameras onto a vehicle, and showing a three-dimensional space coordinate system based on the vehicle. In the example of FIG. 7, a three-dimensional space coordinate system as an example of the three-dimensional space coordinate system is defined by:

X axis which is the straight line on the road surface just below the rear surface of the vehicle, parallel to the rear surface, Y axis which is the axis extending vertically form the road surface in the center of the rear surface of the vehicle, and Z axis which is a straight line on the road surface, perpendicular to the rear surface, through the center of the rear surface of the vehicle.

The orientation of the camera in this coordinate system is expressed using α and β defined as follows.

α is the angle relative to the Y-Z plane, and
β is the angle relative to the X-Z plane.

The three-dimensional space coordinate system, the world coordinate system, and simply, the three-dimensional space hereafter refer to the three-dimensional space coordinate system defined above, unless otherwise mentioned.

FIG. 9 is a diagram showing the data stored in the camera parameter table 103, in the form of a table. The contents described in FIG. 9 is as follows, in the sequence starting from the left column of the table. As shown below, the items in the second to the ninth columns in this table show an example of the camera parameters.

First column: number of a car-carried camera of FIG. 7

Second column: X coordinate of a camera position in the three-dimensional space coordinate system Third column: Y coordinate of a camera position in the three-dimensional space coordinate system Fourth column: Z coordinate of a camera position in the three-dimensional space coordinate system Fifth column: angle α relative to the Y-Z plane, among the camera orientation Sixth column: angle β relative to the X-Z plane, among the camera orientation Seventh column: focal length of a camera in the three-dimensional space coordinate system Eighth column: distortion coefficient κ1 in the radial direction of a lens Ninth column: distortion coefficient κ2 in the radial direction of a lens For example, the parameters of the camera 1 of FIG. 7 are described in the second line of the camera parameter table 103 of FIG. 9. The contents indicates that the camera 1 is located at a coordinates (x1, y1, 0), that the orientation is 45 degrees relative to the Y-Z plane and −30 degrees relative to the X-Z plane, that the focal length is f1, and that the lens distortion coefficients κ1 and κ2 are both zero.

Similarly, the parameters of a virtual camera are described in the eighth line of the camera parameter table 103 of FIG. 9. The contents indicates that the virtual camera is located at a coordinates (0, y1, 0), that the orientation is 0 degree relative to the Y-Z plane and −20 degrees relative to the X-Z plane, that the focal length is f, and that the lens distortion coefficients κ1 and κ2 are both zero.

The virtual camera is a concept introduced in the present invention. Although a prior art image generating apparatus can display only an image obtained by an actually installed camera, an image generating apparatus in accordance with the present invention permits to obtain an image viewed from the virtual camera located arbitrarily, by calculation using the space reconstructing means 104 and the point-of-view converting means 106 described later in detail. A method of this calculation is also described later in detail.

The calibrating means 102 in accordance with the present invention performs camera calibration. That is the determination of said camera parameters. The methods of the determination include a method in which all the data is manually input directly using an inputting device such as a key board and a mouse, a method in which some of the calibration data is obtained by calculation, and the like.

The camera parameters are the parameters indicating said camera characteristics, such as a camera attachment position and a camera attachment angle in a reference coordinate system, a camera lens distortion correction value, and a camera lens focal length. When a large number of sets of the points where the correspondence relation between the characteristic point in the image shot by a camera and the position of said characteristic point within said reference coordinate system is established are known, said parameters can be obtained approximately by calculation. In other words, in order to obtain the camera parameters by calculation, a plurality of sets of the points where the correspondence relation between the point in the image shot by the camera and the position of that point within the three-dimensional space coordinate system is established are necessary. The minimum number of the required sets depends on the calculation method used. For example, a method of obtaining the camera parameters used in the example of FIG. 9 by calculation is disclosed in the literature "Matsuyama, Kuno, and Imiya, 'Computer vision: a technical critique and a perspective to the future,' The New Technology Communications, pp. 37-53, June 1998." A large number of another technology of obtaining the camera parameters are also disclosed in said literature, and hence the description of the art is omitted herein.

However, regardless of the method used to calculate the camera parameters, it is a problem how to find a set of said correspondence relation. The present invention discloses a method for generating a set of said correspondence relation, thereby obtaining some of the camera parameters by calculation using the set. This method is described later.

The performing of the lens distortion correction on the camera input image using said lens distortion coefficients needs a lot of calculation, and hence is not suitable for a real-time process.

Thus, assuming that the variation in the lens distortion does not occur unless the temperature change is vigorous, the correspondence relation between the coordinate values of each pixel before the distortion correction and those after the distortion correction is calculated previously. Then, said calculation result is retained in a memory in a data format such as a table and a matrix, thereby correcting the distortion using it. Such a method is effective as a fast correction process.

When the change in the lens distortion due to the temperature and the like is previously known, the data is retained in a format such as the temperature correction table 111 in accordance with the present invention. The calibrating means 102 performs the correction by referencing to the data in said table when a change in the lens distortion occurs due to the rise or fall of the temperature.

FIG. 10 is a diagram showing an example of the temperature correction table 111, in the form of a table. As shown in FIG. 10, the temperature correction table 111 stores the data of the amount of the change in said camera parameters corresponding to the temperature change. The present example shows the case to store the data of the magnitudes of the changes in
  lens focal length (the second column in the table),
  lens distortion coefficient κ1 (the third column in the table), and
  lens distortion coefficient κ2 (the fourth column in the table)
due to the temperature. More specific contents shown in the table is as follows.

When the temperature is 0 degree or lower (the second line in the table)
  Add df1 to the present lens focal length.
  Add κ11 to the present lens distortion coefficient.
  Add κ21 to the present lens distortion coefficient.

When the temperature is 40 degrees or higher (the third line in the table)
  Add df2 to the present lens focal length.
  Add κ12 to the present lens distortion coefficient.
  Add κ22 to the present lens distortion coefficient.

The calibrating means 102 in accordance with the present invention (an example of Claim 14) successively observes the temperature value of the temperature sensor 110 of each camera, and renews the contents of the camera parameter table 103 when necessary.

FIG. 22 is a flow chart showing the procedure of the process of renewing a camera parameter table 103 depending on the temperature, in calibrating means 102. The detail thereof is described below with reference to FIG. 22.

Here, in the present example, a temperature sensor 110 is correspondingly attached to each camera as shown in FIG. 3. The temperature sensed by the temperature sensor 110 is assumed to be approximately equal to the lens temperature of the camera.

1. (1301) Select one of the temperature sensors 110 not yet checked, and acquire the temperature value.

2. (1302) Check whether said temperature value requires camera parameter correction or not.

In the example of FIG. 22, the temperature requiring the correction is 0 degree or lower and 40 degrees or higher. 3. (1303) When the correction is necessary, acquire camera parameter correction values from the temperature correction table 111, and write in the result of the renewing of the camera parameters of the camera associated with the temperature sensor 110 in question, into the camera parameter table 103. (1304) When the correction is unnecessary, write in the result of the restoring all of the lens focal length and the distortion coefficients κ1 and κ2 to the initial setting values, into the camera parameter table 103.

4. (1305) When the above-mentioned processes 1 to 3 are finished for all the temperature sensors 110, terminate the renewal process of the camera parameter table 103. When there is a temperature sensor 110 not yet checked, perform the above-mentioned processes 1 to 3 for this temperature sensor 110.

FIG. 11 shows an example of a camera parameter table 103 rewritten using the temperature correction table 111 of the example of FIG. 10. In the example of FIG. 11, the cameras 1 and 2 alone are in a temperature of 40 degrees or higher because of being irradiated by direct sun light and the like. The others keep a temperature from 0 degree less than 40 degrees. As shown in the camera parameter table 103 of FIG. 11, the camera parameters of the cameras 1 and 2 are changed by the temperature correction process for a temperature of 40 degrees or higher as follows:
  The lens focal lengths are increased by df1.
  The lens distortion coefficients κ1 are increased by κ12.
  The lens distortion coefficients κ2 [sic; κ2] are increased by κ22.

Since the above-mentioned virtual camera can be assumed to have an ideal lens without any change in focal length and lens distortion due to the temperature, it is not an objective of the correction process.

In the present example, it is assumed that the lenses of all the installed cameras have the same temperature correction characteristics. However, in practice, there may be a case that the lenses having the different characteristics are installed. In that case, preparing an independent table for each camera, the proper table can be used for each camera of the objective of the temperature correction.

Although the material of the lenses of said cameras may be made of plastics other than glass, the plastics normally undergoes a vigorous distortion due to the temperature change. However, the problem can be treated by the above-mentioned correction.

The space reconstructing means 104 in accordance with the present invention generates the space data in which each pixel constituting the image input from a camera is corresponded to a point of the three-dimensional space depending on the camera parameters calculated by the calibrating means 102. That is, the space reconstructing means 104 calculates where in the three-dimensional space each object included in the image shot by a camera exists, and stores the space data as the calculation result into the space data buffer 105.

Here, in the generating of the space data, it is unnecessary to use all the pixels constituting the image from said camera. For example, in case that the input image contains a region above the horizon, the pixels included in the region above the horizon are unnecessary to map onto the road surface. The pixels constituting the body of vehicle are also unnecessary to map. Further, in case of an input image of a high resolution, the process may be speeded up by mapping every several pixels into the space data.

Generally, the position of each pixel constituting the image shot by a camera is expressed by the coordinates on the U-V plane including the CCD imaging plane. Thus, in order to establish the correspondence of each pixel constituting the input image into a point of the world coordinate system, a calculation formula is necessary which establishes the correspondence of a point of the U-V plane including the image shot by the camera into a point of the world coordinate system.

Figure 8:
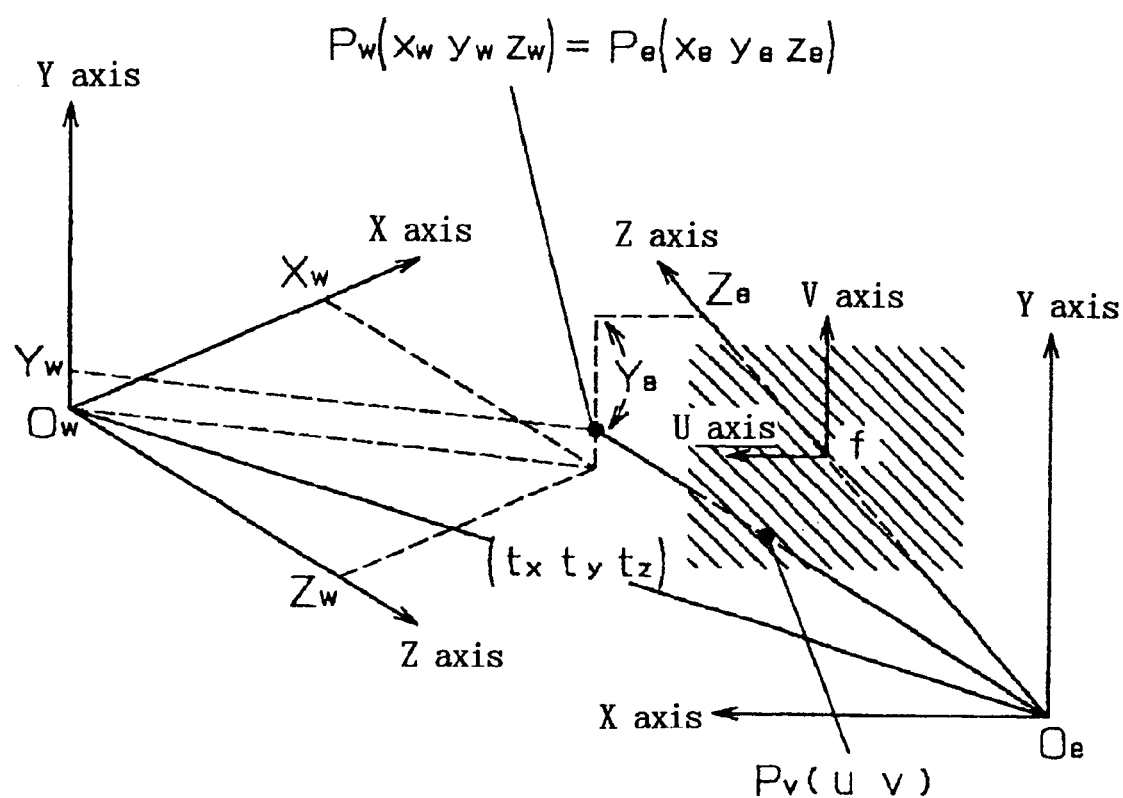
FIG. 8 is a conceptual diagram representing the correspondence relation between a point of the U-V coordinate system being set on the plane including an image shot by a camera and a point of the three-dimensional space coordinate system.

FIG. 8 is a conceptual diagram representing an example of the correspondence relation between a point of the U-V coordinate system being set on a plane (plane of view hereafter) including the image shot by a camera and a point of the three-dimensional space coordinate system. In accordance with the example of FIG. 8, the correspondence relation is established by the following procedure.

1. Set a coordinate system in which the plane of view is Z=f (focal length of a camera) and the Z axis passes through the center of the camera image on the plane. This is called the plane-of-view coordinate system (the origin is Oe).

2. Let the coordinates of a point Pe of FIG. 8 in the plane-of-view coordinate system be Pe (Xe, Ye, Ze), and let the coordinates of the projected point of that point onto the plane of view (this point corresponds to a single pixel of the image shot by the camera) be Pv (u, v). Then, using the focal length f of the camera, the relation between Pe and Pv is expressed as following equations (1) and (2).

$$u = \frac{f}{z_e} x_e \quad \text{Equation 1}$$

$$v = \frac{f}{z_e} y_e \quad \text{Equation 2}$$

The above-mentioned two equations can determine the coordinates, in the plane-of-view coordinate system, of each pixel of the image projected onto the plane of view.

3. Obtain the positional relation and the orientational relation between the plane-of-view coordinate system and the world coordinate system. Here, assume that, in space, the plane-of-view coordinate system is in the following relation with the world coordinate system centered on.

Let the vector from the origin Oe of the plane-of-view coordinate system to the origin Ow of the world coordinate system be (tx, ty, tz). Then, the positional shift between the two coordinate systems vanishes by the parallel displacement by (tx, ty, tz).

Set the orientational relation between the plane-of-view coordinate system and the world coordinate system so as to be the same relation between the coordinate system (corresponding to the world coordinate system) based on the vehicle of the example of FIG. 7 and the car-carried camera (corresponding to the plane-of-view coordinate system). Then, in the plane-of-view coordinate system, "the angle relative to the Y-Z plane of the world coordinate system is $\alpha$" and "the angle relative to the X-Z plane of the world coordinate system is $\beta$."

Here, the rotation of the camera lens around the optical axis is assumed to be neglected. In case that a point is represented by the coordinates Pw (Xw, Yw, Zw) in the world coordinate system and by the coordinates Pe (Xe, Ye, Ze) in the plane-of-view coordinate system, the relation of Equation (3) holds among Pe (Xe, Ye, Ze), Pw (Xw, Yw, Zw), (tx, ty, tz), $\alpha$, and $\beta$.

$$\begin{pmatrix} x_w \\ y_w \\ z_w \end{pmatrix} = \begin{pmatrix} \cos\alpha & 0 & -\sin\alpha \\ 0 & 1 & 0 \\ \sin\alpha & 0 & \cos\alpha \end{pmatrix} \begin{pmatrix} 1 & 0 & 0 \\ 0 & \cos\beta & -\sin\beta \\ 0 & \sin\beta & \cos\beta \end{pmatrix} \begin{pmatrix} x_e \\ y_e \\ z_e \end{pmatrix} - \begin{pmatrix} t_x \\ t_y \\ t_z \end{pmatrix} \quad \text{Equation 3}$$

Now, the correspondence between a pixel Pv (u, v) on the plane of view and the coordinates Pw (Xw, Yw, Zw) in the world coordinate system has been established by Equations (1), (2), and (3).

In the above-mentioned three equations, since the unknown parameters are the six of "tx, ty, tz, $\alpha$, $\beta$, and f," the above-mentioned unknown parameters can be determined by having at least two sets of the points where the correspondence relation between the pixel Pv (u, v) on the plane of view and the coordinates Pw (Xw, Yw, Zw) in the world coordinate system is known.

However, the measurement of the coordinates of each set the correspondence relation in which is known contains a positional shift in most cases, which causes an error in the calculation result.

Therefore, a method normally used is to solve the simultaneous equations constructed by the measurement of a large number of the sets, by the method of least squares. Here, since the position and the orientation of the camera agree with the plane-of-view coordinate system, the present process 3. is unnecessary to perform when the camera parameters are previously known.

4. Using Equations (1), (2), and (3) in which the values of tx, ty, tz, $\alpha$, $\beta$, and f are given, establish the correspondence of each point Pw (Xw, Yw, Zw) of the world coordinate system into a point Pv (u, v) on the plane of view.

By performing the above-mentioned processes 1 to 4 on all of the cameras, the correspondence of the independent images from all of the cameras into the points in the same three-dimensional space can be established.

The space data in accordance with the present invention is the data in which the correspondence is established by such calculation formulas. FIG. 12 shows an example of the description of the space data buffer 105 for storing the space data, in the form of a table. The space data buffer 105 stores the correspondence data between a point of a camera image and a point within the space. In the example of FIG. 12, a piece of the space data is described in each line except for the first line. Each line, which is the information constituting each space data, includes the following contents.

First column: number for identifying the point from the others in the world coordinate system (A is used here for the sake of the simplicity of description)

Second column: X coordinate of the point in the world coordinate system

Third column: Y coordinate of the point in the world coordinate system

Fourth column: Z coordinate of the point in the world coordinate system

Figure 13:
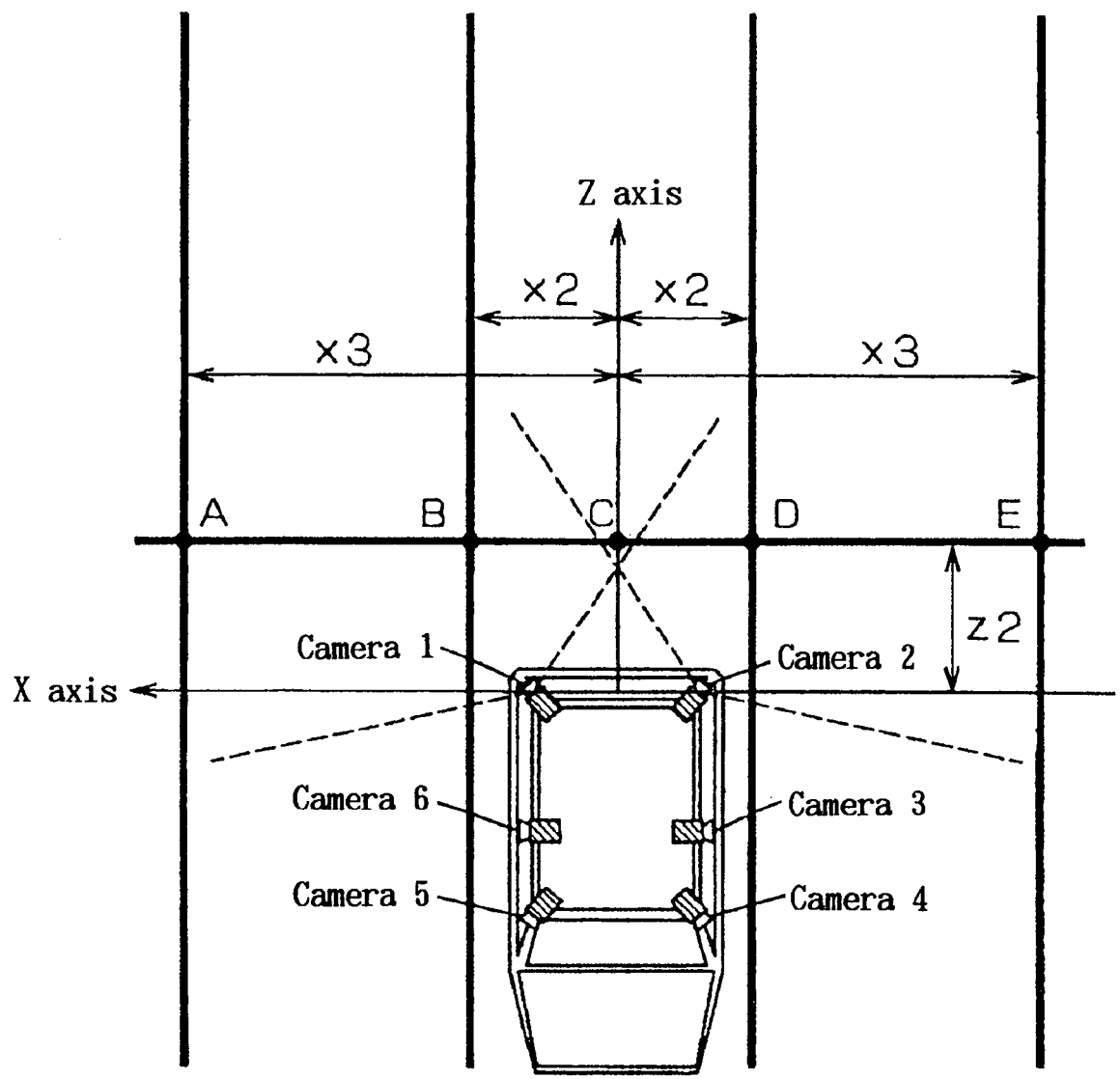
FIG. 13 is a conceptual diagram of the positional relation between the characteristic points on the road surface and the vehicle, viewed from above.
Figure 14:
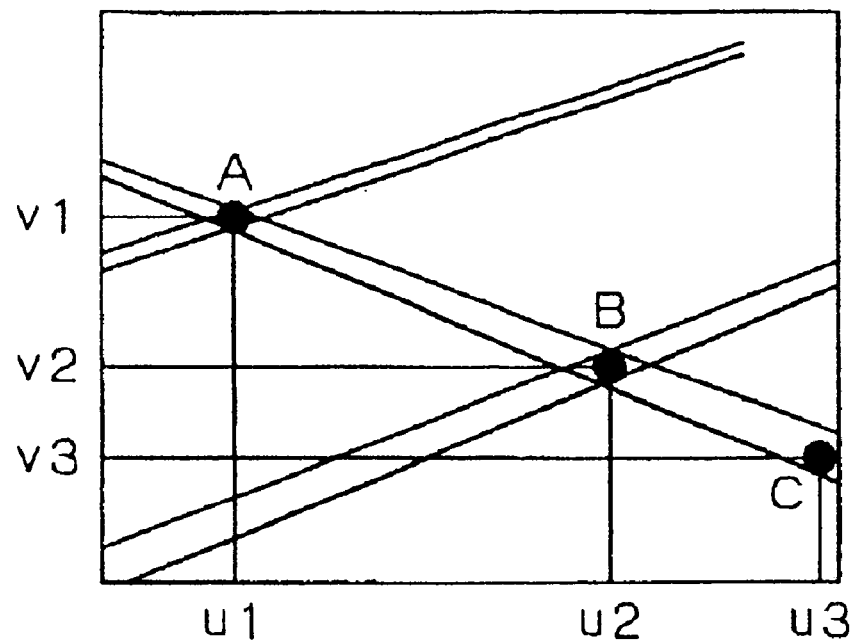
FIG. 14 is a conceptual diagram showing an image of the road surface including said characteristic points, shot by the car-carried camera 1 of FIG. 13.
Figure 15:
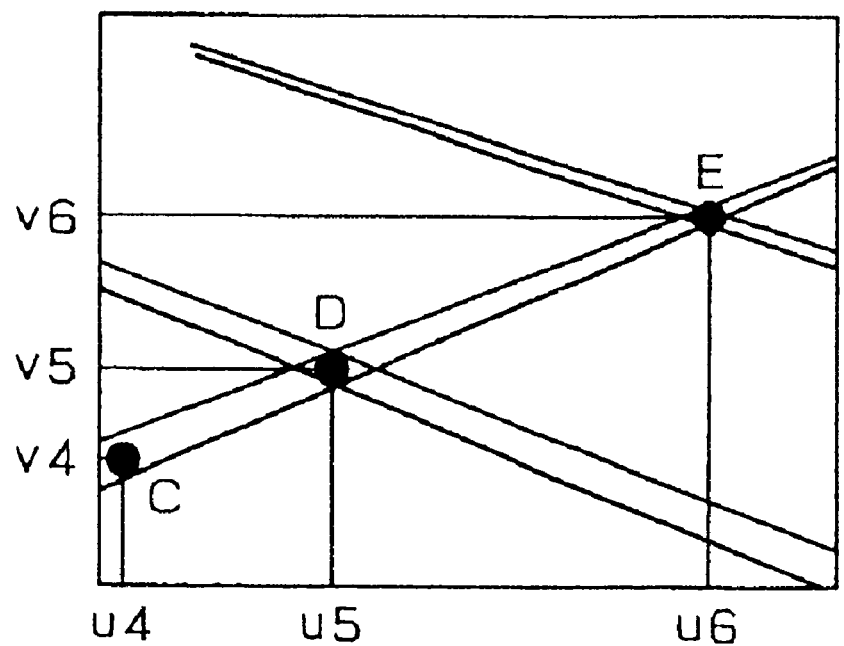
FIG. 15 is a conceptual diagram showing an image of the road surface including said characteristic points, shot by the car-carried camera 2 of FIG. 13.

Fifth column: flag for identifying the camera which shot the image including said point Sixth column: U coordinate of the point in the plane-of-view coordinate system including said image Seventh column: V coordinate of the point in the plane-of-view coordinate system including said image Eighth column: R color component (quantized, for example, in 0-255 gradations) of the point in the plane-of-view coordinate system including said image Ninth column: G color component (quantized, for example, in 0-255 gradations) of the point in the plane-of-view coordinate system including said image Tenth column: B color component (quantized, for example, in 0-255 gradations) of the point in the plane-of-view coordinate system including said image Eleventh column: time when the space data is acquired The contents of the description of the space data is explained below with an example. FIGS. 13 to 15 are used for the assistance of the explanation.

FIGS. 13 to 15 are diagrams showing the correspondence relation between a characteristic point on the road surface as a plane in the world coordinate system and a characteristic point on the image shot by a camera mounted on the vehicle. FIG. 13 is a conceptual diagram of the positional relation between characteristic points A, B, C, D, and E on the road surface and the vehicle, viewed from above. FIG. 14 is a conceptual diagram showing an image of the road surface including said characteristic points A, B, and C, shot by the car-carried camera 1 of FIG. 13 [sic; 13]. FIG. 15 is a conceptual diagram showing an image of the road surface including said characteristic points C, D, E, shot by the car-carried camera 2 of FIG. 13. In the space data buffer 105 of the example of FIG. 12, the five characteristic points A, B, C, D, and E of FIGS. 13 to 15 are described as an example of the space data.

First, consider the characteristic point A in FIGS. 13 and 14. Assuming that the point A in the world coordinate system of FIG. 13 is corresponded to the point A in the plane of view coordinate system of FIG. 14 by the correspondence process of said space reconstructing means 104, the third line in the table of FIG. 12 is the example of the space data corresponding to the characteristic point A of FIGS. 13 and 14.

This example indicates that the point A in the world coordinate system has coordinates (X3, 0, Z2). When it is shot by the camera 1, the coordinates of the point A on the camera image are (U1, V1). The colors in the order of R, G, B are (80, 80, 80), and the time of the generation of the data is t1.

When a point in the world coordinate system is shot by a plurality of cameras, each of the independent data is stored in the space data buffer 105. An example of this case is the point C of FIGS. 13 to 15. As shown in FIGS. 14 and 15, the point C is observed by the two cameras of FIG. 13, the camera 1 and the camera 2.

In the space data generated on the basis of the observation result by the camera 1, which is the space data in the seventh line of FIG. 12, the point C in the world coordinate system has coordinates (0, 0, Z2). When the point C is shot by the camera 1, the coordinates of the point C on the camera image are (U3, V3). The colors in the order of R, G, B are (140, 140, 140), and the time of the generation of the data is t1.

On the other hand, in the space data generated on the basis of the observation result by the camera 2, which is the space data in the eighth line of FIG. 12, the point C in the world coordinate system has coordinates (0, 0, Z2). When the point C is shot by the camera 2, the coordinates of the point C on the camera image are (U4, V4). The colors in the order of R, G, B are (150, 150, 150), and the time of the generation of the data is t1.

As such, the information of the correspondence of each pixel of the image shot by each camera into a point of the world coordinate system is stored into the space data buffer 105 in the form of the space data.

The point-of-view converting means 106 in accordance with the present invention generates an image shot by a camera placed at an arbitrary point of view by referring to the space data generated by the space reconstructing means 104. The outline of the method is to perform the reversed process of the process carried out by the space reconstructing means 104. That is, it is to obtain the transformation of projecting a point Pw (Xw, Yw, Zw) generated in the world coordinate system by the space reconstructing means 104 onto the image plane Pv (u, v) shot by the camera placed at the arbitrary point of view.

The calculation formula for this transformation can be expressed by Equation (4) which corresponds to the inverse transformation of Equations (1), (2), and (3) described above in detail.

$$\begin{pmatrix} x_e \\ y_e \\ z_e \end{pmatrix} = \begin{pmatrix} 1 & 0 & 0 \\ 0 & \cos\beta & \sin\beta \\ 0 & -\sin\beta & \cos\beta \end{pmatrix} \begin{pmatrix} \cos\alpha & 0 & \sin\alpha \\ 0 & 1 & 0 \\ -\sin\alpha & 0 & \cos\alpha \end{pmatrix} \left( \begin{pmatrix} x_w \\ y_w \\ z_w \end{pmatrix} + \begin{pmatrix} t_x \\ t_y \\ t_z \end{pmatrix} \right) \quad \text{Equation 4}$$

That is, by inputting Pw (Xw, Yw, Zw), the Pv (u, v) is calculated using said three equations. In this calculation, arbitrary and desired values can be specified for the camera parameters of the camera "tx, ty, tz, α, β, and f." This indicates that the camera can be placed at a desired point of view and at a desired angle. In that case, there occurs a problem how to represent the color of each pixel on the screen projecting the image viewed from the camera placed at said arbitrary point of view.

However, the present invention (corresponds to Claims 5, 6, and 7) discloses the methods of displaying the color for three cases. The contents of the methods is described below for each of the three cases.

(1) The case that a point P in the three-dimensional space viewed from said point of view is corresponded to the image shot by a single camera: in this case, the color of the point P viewed from the set point of view is determined using the color of the point P viewed by said camera. The simplest method is to replace it with the same color. However, the color may be obtained by calculation depending on the relation between the positions and the directions of the set point of view and of the camera observing the point P.

(2) The case that a point P in the three-dimensional space viewed from said point of view is corresponded to the images shot by a plurality of cameras: in this case, the color of the point P viewed from the set point of view is determined by the color of the result of a certain calculation using the color of the point P viewed by said plurality of cameras. Some methods can be considered as the methods of said calculation, which are, for example, to mix all the colors in the same ratio, to acquire the color having the highest, the lowest, or the middle lightness, and to acquire the color having the highest, the lowest, or the middle saturation.

(3) The case that a point P in the three-dimensional space viewed from said point of view is not corresponded to an image shot by any cameras: in this case, the color of the point P viewed from the set point of view is determined by the calculation to obtain the color interpolated with the colors of the points in the surroundings of the point P, by replacing it with a color, such as black, identifiable as a part where no objects exist, and by the like.

The major feature of the present invention is the capability of arbitrarily reproducing an image viewed from an virtual camera which is not installed on the vehicle, by the point-of-view converting means 106.

Figure 16:
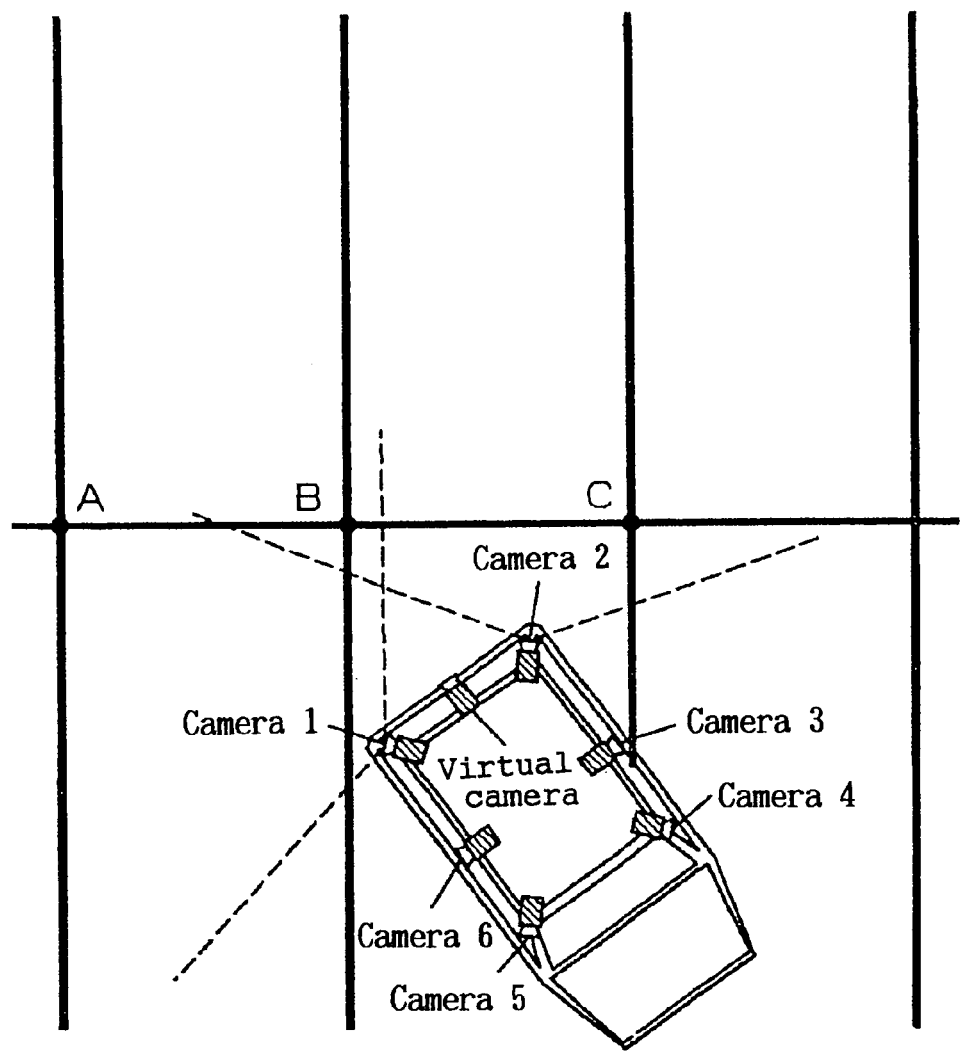
FIG. 16 is a conceptual diagram of the positional relation between characteristic points A, B, C on the road surface and the vehicle, viewed from above.
Figure 17:
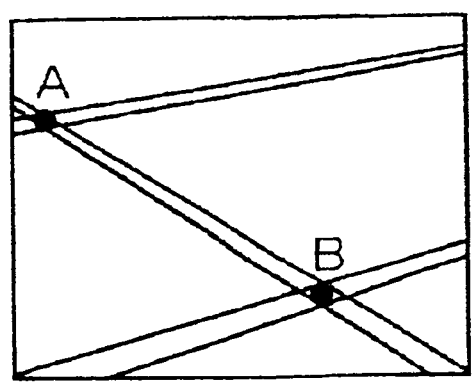
FIG. 17 is a conceptual diagram showing an image of the road surface including said characteristic points A, B, shot by the car-carried camera 1 of FIG. 16.
Figure 18:
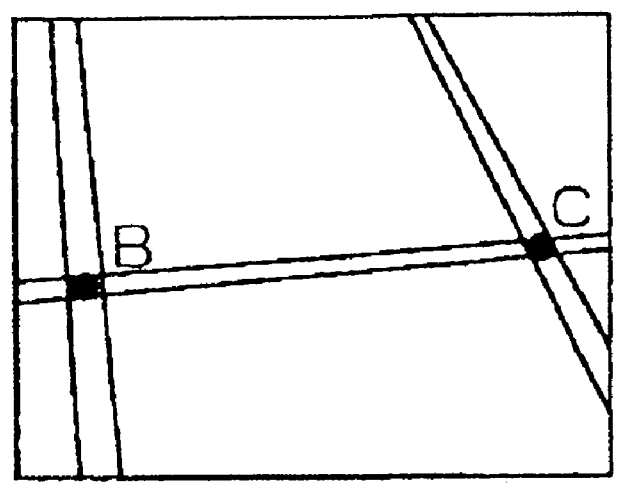
FIG. 18 is a conceptual diagram showing an image of the road surface including said characteristic points B, C, shot by the car-carried camera 2 of FIG. 16.
Figure 19:
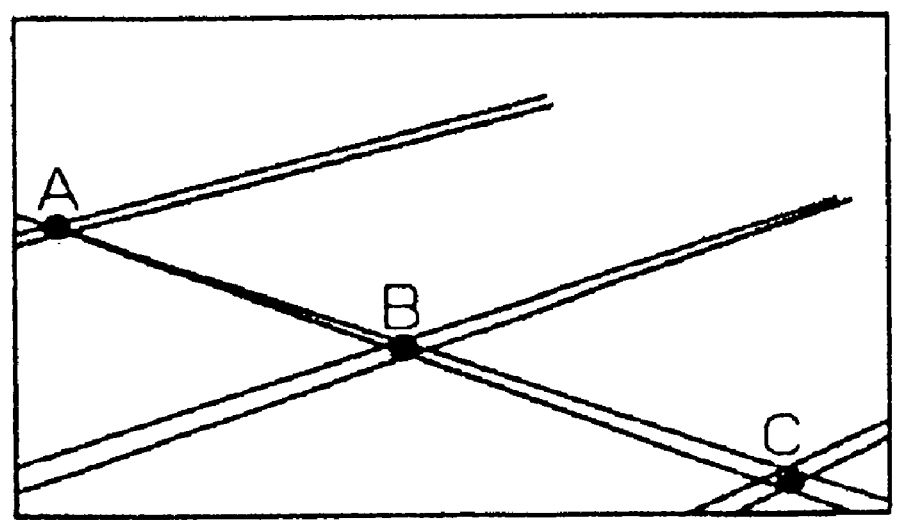
FIG. 19 is a conceptual diagram showing the situation of the synthesizing of an image viewed from a virtual camera, by point-of-view converting means 106 in accordance with the present invention using the images shot by the car-carried cameras 1 and 2 of FIG. 16.

For example, FIGS. 16 to 19 are conceptual diagrams showing an example in which an image viewed from a virtual camera placed at a proper point of view is synthesized with the images of the characteristic points on the road surface within the world coordinate system shot by the cameras installed on the vehicle. FIG. 16 is a conceptual diagram of the positional relation between characteristic points A, B, C on the road surface and the vehicle, viewed from above. FIG. 17 is a conceptual diagram showing an image of the road surface including said characteristic points A and B, shot by the car-carried camera 1 of FIG. 16. FIG. 18 is a conceptual diagram showing an image of the road surface including said characteristic points B and C, shot by the car-carried camera 2 of FIG. 16. FIG. 19 is a conceptual diagram showing the situation of the synthesizing of an image viewed from a virtual camera, by point-of-view converting means 106 in accordance with the present invention using the images shot by the car-carried cameras 1 and 2 of FIG. 16.

Figure 20:
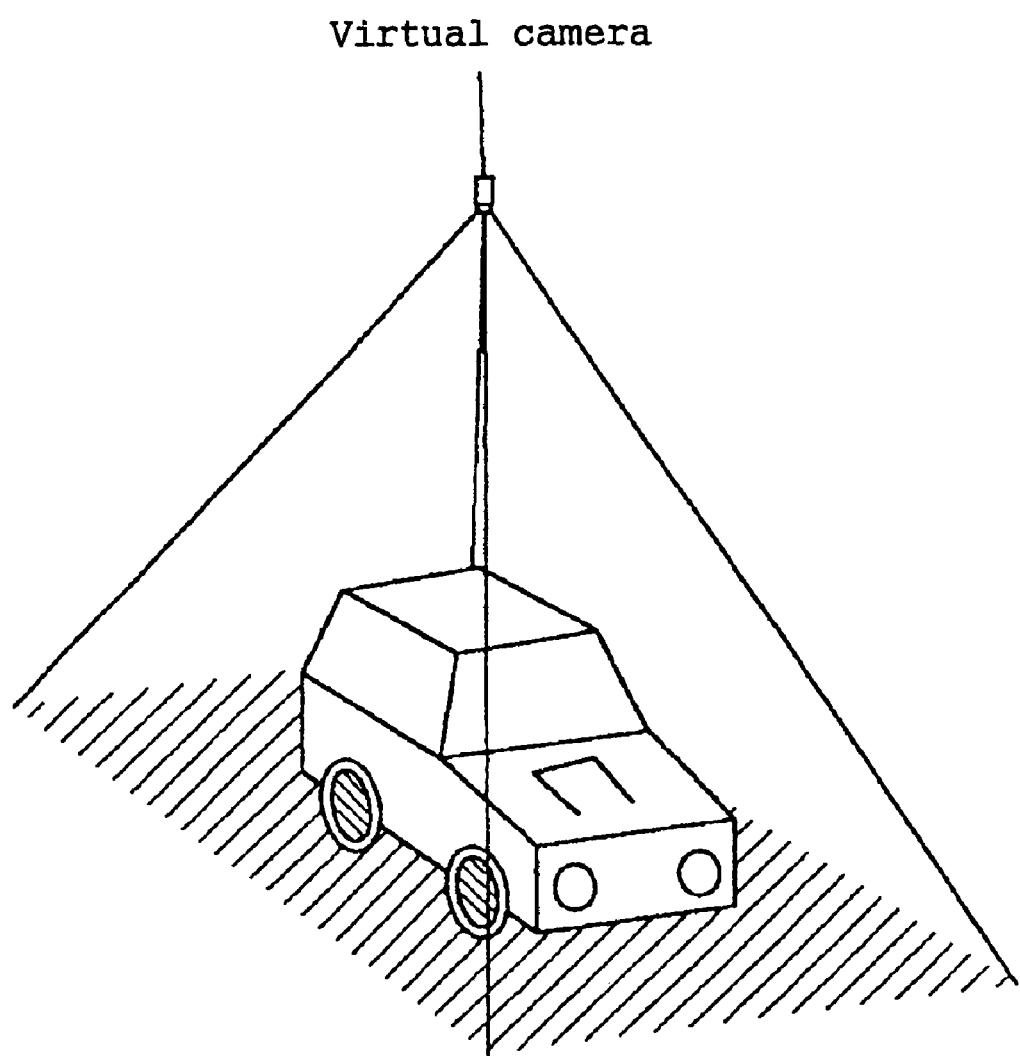
FIG. 20 shows.
Figure 20:
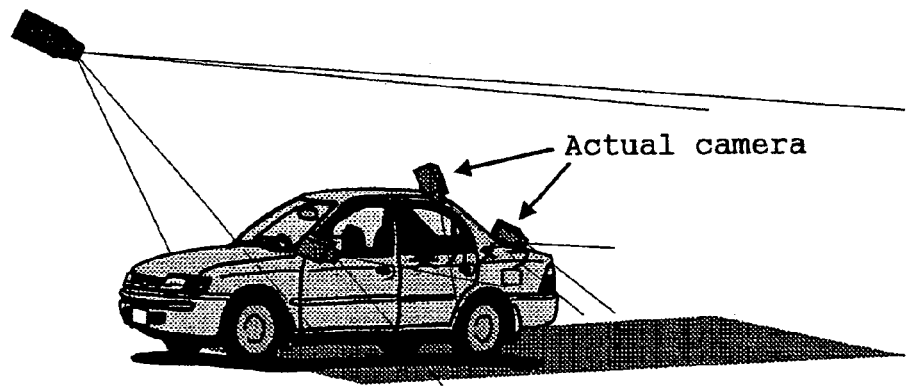
Figure 20:
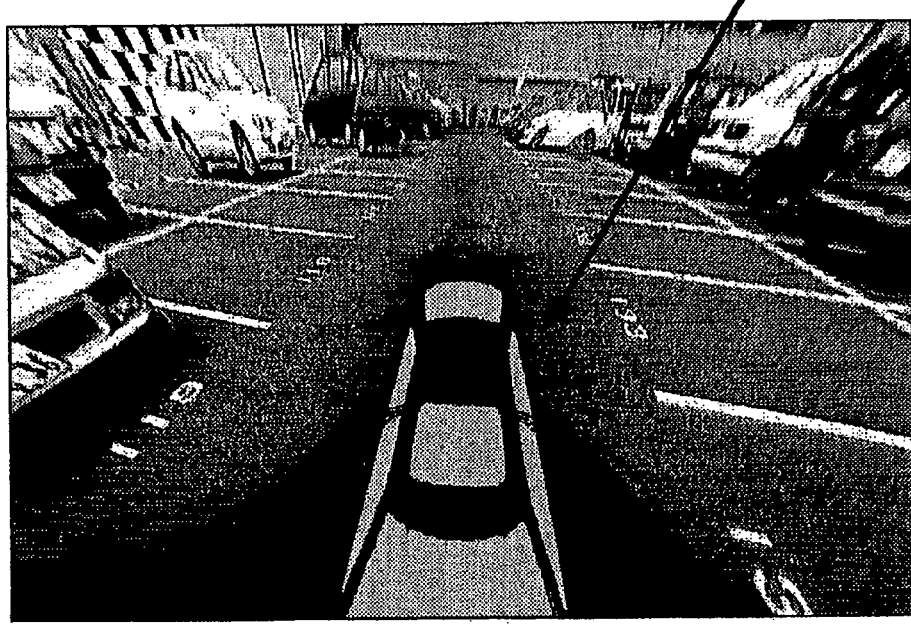

FIG. 20(*a*) is a conceptual diagram showing the case that a camera is installed above the approximate center of a vehicle downwardly, as an example of the place of installation of said virtual camera. In case of installing the virtual camera as this example, the image shot by the virtual camera shows the surroundings of the vehicle. Since the images constituting said synthesized image are shot by the car-carried cameras, the roof of the body of the vehicle is not included in any camera image when the surroundings of the car-carried cameras is shot in the configuration shown in FIG. 7.

However, concerning an object of which the information of the existence position, the shape, and the color are known such as said roof of the body of the vehicle, a less strange image can be synthesized by previously storing such information in the system and by using the information when necessary.

FIG. 20(*b*) is a perspective diagram showing the case that a camera is installed obliquely above the approximate front side of a vehicle, directing the camera to the vehicle. As such, the position of the virtual camera is not restricted to that from just above, and the vehicle can be viewed obliquely. FIG. 20(*c*) is a synthesized diagram of the image generated by using the FIG. 20(*b*), which represents the feeling as viewed obliquely from above.

The space data converting means 114 in accordance with the present invention is means necessary when the image generating apparatus described in Claim 1 of the present invention is applied to a vehicle.

Generally, a car-carried camera is normally installed on top of a body of a vehicle in order to obtain a better field of view in many cases. However, in case that the body of the vehicle has a shape forming an outwardly convex surface, for example, the road surface in the near surroundings of the vehicle is almost always within a dead angle in the image shot by such a camera located on top of the body of the vehicle.

A simple method to resolve the problem is to install a camera also in a lower part of the body of the vehicle. However, the addition of the camera needs an extra cost. Said space data converting means 114 of the present invention resolves the problem without the addition of a camera in a lower part of the body of the vehicle or the like. The solution depends on an assumption that the vehicle moves.

FIG. 23 is a flow chart showing the procedure of the process in space data converting means 114. FIG. 24 is a conceptual diagram used for the assistance of the description of space data converting means 114. FIG. 24 shows the relation between the vehicle positions and the vehicle directions at the starting time (t1 hereafter) and at the ending time (t2 hereafter) of a predetermined time duration during the vehicle movement. The procedure of synthesizing the image of the part in a dead angle from the camera is described below with reference to FIGS. 23 and 24.

1. (1401) Detect the movement distance of the vehicle in a predetermined time duration. In the present example, the movement distance is defined by the straight distance between the vehicle positions at time t1 and at time t2. That is the distance between O1 and O2 in FIG. 24.

For the convenience of description, the movement distance from O1 to O2 is represented by a vector (t'x, 0, t'z) as shown in FIG. 24. The method used for the detection of the movement distance is, for example, a method by counting the number of revolutions of the wheel.

2. (1402) Detect the direction of the movement of the vehicle in said predetermined time duration. In the present example, the movement direction is defined by the amount of the change which is the difference of the direction of the vehicle at time t2 from the direction of the vehicle at time t1. For the convenience of description, the amount of the change in the direction is represented by the angle Θ between the Z1 axis and the Z2 axis as shown in FIG. 24. The method used for the detection of the movement direction is, for example, to measure the rotation angle of the steering wheel or the like.

3. (1403) Formulate Equation (5) for converting the space data acquired at t1 into the space data at t2 using the movement distance and the movement direction of the vehicle during the time duration from time t1 to time t2. In Equation (5), it is assumed that there is perfectly no change in the vertical component in the vehicle movement during the time duration from time t1 to time t2, that is, the road surface is flat.

Equation 5

$$\begin{pmatrix} x_2 \\ y_2 \\ z_2 \end{pmatrix} = \begin{pmatrix} \cos_\theta & 0 & \sin_\theta \\ 0 & 1 & 0 \\ -\sin_\theta & 0 & \cos_\theta \end{pmatrix} \left( \begin{pmatrix} x_1 \\ y_1 \\ z_1 \end{pmatrix} - \begin{pmatrix} t_x \\ 0 \\ t_z \end{pmatrix} \right) \quad \text{Equation 5}$$

In Equation (5), the x1, y1, and z1 represent the coordinates of a point in the X1-Y1-Z1 world coordinate system (the origin O1) based on the body of the vehicle at time t1, and the x2, y2, and z2 represent the coordinates of said point in the X2-Y2-Z2 world coordinate system (the origin O2) based on the body of the vehicle at time t2. That is, the x2, y2, and z2 are the result of the calculation of substituting x1, y1, and z1 into the right hand side of Equation (5).

4. (1404) Using Equation (5), convert the space data generated at time t1 into the space data at time t2. Since the generated space data does not need the information which camera is used for viewing, the data in the fifth to the seventh columns in the table of FIG. 12 may be left blank. That is, among the space data at time t1, only the first to the fourth columns in the table of FIG. 12 are rewritten, and the data in the eighth to the eleventh columns are used intact.

A problem is that the overflow in the limited space data buffer 105 will occur some time when the past space data is successively added to the present space data as described above. Since each space data in the space data buffer 105 in accordance with the present invention has the information of the time of the generation of the data, the data prior to a predetermined past time back from the present may be deleted to resolve the problem.

The characteristic point generating means 109 in accordance with the present invention generates, within the field of view of a camera, a plurality of points the three-dimensional coordinates of which are identifiable. The characteristic point extracting means 108 extracts said generated characteristic points. FIG. 21 is a conceptual diagram showing an embodiment of the characteristic point generating means 109, characteristic points, and the characteristic point extracting means 108.

FIG. 21(*a*) is an embodiment in which a pattern light irradiating apparatus as characteristic point generating means 109 is attached on top of a side of the body of a vehicle. In the present example, rectangle patterns are irradiated in the form of a grid on the road surface as a plane in the world coordinate system, in the surroundings of the vehicle.

FIG. 21(*b*) is an example of the situation that a plurality of the pattern light irradiating apparatuses are attached on top of the body of a vehicle thereby irradiating the pattern light onto the road surface, viewed from top of the vehicle.

FIG. 21(*c*) is an example of the situation that the rectangle pattern light irradiated onto the road surface by said method is shot by a camera. Certain points, such as the corners and the center of a rectangle generated by the pattern light irradiation, representing the characteristics can be used as the characteristic points.

In FIG. 21(*c*), the PI-1 to PI-8 are the examples of a characteristic point. It is possible to set so that the coordinates of said characteristic points are known in the world coordinate system. Further, the coordinate positions of these characteristic points are also known in the plane-of-view coordinate system, and hence the correspondence relation between the world coordinate system and the plane-of-view coordinate system is established. Accordingly, using the above-mentioned Equations (1), (2), and (3), the calibrating means 102 can calculates the camera parameters tx, ty, tz, α, β, and f.

The correction indicating means in accordance with the present invention is means necessary when the image generating apparatus described in Claim 1 of the present invention is applied to a vehicle. The correction indicating means detects a situation requiring the calibration of the camera, and indicates the camera calibration to the driver when the camera calibration is necessary. The correction history recording means 115 in accordance with the present invention records the date, time, and running distance when the camera calibration was performed, as the data necessary to detect the situation requiring the camera calibration.

FIG. 25 is a flow chart showing the procedure of the process of checking the record of correction history thereby issuing a correction indication when necessary.

1. (1601) Calculate the elapsed time from the time of the previous camera calibration to the present.

2. (1602) When said elapsed time is greater than a predetermined time set beforehand, (1605) the camera correction indicating means 116 indicates the performing of camera calibration to the driver, and then terminates the process. When the driver performs the camera calibration according to said indication, the record of correction history is renewed. When said elapsed time is smaller than said predetermined time, proceed to the next process 3.

3. (1603)) Calculate the total running distance from the time of the previous camera calibration to the present.

4. (1604) When said running distance is greater than a predetermined distance set beforehand, (1605) the camera correction indicating means 116 indicates the performing of camera calibration to the driver, and then terminates the process. When the driver performs the camera calibration according to said indication, the record of correction history is renewed. When said running distance is smaller than said predetermined distance, the camera calibration indication is not issued to the driver, and the process is terminated.

An embodiment of each means constituting an image generating apparatus in accordance with the present invention has been described above. The flow of the overall process of the image generating apparatus in accordance with the present invention is described below.

FIG. 26 is a flow chart showing the flow of the overall process of the image generating apparatus in accordance with the present invention in the case of the application to a vehicle. The configuration of FIG. 6 is assumed as the example of the configuration of the image generating apparatus.

1. (1701) In order that the present apparatus can operate normally, perform the camera calibration initially if necessary, and renew the record of correction history. In the camera calibration, the camera parameters may be input manually, or calculated by the calibrating means 102 using the result of the extraction of characteristic points by the characteristic point extracting means 108 after the characteristic point generating means 109 in accordance with the present invention generates the characteristic points in the surroundings of the body of the vehicle.

2. (1702) Observe the temperature value of the temperature sensor 110 of each camera successively while renewing the contents of the camera parameter table 103 when necessary.

3. (1703) Check the record of correction history and issue a correction indication when necessary. When the correction is performed, renew the record of correction history.

4. (1704) When the space data is stored in the space data buffer 105, the space data converting means 114 converts said space data depending on the movement distance and the movement direction of the vehicle. When the space data buffer 105 is blank, the present process is omitted.

5. (1705) The car-carried cameras shot the images of the surroundings of the vehicle.

6. (1706) The space reconstructing means 104 generates the space data in which each pixel constituting the images shot in 5. is corresponded to a point of the world coordinate system. When the space data of which coordinates in the world coordinate system coincides are present among the space data converted in 4 [sic; 4]. by the space data converting means 114, said converted space data is disposed. That is, only the latest data shot by the camera is retained among the space data of a specific point in the world coordinate system. The data prior to that time and the data of which time has been elapsed in a certain extent are deleted.

7. (1707) Referring to the space data generated by the space reconstructing means 104 in 6., compose an image shot by a camera installed at a desired point of view. In this case, the point of view is preferably fixed at a place suitable for the assistance of the driving. An example of this is a camera position above the body of the vehicle from where the surroundings of the vehicle can be overviewed, as the example of FIG. 20.

8. (1708) Display the image synthesized in the process of 7.

9. Repeat the above-mentioned processes 2. to 8. until the necessity is lost. For example, the above-mentioned processes 2. to 8. are repeated during the driver is trying toparkthevehicleinaparkingspace, and the present processes are terminated on completion of parking.

If the three-dimensional position of an object, such as an obstacle in the surroundings of the vehicle, can be accurately measured in the world coordinate system, the space model can be generated correspondingly to the object. However, it is normally impossible in practice.

That is, in a system, such as an image generating apparatus, requiring the simplicity, it is difficult to accurately obtain the three-dimensional positions and shapes of all the objects. Further, from the aspect of synthesizing an image as the assistance of driving, it is not definitely necessary to reproduce an image viewed from an arbitrary virtual point of view in an absolute accuracy. Thus, even somewhat low quality scarcely causes a large problem as long as the image is easy to understand for the driver.

Accordingly, the present invention (an example of Claim 3) discloses a method of establishing the correspondence between each pixel constituting the input image and a point of the three-dimensional space, wherein the three-dimensional information of the object is lost, but an image can be synthesized at a high speed, and the quality of the synthesized image is kept somewhat.

The method is to project the image obtained by a camera of which the attachment position and the attachment angle of which are previously known onto the road surface as an example of a plane constituting a part of the three-dimensional space. In other words, assuming that each object included in the image is sticking onto the X-Z plane of the three-dimensional space coordinate system (called the world coordinate system sometime hereafter) and that there is no object having a component in the Y axis direction, the image on the plane of view is projected onto the road surface.

In this case, the only alteration to the contents of the above-mentioned description of the embodiments of the present apparatus is that Equation (3) used by the space reconstructing means 104 is replaces by Equation (6) and that Equation (4) used by the point-of-view converting means 106 is replaces by Equation (7).

$$\begin{pmatrix} x_w \\ 0 \\ z_w \end{pmatrix} = \begin{pmatrix} \cos\alpha & 0 & -\sin\alpha \\ 0 & 1 & 0 \\ \sin\alpha & 0 & \cos\alpha \end{pmatrix} \begin{pmatrix} 1 & 0 & 0 \\ 0 & \cos\beta & -\sin\beta \\ 0 & \sin\beta & \cos\beta \end{pmatrix} \begin{pmatrix} x_e \\ y_e \\ z_e \end{pmatrix} - \begin{pmatrix} t_x \\ t_y \\ t_z \end{pmatrix} \quad \text{Equation 6}$$

$$\begin{pmatrix} x_e \\ y_e \\ z_e \end{pmatrix} = \begin{pmatrix} 1 & 0 & 0 \\ 0 & \cos\beta & \sin\beta \\ 0 & -\sin\beta & \cos\beta \end{pmatrix} \left( \begin{pmatrix} \cos\alpha & 0 & \sin\alpha \\ 0 & 1 & 0 \\ -\sin\alpha & 0 & \cos\alpha \end{pmatrix} \begin{pmatrix} x_w \\ 0 \\ z_w \end{pmatrix} + \begin{pmatrix} t_x \\ t_y \\ t_z \end{pmatrix} \right) \quad \text{Equation 7}$$

Although the description of the present embodiment has been made for an apparatus for monitoring the surroundings of a vehicle using the cameras attached on the vehicle, the present art of synthesizing a image viewed from an arbitrary point of view using a limited number of cameras is not restricted to the car-carried cameras.

For example, by installing a large number of watching cameras in a shop and by using those camera images, an image viewed from just above can be synthesized. As such, a wide range of application can be expected.

Another possible method is to install the above-mentioned calibrating means in a management center in a remote place and use it via communicating means.

In a method and an apparatus of the present invention, it is of course possible to implement a part of the function in such a remote place.

Further, the embodiments of the present invention includes the case that the data of the calibration result is carried using a floppy disk, a DVD, and the like and then used.

The buffer for storing the mapped space data is not definitely necessary when the space data is processed directly.

The virtual point of view is normally not specified manually by the manager, the driver, or the like but one of the point-of-view positions providing an image useful for the assistance of monitoring or driving is selected and the image viewed therefrom is displayed. As such, the operation of moving the virtual point of view can be eliminated, thereby permitting a further reduction in the working load to the user.

As such, in accordance with the present invention, an image viewed from an arbitrary point of view can be synthesized using the images from a limited number of cameras.

An image generating apparatus in accordance with the present invention (an example of the combination of the inventions described in Claims 8, 9, and 12) permits to easily obtain the camera parameters indicating the characteristics of each camera. Even in case that the position of a camera is somewhat shifted during the running on a very rough road, the present invention permits easy correction of the camera position.

An image generating apparatus in accordance with the present invention (an example of Claim 14) permits to correct the slight lens distortion which occurs due to the rise or fall of the temperature, thereby optimizing the lens by setting a temperature sensor and a temperature correction table. For example, for a lens slightly expanded due to the temperature rise, the lens distortion parameters can be changed using the correction values for optimally controlling the lens distortion coefficients which change depending on the expansion, by obtaining them from a temperature correction table. By such a method, the present invention permits to obtain a distortion-free image at any temperature.

An image generating apparatus in accordance with the present invention (an example of Claim 17) provides a method to watch an image of a part in a dead angle from a camera. For example, in case that the cameras are attached on top of the body of the vehicle and that the shape of the body of the vehicle below the camera attachment position is an outwardly convex surface, it is physically impossible to view the image just below the cameras. However, in the present invention, the image acquired previously can be converted to an image viewed from the present position depending on the movement direction and the movement distance of the vehicle.

An image generating apparatus in accordance with the present invention (an example of Claim 18) permitting to detect a situation requiring the correction of the camera parameters or the camera calibration which shows the characteristic of the camera, and to indicate that to the driver. As such, there is an effect to prevent the driver from forgetting to carried out the correction of the camera parameters for a long time.

Figure 27:
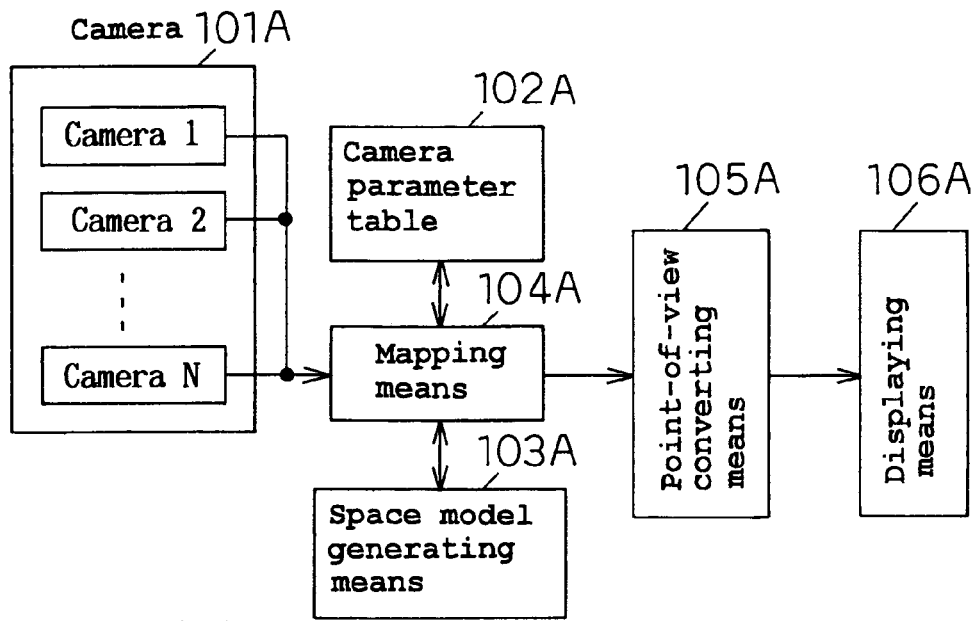
Figure 27:
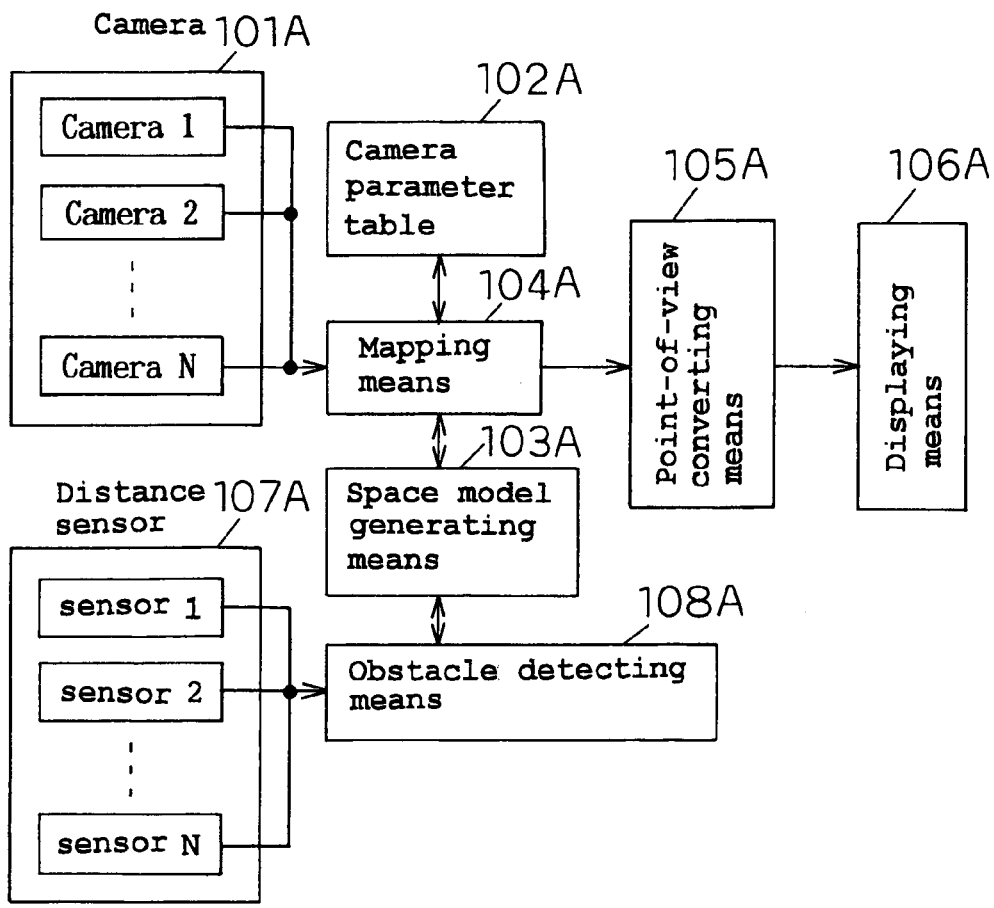
Figure 28:
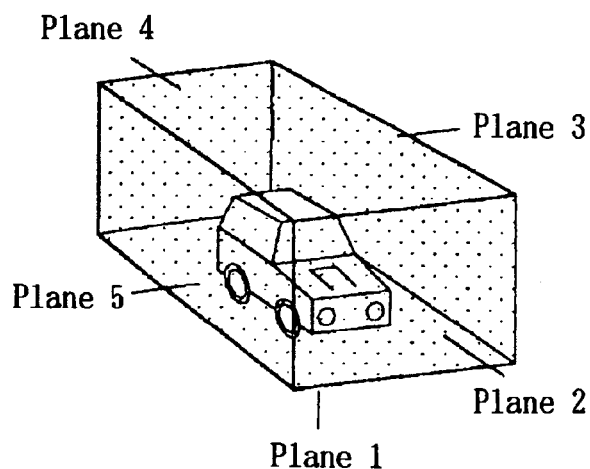
Figure 28:
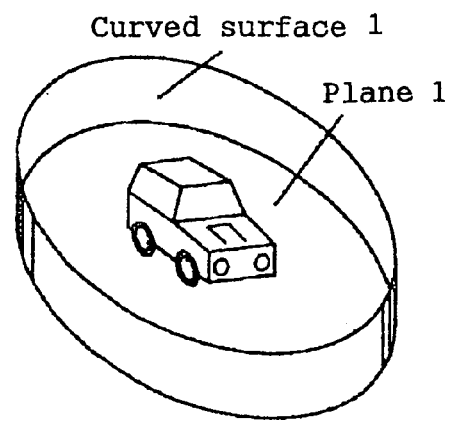
Figure 28:
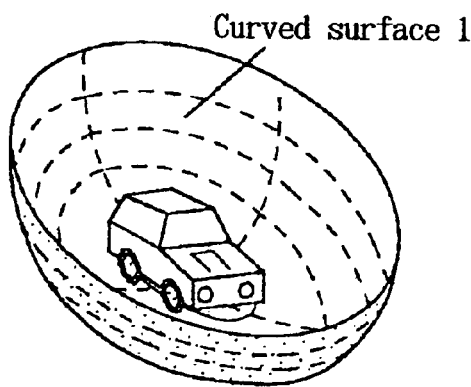
Figure 28:
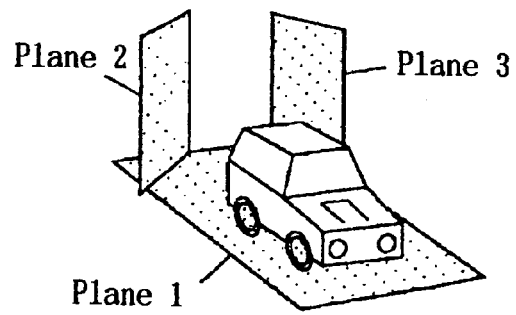

An embodiment of another present invention is described below. FIGS. 27 and 28 show an example of the present invention (Claims 35 and 37).

As shown in FIG. 27(*a*), an image generating apparatus in accordance with the present invention, as an example of the basic configuration, has the configuration comprising: a plurality of cameras 101A attached for grasping the situation of the surroundings of a vehicle; a camera parameter table 102A for storing the camera parameters indicating the characteristics of said cameras; space model generating means 103A for generating a space model in a coordinate system based on the vehicle; mapping means 104A for mapping the image input from said camera, into said space model; point-of-view converting means 105A for setting a point of view and synthesizing a single image viewed from said point of view using the data generated by said mapping means 104A; and displaying means 106A for displaying the image converted by said point-of-view converting means 105A.

FIG. 27(b) is a block diagram showing an example of the configuration of an image generating apparatus in accordance with the present invention. In the example of FIG. 27(b), the configuration is the image generating apparatus shown in FIG. 27(a) further added obstacle detecting means 108A for measuring at least the distance to an obstacle existing in the surroundings of the vehicle, as the situation of the surroundings of the vehicle.

The detail of each component constituting the present invention is described below.

The camera is a TV camera for shooting an image of a space to be monitored, such as the surroundings of a vehicle. The detail thereof is described in the above-mentioned FIG. 7.

The camera parameter table 102A in accordance with the present invention is a table for storing the camera parameters (similar to the above-mentioned camera parameter table 103).

The data stored in the camera parameter table 102A is the same as that of the above-mentioned FIG. 9.

In the present invention, assuming that a virtual camera is installed at a desired point of view set by the point-of-view converting means 105A, the image viewed from the virtual camera can be obtained by calculation. The method of the calculation is described later.

The performing of the lens distortion correction on the camera input image using said lens distortion coefficients needs a lot of calculation, and hence is not suitable for a real-time-process.

Thus, assuming that the variation in the lens distortion does not occur in the extent of causing a problem in the image composition, the correspondence relation between the coordinate values of each pixel before the distortion correction and after the distortion correction is calculated previously. Then, said calculation result is retained in a memory in a data format such as a table and a matrix, thereby correcting the distortion using it. Such a method is effective in a fast correction process.

The space model generating means 103A generates a space model, for example, in the coordinate system with the reference on the vehicle. The space model is a model consisting of one or more plane(s), one or more curved surface(s), or one or more plane(s) and one or more curved surface(s) where the image from a camera is mapped into the three-dimensional space coordinate system by the mapping means 104A described later. FIGS. 28(a) to 28(d) [sic; 28(d)] are conceptual diagrams showing a space model in a bird's eye view. FIGS. 28(a) and 28(d) show examples of a space model composed of planes alone. FIG. 28(b) shows an example composed of a curved surface alone, and FIG. 28(c) shows an example composed of a plane and a curved surface.

The space model of FIG. 28(a) shows a space model composed of five planes described below.

Plane 1: the plane of the road surface (in contact with the wheels)

Plane 2: a plane vertical to the road surface (Plane 1) on the front side

Plane 3: a plane vertical to the road surface (Plane 1) on the left side relative to the direction of the traveling of the vehicle Plane 4: a plane vertical to the road surface (Plane 1) on the rear side Plane 5: a plane vertical to the road surface (Plane 1) on the right side relative to the direction of the traveling of the vehicle In the present space model, Planes 2 to 5 is set without any gap, and hence the image shot by a car-carried camera is mapped any of Planes 1 to 5. With regard to Planes 2 to 5, the necessary distance from the vehicle and the necessary height can be determined depending on the angle of field and the place of installation of the car-carried camera.

In the model of FIG. 28(b), the space model uses a curved surface of a bowl shape. The vehicle is located on the part corresponding to the bottom of the bowl in the space model of the bowl shape. The image shot by the car-carried camera is mapped onto the inner surface of the bowl. The models of a bowl shape include a sphere, a parabola of revolution, a catenary of revolution, and the like. Anyway, a space model expressed by few equations permitting a fast calculation of the mapping.

The model of FIG. 28(c) shows a space model composed of the combination of the plane and the curved surface described below.

Plane: the plane of the road surface (in contact with the wheels)

Curved surface: a wall of cylindrical or elliptic-cylindrical shape placed on said plane so as to surround the vehicle In the present space model, the shape of the curved surface and the necessary distance from the vehicle can be determined depending on the angle of field and the place of installation of the car-carried camera.

Such a space model having a wall in the surroundings of the vehicle so as to surround the vehicle has the following effect. That is, when the camera image is mapped onto the road surface assuming that all the objects in the image are located on the road surface, there has been a problem that an object having a height above the road surface is substantially deformed. In contrast, in the space model introduced by the present invention, the vehicle is surrounded by a plane or a curved surface vertical or substantially vertical to the road surface. By setting these surfaces not too far from the vehicle, the object having a height component is mapped onto these surfaces, permitting to reduce the distortion. Further, because of the small distortion in the mapping, the discrepancy in the junction part of the images by two cameras is expected to be small.

The mapping means 104A in accordance with the present invention maps each pixel constituting the input image from the car-carried camera into a space model generated by the space model generating means 103A [sic; 103A] in accordance with the present invention. That is, it perspectively projects each image shot by the car-carried camera into the space model.

FIG. 29 is a diagram used for the assistance of the description of the mapping of a car-carried camera image onto a surface constituting the space model by converting the coordinates of a point in the U-v coordinate system being set in the plane (called the plane of view hereafter) including the image into the coordinates of a point of the world coordinate system.

Before the description of the mapping, the method for converting the plane-of-view coordinates to the world coordinates is described below. This conversion is performed in the following procedure.

1. Set a coordinate system in which the plane of view is Z=f (lens focal length) and the Z axis passes through the center of the camera image on the plane.

This is called the plane-of-view coordinate system (let the origin be Oe).

2. Let the coordinates of a point Pv (u, v) (this point corresponds to a pixel of the camera shot image) of FIG. 29 in the plane-of-view coordinate system be Pe (Xe, Ye, Ze). Then, using the focal length f of the camera, the relation between Pe and Pv is expressed by Equations 1 and 2 (where Ze=f in this case).

The above-mentioned two equations can determine the coordinates, in the plane-of-view coordinate system, of each pixel of the image projected onto the plane of view.

3. Obtain the calculation formula for establishing the correspondence between the plane-of-view coordinate system and the world coordinate system. Here, assume that the plane-of-view coordinate system is in the following relation with the reference to the world coordinate system.

Let the vector from the origin Oe of the plane-of-view coordinate system to the origin Ow of the world coordinate system be (tx, ty, tz). Then, the positional shift between the two coordinate systems vanishes by the parallel displacement by (tx, ty, tz).

When the camera position is known in the world coordinate system, the (tx, ty, tz) is easily obtained by inverting the sign of the coordinates of the position.

Let the rotation matrix for aligning the orientation of each axis of the plane-of-view coordinate system with that of the world coordinate system be $$\begin{vmatrix} a1 & a2 & a3 \\ a4 & a5 & a6 \\ a8 & a8 & a9 \end{vmatrix}.$$ Equation 0

This rotation matrix can be easily obtained by obtaining the rotation matrix around each of the X, Y, and Z axes based on the orientation parameters in the camera parameter table 102A and by making the composition of them.

Here, when a point is represented by Pw (Xw, Yw, Zw) in the world coordinate system and by Pe (Xe, Ye, Ze) in the plane-of-view coordinate system, the relation of Equation (8) holds among Pe (Xe, Ye, Ze), Pw (Xw, Yw, Zw), (tx, ty, tz), and the above-mentioned rotation matrix. Using these Equations (1), (2), and (8), a pixel Pv (u, v) on the plane of view can be converted to the coordinates Pw (Xw, Yw, Zw) in the world coordinate system.

$$u = \frac{f}{z_e} x_e$$ Equation 1

$$v = \frac{f}{z_e} y_e$$ Equation 2

$$\begin{pmatrix} x_w \\ y_w \\ z_w \end{pmatrix} = \begin{pmatrix} a_1 & a_2 & a_3 \\ a_4 & a_5 & a_6 \\ a_7 & a_8 & a_9 \end{pmatrix} \begin{pmatrix} x_e \\ y_e \\ z_e \end{pmatrix} - \begin{pmatrix} t_x \\ t_y \\ t_z \end{pmatrix}$$ Equation 8

$$\begin{pmatrix} x_e \\ y_e \\ z_e \end{pmatrix} = \begin{pmatrix} a_1 & a_2 & a_3 \\ a_4 & a_5 & a_6 \\ a_7 & a_8 & a_9 \end{pmatrix} \left( \begin{pmatrix} x_w \\ y_w \\ z_w \end{pmatrix} + \begin{pmatrix} t_x \\ t_y \\ t_z \end{pmatrix} \right)$$ Equation 9

The position of each pixel constituting the image shot by the car-carried camera is generally represented by the coordinates on a plane including the image plane. In order to map each pixel constituting the input image into said space model, the process in the following procedure is performed for all the pixels of the input image.

FIG. 30 is a flow chart showing the procedure of the mapping process. The contents of the process of the mapping is described below with reference to FIG. 30.

1. Convert said pixel represented by the coordinates of the U-V coordinate system being set in the plane of view of the camera image into the coordinates of the world coordinate system. The conversion can be performed, for example, by Equations (1), (2), and (8) shown just previously.

2. Obtain the intersecting point Ps (Xs, Ys, Zs) between the half straight line starting at the origin Oe of the camera point of view and passing through the coordinates Pw (=Pe) of said pixel and the plane constituting said space model.

3. Map the color of said pixel into the intersecting point Ps. When the color from the image of another camera has been already mapped in to the point Ps, the color of the point Ps can be determined, for example, by the following method.

- to mix, in the same ratio, the color already mapped and the color to be mapped,
- to use the color having the higher, the lower, or the middle lightness between the color already mapped and the color to be mapped, and
- to use the color having the higher, the lower, or the middle saturation between the color already mapped and the color to be mapped.

By performing the above-mentioned processes 1 to 3 for all the cameras, the images from all of the independent cameras can be mapped into the space model in the same three-dimensional space.

The point-of-view converting means 105A [sic; 105A] in accordance with the present invention composes an image shot by a camera installed at an arbitrary point of view from the result of the mapping of the car-carried camera image into the space data by the mapping means 104A [sic; 104A]. The outline of the method is to perform the reversed process of the process carried out by the mapping means 104A [sic; 104A].

That is, to be obtained is the transformation of projecting a point Ps (Xs, Ys, Zs) constituting the mapped image onto the image plane Pv (u, v) shot by a camera installed at an arbitrary point of view.

Thus, the calculation formula for this conversion can be expressed by Equations (1), (2), and (9) (corresponding to the inverse transformation of Equation (8)) described above in detail.

That is, by inputting Ps (Xs, YS, Zs), the Pv (u, v) is calculated using said three equations. In this calculation, arbitrary and desired values can be specified by camera parameter. This indicates that the camera can be placed at a desired point of view and at a desired angle.

Meanwhile, during the composition of the image viewed from a camera placed at said arbitrary point of view by the point-of-view converting means 105A, a situation can occur that no color is being mapped in a point of the space model corresponding to a pixel of said synthesized image. In that case, it can be replaced with a color, such as black, identifiable as a part without an object.

Although the examples of FIGS. 28(a) to 28(c) show a space models in which the vehicle is completely surrounded by a surface, the case is rare that all the surroundings of the vehicle is surrounded by obstacles. The situation is more normal that at most several vehicles are present in the surroundings of the vehicle in question. Considering such situations, instead of introducing a space model completely surrounding the surroundings of the vehicle in question, a plane like a screen can be generated only depending on the necessity, that is, only in front of obstacles when the situation of the distribution of obstacles in the surroundings of the vehicle in question is known.

FIG. 28 (d) is a conceptual diagram showing an example of the space model introducing the screen planes, in a bird's eye view. FIG. 28 (d) is a conceptual diagram showing a space model having three screen planes each on the road surface and on the rear left side and the rear right side of the vehicle on the road surface. Although the screen planes can be previously set at predetermined places as described above, a screen plane may be set only when an obstacle having a height component above the road surface is found in the surroundings of the vehicle. In that case, it is necessary to determine the position and the direction of the screen plane to be set. As an example of this, the method of setting a screen plane depending on the result of the detection of the obstacle is described below.

In order to perform the setting of such a screen plane, the obstacle detecting means 108A [sic; 108A] in accordance with the present invention measures at least the distance to an obstacle existing in the surroundings of the vehicle, as the situation of the surroundings of the vehicle, using a distance sensor 107A.

Various apparatuses can be used as the distance sensor 107A. However, the car-carried distance sensor can utilize laser light, ultrasonic wave, a stereo optical system, a camera focusing system (the distance from the camera to said object is calculated from the focal length when focused on the objective), and the like. In case that the laser light, the ultrasonic wave, or the like, is used as the distance sensor 107A, a large number of the apparatuses are desirably attached the periphery of the vehicle. In case of using the stereo optical system or the camera focusing system, it may be installed in addition to the car-carried camera, however, use of a part of the car-carried camera permits to reduce the cost.

An example of the method of generating a space model included a screen plane depending on the process result of the obstacle detecting means 108A is described below. FIG. 31 is a conceptual diagram showing the method of setting a screen plane in the three-dimensional space depending on the distance between the vehicle and an obstacle existing in the surroundings of the vehicle measured by an obstacle sensor. In the present example, it is assumed that each car-carried camera is equipped with an obstacle detecting sensor mentioned above in addition thereto. The obstacle sensor is directing to the same direction as the line of sight of the camera, and measures the distance to an obstacle existing in the direction. The parameters used in FIG. 31 is as follows.

(px0, py0, pz0): coordinates of the distance sensor 107A [sic; 107A] 1 on the road surface plane (dx, dy, dz): direction vector indicating the orientation of the sensing of the distance sensor 107A [sic; 107A] 1 dc: distance on the road surface plane between the distance sensor 107A [sic; 107A] 1 and the obstacle (px1, py1, pz1) the point shifted from (px0, py0, pz0) in the direction of (dx, dy, dz) by the distance dc The procedure of generating the space model is described below with reference to FIG. 31.

1. Measure the distance dc to the obstacle and check whether the distance is smaller than a predetermined distance. When the distance is larger than said predetermined distance, nothing is performed.

2. When within the predetermined distance, obtain a screen plane by the following procedure.

2-1. Obtain (px0, py0, pz0) from the previously known coordinate values of the distance sensor 107A.

2-2. Obtain (px1, py1, pz1) from both the previously known direction (dx, dy, dz) of the distance sensor 107A and the distance dc to the obstacle.

2-3. Set the plane (Equation (15)) having the normal vector (dx, dy, dz) and passing through the point (px1, py1, pz1) as the screen plane.

$$dx(x-px1)+dy(y-py1)+dz(z-pz1)=0 \qquad \text{Equation 15}$$

3. Remove said screen plane when the necessity is lost.

4. Terminate the space model generating process when the above-mentioned processes 1 to 3 have been completed for all the distance sensors 107. When there is a distance sensor 107A not yet checked, perform the above-mentioned processes 1 to 3 on the distance sensor 107A.

FIG. 31 shows the situation that the images input from the cameras 1 and 2 are mapped onto the planes 2 and 3 [sic; 2 and 3], respectively, as the screen planes composing the space model. An important factor determining the quality of the synthesized image is the value of the width of the screen plane being set in the mapping. Since the most frequent obstacle is another vehicle, the width of the screen plane can be determined so that the ⅔ or more of said another vehicle is mapped onto the screen plane when the distance between the vehicle in question and the another vehicle becomes the distance to generate a screen plane, for example.

With regard to the condition to determine whether a screen plane is to be generated or not, the distance from the vehicle in question to an obstacle can be set to be 50 cm to 1 m, from experience. With regard to the condition to remove the screen plane, the following conditions can be used solely or in combination.

The distance to the obstacle has become larger than a predetermined distance.

The driver has initialized the image generating apparatus by any method.

An embodiment of each means constituting an image generating apparatus in accordance with the present invention has been described above. The flow of the overall process of the image generating apparatus in accordance with the present invention is described below. FIG. 32 is a flow chart showing the flow of the overall process of the image generating apparatus in accordance with the present invention. The configuration of FIG. 27(b) is assumed as the example of the configuration of the image generating apparatus.

1. (901) In order for the present apparatus to operate normally, correct camera parameters for each car-carried camera are previously input into the camera parameter table 102A.

2. (902) The car-carried camera shots an image of the surroundings of the vehicle.

3. (903) The obstacle detecting means 108A measures the distance to an obstacle existing in the surroundings of the vehicle using the distance sensor 107A.

4. (904) The space model generating means 103A generates an space model.

5. (905) The mapping means 104A maps the image by the car-carried camera into the space model.

6. (906) An image viewed from a point of view set by the driver is synthesized by referencing to the image mapped in the space model.

7. (907) The image synthesized by the process 6. Is displayed.

8. (908) The above-mentioned processes 2. to 7. are repeated until the necessity is lost. For example, the above-mentioned processes 2. to 7. are repeated during the driver is trying to park the vehicle in a parking space, and the present processes are terminated on completion of parking.

As such, in accordance with the present invention, an image viewed from an arbitrary point of view is synthesized using the images from a limited number of cameras. In the composition, an space model other than a conventionally used space model having a road surface plane alone is introduced. Using this space model, even an object having a height is mapped into the space with reduced distortion. Accordingly, when an object having a height is shot into the images of two cameras, the discrepancy in the overlap of the images generated by the mapping of said object into the space model is substantially improved in comparison with the plane model, whereby the quality of the image synthesized by the point-of-view conversion is improved. Thus, the situation of the surroundings is more easily recognizable for the driver with said synthesized image, thereby permitting a suitable driving operation.

The above-mentioned description has been made in the case that the surroundings of the vehicle is detected from the vehicle and that the coordinate system with the reference on the vehicle is used. However, the above-mentioned process can be performed, for example, even in the case that a sensor installed in a parking field and the like detects the situation of the parking field and informs, to the vehicle, both the situation of the surroundings in the coordinate system with the reference in the parking field and the positional relation of the vehicles in the parking field.

An embodiment of another present invention is described below. The present embodiment is described for a monitoring apparatus in which cameras are provided for monitoring the surroundings of a vehicle and the image acquired by the cameras is displayed on a TV monitor installed near the driver's seat.

Figure 33:
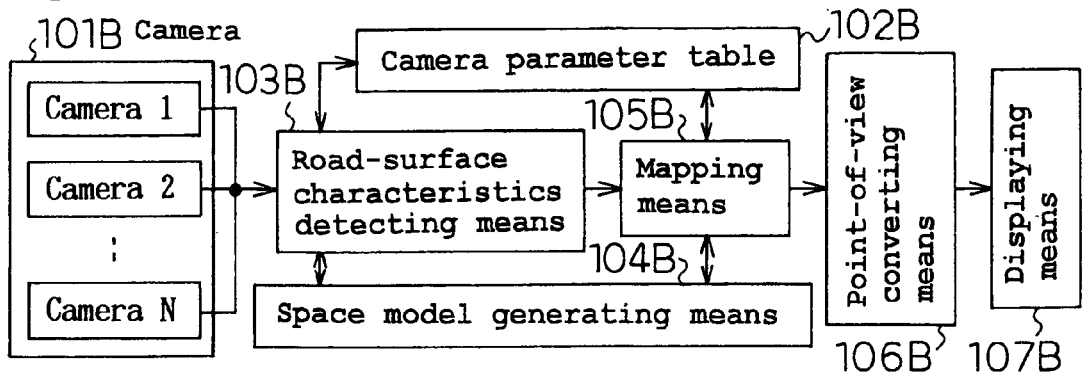
Figure 33:
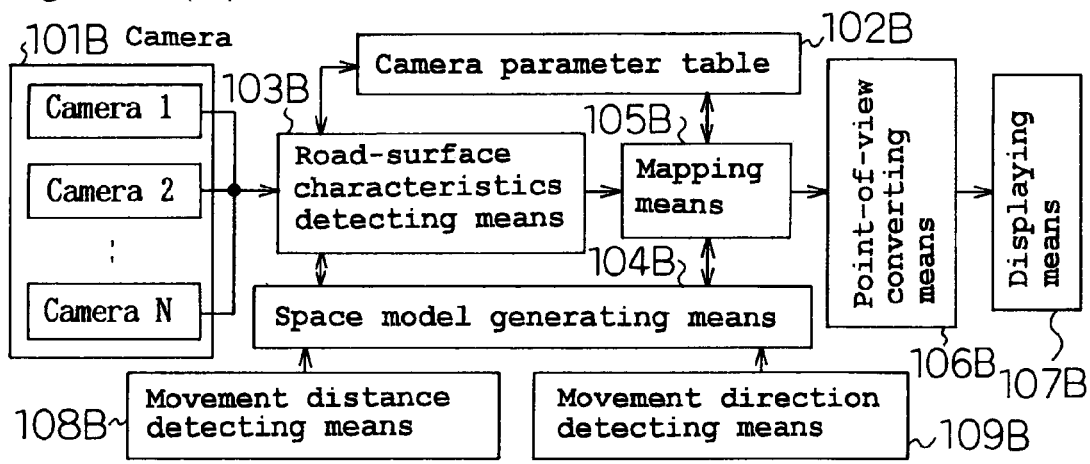
Figure 33:
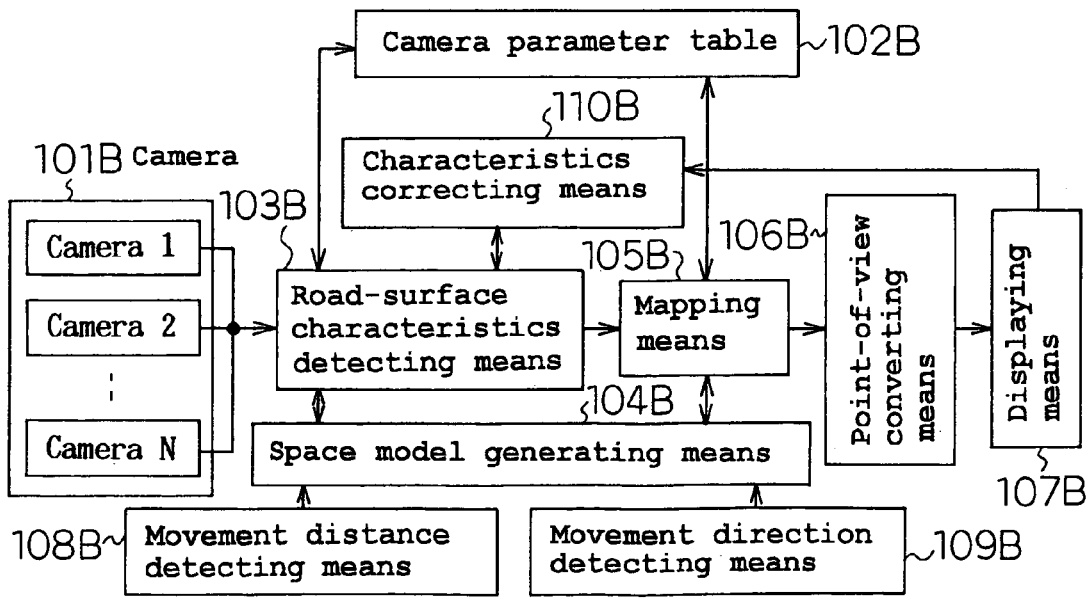

FIG. 33(*a*) is a block diagram showing an example of the basic configuration of a monitoring apparatus in accordance with the present invention (an example of Claim 39).

An apparatus for monitoring the surroundings of a vehicle in accordance with the present embodiment has, as the basic configuration, the configuration comprising: a plurality of cameras 101B attached for grasping the situation of the surroundings of a vehicle; a camera parameter table 102B for storing the camera parameters indicating the characteristics of said cameras; road-surface characteristics detecting means 103B for detecting, as the situation of the surroundings of the vehicle, the characteristics on the road surface, such as a white line and an arrow, a character, and a crosswalk drawn on the road surface; space model generating means 104B for setting a coordinate system, for example, with the reference on the vehicle and generating, in the coordinate system, a space model depending on the process result of said road-surface characteristics detecting means 103B; mapping means 105B for mapping the image input from said camera, into said space model; point-of-view converting means 106B for setting a point of view and synthesizing a single image viewed from said point of view using the data generated by said mapping means 105B; and displaying means 107B for displaying the image converted by said point-of-view converting means 106B.

FIG. 33(*b*) is characterized, in comparison with the monitoring apparatus shown in FIG. 33(*a*), by further composing movement direction detecting means 109B for detecting the movement direction of the vehicle and the movement distance detecting means 108B for detecting the movement distance of the vehicle in a unit time and by using the process results thereof thereby to calculate the present position of said characteristics on the road surface thereby to correct successively said space model depending on the calculated present position of the vehicle.

FIG. 33(*c*) has the configuration further comprising, in comparison with the monitoring apparatus shown in FIG. 33(*b*), characteristics correcting means 110B for displaying the process result of the road-surface characteristics detecting means 103B on the displaying means 107B and correcting said process result. As a result, when the characteristics on the road surface shifts during the process, the shift can be corrected.

The detail of each component constituting the present embodiment is described below.

The camera is a TV camera for shooting an image of a space to be monitored, such as the surroundings of a vehicle. The camera used has preferably a large angle of field in order to obtain a large field of view. An example of the attachment of the cameras are as described in FIG. 7.

The camera parameter table 102B is a table for storing the camera parameters. The contents thereof is as described above.

The data stored in the camera parameter table 102B is expressed in the form of a table as shown in FIG. 9.

Similarly, the parameters of a virtual camera are described in the eighth line of the camera parameter table 102B [sic; 102B] of FIG. 9. The contents indicates that the virtual camera is located at a coordinates (0, y1, 0), that the orientation is 0 degree relative to the Y-Z plane and −20 degrees relative to the X-Z plane, that the focal length is f, and that the lens distortion coefficients $\kappa 1$ and $\kappa 2$ are both zero.

Assuming that a virtual camera is installed at a desired point of view set by the point-of-view converting means 106B, the image generating apparatus in accordance with the present invention permits to obtain an image viewed from a virtual camera by calculation. A method of this calculation is described later.

The performing of the lens distortion correction on the camera input image using said lens distortion coefficients needs a lot of calculation, and hence is not suitable for a real-time process.

Thus, assuming that the variation in the lens distortion does not occur in the extent of causing a problem in the image composition, the correspondence relation between the coordinate values of each pixel before the distortion correction and after the distortion correction is calculated previously. Then, said calculation result is retained in a memory in a data format such as a table and a matrix, thereby correcting the distortion using it. Such a method is effective in a fast correction process.

The space model generating means 104B sets a coordinate system with the reference on the vehicle and generates, in the coordinate system, a space model depending on the process result of the road-surface characteristics detecting means 103B.

Figure 34:
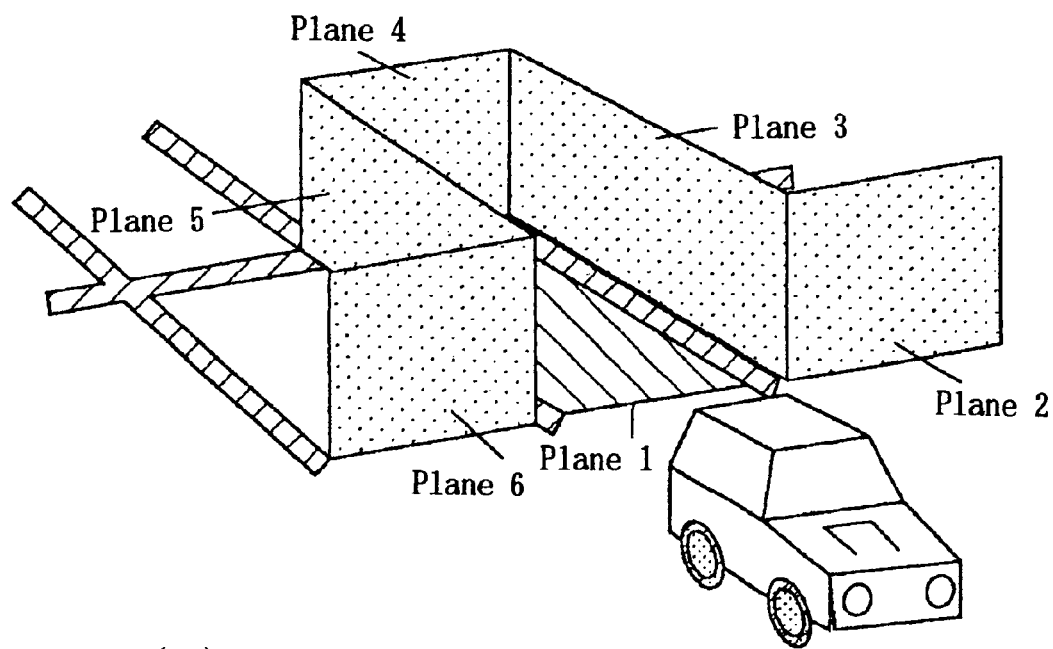
Figure 34:
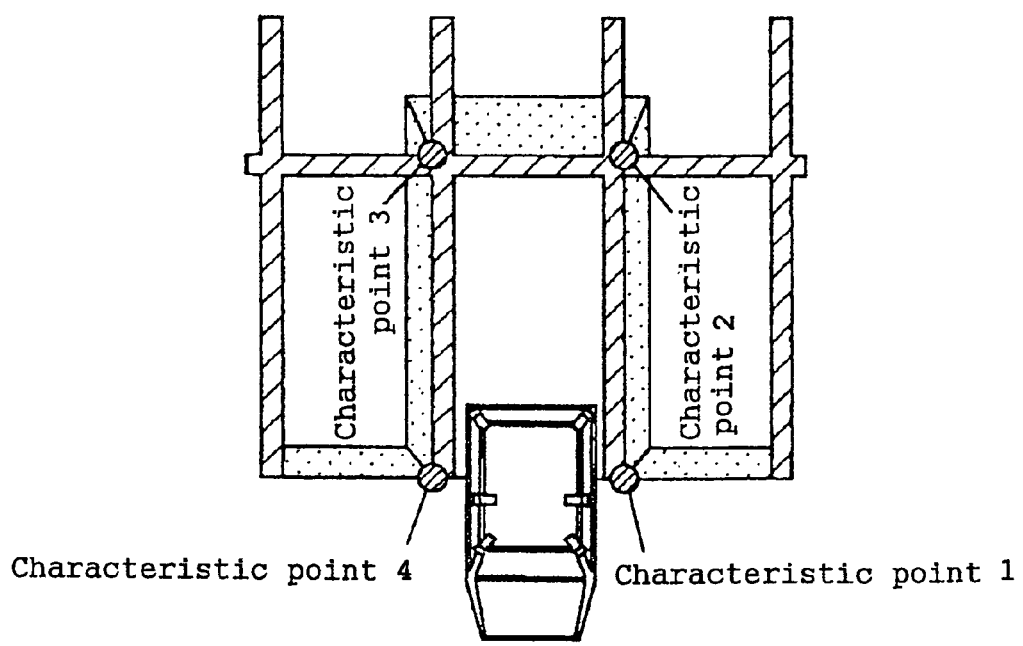

FIGS. 34(a) and 34(b) are conceptual diagrams showing a space model in accordance with the present invention.

The present figure shows the situation that an end point of a white line drawn in a parking field for indicating the parking space or a corner formed by the intersecting lines is detected as the characteristics on the road surface and that a space model using the five planes shown in the figure is generated with the reference on those points. FIG. 34(a) is a conceptual diagram showing the space model in a bird's eye view, and FIG. 34(b) is a diagram in a perspective projection view from above the vehicle downwardly. In the example of FIG. 34(b), characteristic points 1 to 4 are shown as the examples of the characteristics on the road surface. The characteristics on the road surface or the characteristics indicates these four characteristic points hereafter.

Here, when any of the four is to be mentioned, it is specified with a numeral as "characteristic point 1." In the present embodiment, the five planes are defined as follows (here, right and left are defined when directing to backward of the vehicle).

Plane 1: the plane of the road surface (in contact with the wheels)

Plane 2: the plane vertical of Plane 1 and the left edge of which contacts to Plane 3 [sic; 3]

Plane 3: the plane vertical to Plane 1 and aligning with the line element connecting the characteristic point 1 and the characteristic point 2

Plane 4: the plane vertical to Plane 1 and aligning with the line element connecting the characteristic point 2 and the characteristic point 3

Plane 5: the plane vertical to Plane 1 and aligning with the line element connecting the characteristic point 3 and the characteristic point 4

Plane 6: the plane vertical of Plane 1 and the right edge of which contacts to Plane 5

In order for the space model generating means 104B to generate these planes (except for Plane 1 which is identical to the road surface) in the three-dimensional space, said characteristic points need to be detected. The road-surface characteristics detecting means 103B extracts such characteristic points on the road surface.

FIGS. 35(a) to 35(d) are diagrams for describing an example of the process of extracting a characteristic point by road-surface characteristics detecting means 103B. FIG. 36 is a flow chart showing the flow of the process of extracting a characteristic point. The procedure of the process by the road-surface characteristics detecting means 103B is described below with reference to these figures.

Figure 35:
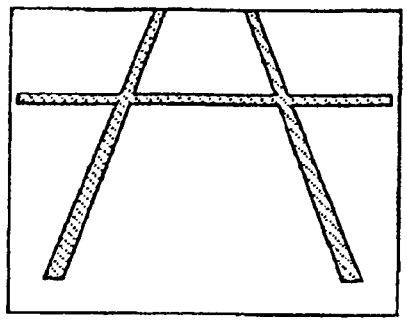
Figure 35:
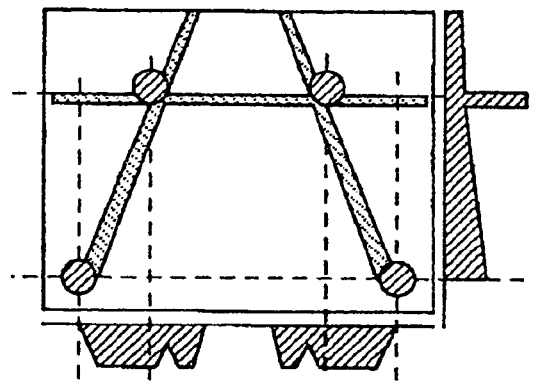
Figure 35:
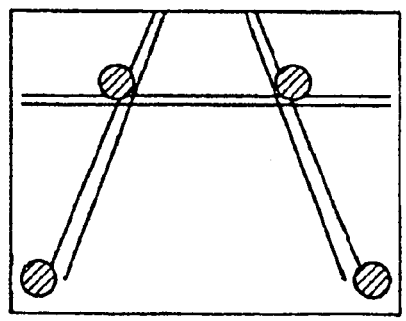
Figure 35:
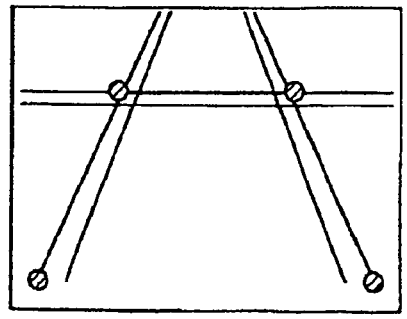

Process 701: Shot an image including a white line indicating the parking space using any one of the car-carried cameras. FIG. 35(a) shows the shot image.

By the following two processes, estimate the position of a characteristic point.

Process 702: Binarize the image shot by the car-carried camera with an appropriate threshold, scan it in the horizontal and the vertical directions, and obtain a histogram, in each of the horizontal and the vertical directions, of the number of the pixels corresponding to the white line in the scanning line. Estimate the position of a characteristic point from the result of the histograms. FIG. 35(b) shows an example of the process, and shows the situation that Y coordinate of the characteristic point is estimated from the histogram in the scan in the vertical direction X coordinate of the characteristic point is estimated from the histogram in the scan in the horizontal direction Process 703: Perform the edge extracting process on the image shot by the car-carried camera, then, perform the straight line extracting process on the result of the edge extraction, and estimate a intersecting point or a end point of the obtained straight lines as a characteristic point. FIG. 35(c) shows an example of the process. The edge extraction can be performed, for example, by Sobel operator, and the straight line extraction can be performed, for example, by Hough transformation.

Process 704: Determine the characteristic point using the estimated value obtain in the above-mentioned processes 702 and 703. The method of determining the characteristic point is, for example, to adopt the middle point of the characteristic points obtained by the respective processes 702 and 703. Note that the same result is obtained regardless of order of performing the processes 702 and 703.

Process 705: Obtain the coordinates of the characteristic point obtained from the camera image, in the three-dimensional coordinate system. The planes constituting said space model can be obtained from these coordinates.

The mapping means 105B maps each pixel constituting the input image from the car-carried camera, into a space model generated by the space model generating means 104B depending on the camera parameters. That is, it perspectively projects each image shot by the car-carried camera into the space model.

FIG. 29 is a diagram used as an assistance for the description of the mapping of a car-carried camera image onto a surface constituting the space model by converting the coordinates of a point in the U-V coordinate system being set in the plane including the image into the coordinates of a point of the world coordinate system. The detail thereof has been described above.

The position of each pixel constituting the image shot by the car-carried camera is generally expressed by the coordinates on the plane including the image plane. The detail thereof has been described above in FIG. 30.

The point-of-view converting means 106B composes an image shot by a camera installed at an arbitrary point of view from the result of the mapping of the car-carried camera image into the space data by the mapping means 105B The outline of the method has been described above with regard to the above-mentioned point-of-view converting means 105A.

Meanwhile, during the composition of the image viewed from a camera placed at said arbitrary point of view by the point-of-view converting means 106B, a situation can occur that no color is being mapped in a point of the space model corresponding to a pixel of said synthesized image. In that case, it can be replaced with a color, such as black, identifiable as a part without an object.

The position of the characteristic point detected by the road-surface characteristics detecting means 103B changes as the vehicle moves. Since the space model is generated depending on the three-dimensional coordinates of the characteristic point, the space model needs to be re-generated as the position of the characteristic point changes owing to the movement of the vehicle. That is, the position of the characteristic point needs to be determined, for example, by the above-mentioned method or the like, successively during the movement of the vehicle. However, the process of obtaining the characteristic point from the image needs generally a lot of calculation, thereby causing a higher cost. A method for avoiding this is to measure the speed and the direction of the movement of the vehicle successively and calculate the coordinates of the characteristic point using the measurement result.

In order to perform such a process, an apparatus for monitoring the surroundings of a vehicle in accordance with the present invention (an example of Claim 41) composes: movement direction detecting means 109B for detecting the movement direction of the vehicle; and the movement distance detecting means 108B for detecting the movement distance of the vehicle in a unit time; and uses the process results of the movement direction detecting means 109B and the movement distance detecting means 108B thereby to calculate the present position of said characteristics on the road surface.

FIG. 37 is a flow chart showing the procedure of the process of calculating the position of the characteristic point as the vehicle moves, in an apparatus for monitoring the surroundings of a vehicle in accordance with the present invention (an example of Claim 41). FIG. 38 is a conceptual diagram used for the assistance of the description of said process.

FIG. 38 shows the relation between the vehicle positions and the vehicle directions at the starting time (t1 hereafter) and at the ending time (t2 hereafter) of a predetermined time duration during the vehicle movement. The procedure of said process is described below with reference to FIGS. 37 and 38.

Process 901: Detect the distance of the movement of the vehicle in a predetermined time duration. In the present embodiment, the movement distance is defined by the straight distance between the vehicle positions at time t1 and at time t2. That is the distance between O1 and O2 in FIG. 38.

For the convenience of description, the movement distance from O1 to O2 is represented by a vector (t'x, 0, t'z) as shown in FIG. 38. The method used for the detection of the movement distance is, for example, to count the number of revolutions of the wheel.

Process 902: Detect the direction of the movement of the vehicle in said predetermined time duration. In the present embodiment, the movement direction is defined by the amount of the change which is the difference of the direction of the vehicle at time t2 from the direction of the vehicle at time t1.

For the convenience of description, the amount of the change in the direction is represented by the angle $\Theta$ between the Z1 axis and the Z2 axis as shown in FIG. 38. The method used for the detection of the movement direction is, for example, to measure the rotation angle of the driving wheel.

Process 903: Formulate above-mentioned Equation (5) for converting the coordinates of the characteristic point acquired at t1 into the coordinates of the characteristic point at t2 using the movement distance and the movement direction of the vehicle during the time duration from time t1 to time t2.

In Equation (5), it is assumed that there is perfectly no change in the vertical component in the vehicle movement during the time duration from time t1 to time t2, that is, the road surface is flat.

In Equation (5), the x1, y1, and z1 represent the coordinates of a point in the X1-Y1-Z1 world coordinate system (the origin O1) based on the vehicle at time t1, and the x2, y2, and z2 represent the coordinates of said point in the X2-Y2-Z2 world coordinate system (the origin O2) based on the body of the vehicle at time t2. That is, the x2, y2, and z2 are the result of the calculation of substituting x1, y1, and z1 into the right hand side of Equation (5).

Process 904: Using Equation (5), convert the coordinates of the characteristic point synthesized at time t1 into the coordinates of the characteristic point at time t2.

If the movement direction and the movement distance of the vehicle can be measured without an error, exact coordinates of the characteristic point can be obtained always by introducing the movement direction detecting means 109B [sic; 109B], the movement distance detecting means, and a characteristics position calculating means and by using the calculation method described just above. However, the measurement of the movement direction and the movement distance of the vehicle without an error is impossible in practice, and hence the necessity occurs for the correction of the position of the characteristic point.

While displaying the process result of the road-surface characteristics detecting means 103B on the displaying means 107B, the characteristics correcting means 110B indicates the correction of the characteristics to the crew of the vehicle. The crew corrects the characteristics position on the road surface according to the indication.

FIG. 39 is a conceptual diagram showing the situation that the characteristics correcting process is displayed on displaying means 107B. FIG. 40 is a flow chart showing the flow of the process in the characteristics correcting process. The procedure of the process of the characteristics correcting means 110B is described below with reference to these figures.

Process 1201: Display the present position of the characteristic point on the displaying means 107B. The example of FIG. 39 shows the situation that each image shot by the car-carried camera and the space model are superposed and displayed in a perspectively projected image from above downwardly.

Process 1202: Specify a characteristic point the position of which is shifted. In the example of FIG. 39, characteristic points 2 and 4 are the shifted points and hence specified. With regard to the specifying, when the displaying apparatus is equipped, for example, with a touch panel, the specification of the place is easily performed by touching the displaying screen with the finger.

Process 1203: Specify the correct place of said shifted characteristic point. The operator is previously informed where the correct place is.

Process 1204: When a characteristic point to be corrected is still present, repeat the above-mentioned Processes 1201 to 1203. Otherwise, terminate the correcting process of the characteristic point.

An embodiment of each means constituting an apparatus for monitoring the surroundings of a vehicle in accordance with the present invention has been described above. The flow of the overall process of the apparatus for monitoring the surroundings of a vehicle in accordance with the present invention is described below. FIG. 41 is a flow chart showing the flow of the overall process of the apparatus for monitoring the surroundings of a vehicle in accordance with the present invention. The configuration of FIG. 33(c) is assumed as the example of the configuration of the apparatus for monitoring the surroundings of a vehicle.

Process 1301: In order for the present apparatus to operate normally, correct camera parameters for each car-carried camera are previously input into the camera parameter table 102B.

Process 1302: Extract a characteristic point on the road surface from the image shot by the car-carried camera.

Process 1303: Calculate the three-dimensional coordinates of the characteristic point using the within-image coordinates of the extracted characteristic point and the camera parameters. Here, when the process of the apparatus for monitoring the surroundings of a vehicle is in progress, the present position of the coordinates of the characteristic point is calculated using the detection result of the movement direction and the movement distance of the vehicle.

Process 1304: The car-carried camera shots the image of the surroundings of the vehicle.

Process 1305: The space model generating means 104B generates a space model based on the image shot in Process 4.

A Process 1306: The mapping means 105B maps the image from the car-carried camera into the space model.

Process 1307: Compose an image viewed from a point of view specified by the driver, by referencing to the image mapped into the space model.

Process 1308: Display the image synthesized in Process 1307.

Process 1309: Check the displayed image whether the position of the characteristic point is shifted or not.

Process 1310: When shifted, interrupt for the characteristic point correction and perform the process of the characteristic point correction. When the characteristic point correction is unnecessary, return to Process 1303 and repeat the processes. For example, the above-mentioned Processes 1302 to 1309 [sic; 1309] are repeated during the driver is trying to park the vehicle in a parking space, and the present processes are terminated on completion of parking.

The situation of the surroundings of a vehicle in accordance with the present invention includes the condition of the parked vehicles as well as the above-mentioned characteristics on the road surface. In this case, the space model is generated correspondingly to the condition of the parked vehicles.

As such, in accordance with the present invention, an image viewed from an arbitrary point of view is synthesized using the images from a limited number of cameras. In the composition, a universal space model generated using the characteristics on the road surface obtained from the camera image is introduce instead of a simple plane model. In a method using a plane, since the height component is converted to the depth component in the direction of the line of sight, there has been a problem that an object having a height above the road surface is projected onto the road surface with large distortion. However, using the space model in accordance with the present invention, even an object having a height is mapped into the space with reduced distortion. Accordingly, when an object having a height is shot into the images of two cameras, the discrepancy in the overlap of the images generated by the mapping of said object into the space model is substantially improved in comparison with the plane model, whereby the quality of the image synthesized by the point-of-view conversion is improved. Thus, the situation of the surroundings is more easily recognizable for the driver with said synthesized image, thereby permitting a suitable driving operation. Further, said space model has a simple configuration thereby permitting to reduce the cost of the apparatus.

Another image generating apparatus of the present invention is described below.

An embodiment of the present invention is described below with reference to some figures. FIG. 42 is a block diagram showing an example of the configuration of an image generating apparatus in accordance with the present invention (an example of Claim 45).

An apparatus for image generating apparatus in accordance with the present embodiment has, as the basic configuration, the configuration comprising: a plurality of cameras 101C attached for grasping the situation of the surroundings of a vehicle; a camera parameter table 102C for storing the camera parameters indicating the characteristics of cameras 101C; mapping means 104C for mapping the images input from the cameras 101C, into a space model 103C generated by modeling the situation of the surroundings of the vehicle; point-of-view converting means 105C for synthesizing a single image viewed from a desired virtual point of view using the data generated by the mapping means 104C; camera parameter correcting means 106C for correcting the parameters of the cameras 101C independently for each camera; and displaying means 107C for displaying the image converted by the point-of-view converting means 105C.

The detail of each component constituting the present embodiment is described below.

Figure 43:
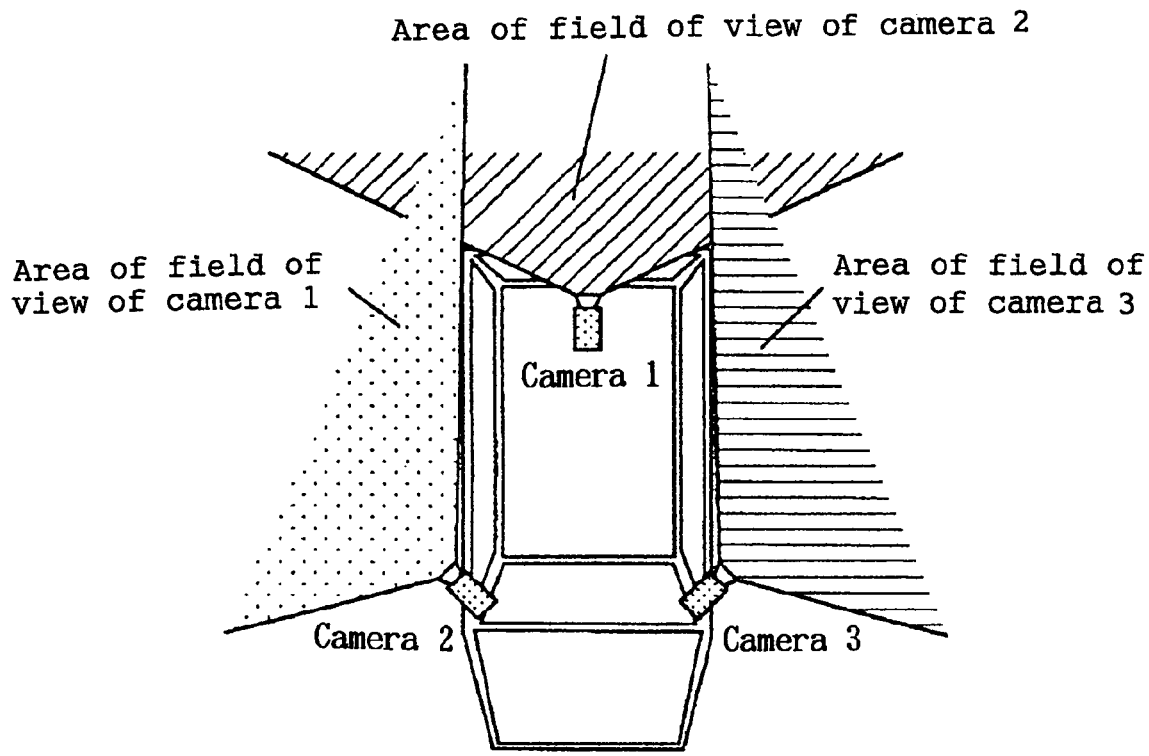
Figure 43:
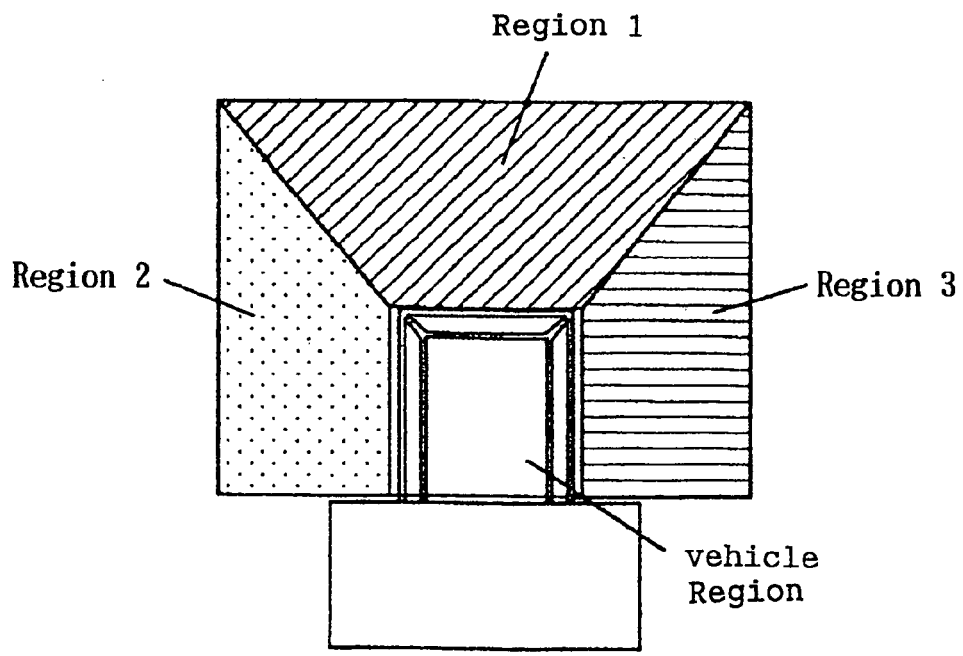

The camera 101C is a TV camera for shooting an image of a space to be monitored, such as the surroundings of a vehicle. FIG. 43(*a*) is a conceptual diagram showing an example of three cameras installed on a vehicle. When the position of the attachment onto the vehicle is a boundary portion between the roof and a side surface or between the roof and the rear surface as shown in FIG. 43(*a*) and when the camera used has preferably a large angle of field, a wide field of view is obtained and a smaller number of cameras will do. When a camera directing backward is installed in each of the right and left door mirror sections and the image from the camera is displayed on a monitor installed in the vehicle, the camera serves as the door mirror. Accordingly, the door mirror can be removed from the vehicle, thereby permitting a car design of excellence in aesthetics as well as aerodynamics.

The camera parameter table 102C is a table for storing the camera parameters. The detail thereof is as described above.

As a preparation for the detailed description of the camera parameter table 102C, a three-dimensional space coordinate system based on the vehicle is defined. FIG. 44 is a conceptual diagram showing the three-dimensional space coordinate system based on the vehicle. In the example of FIG. 44, a three-dimensional space coordinate system as an example of the three-dimensional space coordinate system is defined by:

X axis which is the straight line on the road surface just below the rear surface of the vehicle, parallel to the rear surface, Y axis which is the axis extending vertically from the road surface in the center of the rear surface of the vehicle, and Z axis which is a straight line on the road surface, perpendicular to the rear surface, through the center of the rear surface of the vehicle.

The orientation of the camera in this coordinate system is expressed using α, β and γ defined as follows.

α is the angle relative to the Y-Z plane,

β is the angle relative to the X-Z plane, and

γ is the rotation angle around the optical axis of the camera after the rotation by the above-mentioned angles α and β. The three-dimensional space coordinate system, the world coordinate system, and simply, the three-dimensional space hereafter refer to the three-dimensional space coordinate system defined above, unless otherwise mentioned.

FIG. 45 is a diagram showing the data stored in the camera parameter table 102C, in the form of a table. The contents described in FIG. 45 are as follows, in the sequence starting from the left column of the table. As shown below, the items in the second to the tenth [sic; tenth] columns in this table show an example of the camera parameters.

First column: number of a car-carried camera of FIG. 44

Second column: X coordinate of a camera position in the three-dimensional space coordinate system Third column: Y coordinate of a camera position in the three-dimensional space coordinate system Fourth column: Z coordinate of a camera position in the three-dimensional space coordinate system Fifth column: angle $\alpha$ relative to the Y-Z plane, among the camera orientation Sixth column: angle $\beta$ relative to the X-Z plane, among the camera orientation Seventh column: rotation angle $\gamma$ around the optical axis of the camera Eighth column: focal length of a camera in the three-dimensional space coordinate system Ninth column: distortion coefficient $\kappa$ 1 in the radial direction of a lens Tenth column: distortion coefficient $\kappa$ 2 in the radial direction of a lens For example, the parameters of the camera 1 of FIG. 44 are described in the second line of the camera parameter table 102C of FIG. 45. The contents indicates that the camera 1 is located at a coordinates (0, y1, 0), that the orientation is 0 degree relative to the Y-Z plane, −30 degrees relative to the X-Z plane, and no rotation around the optical axis, that the focal length is f1, and that the lens distortion coefficients $\kappa$1 and $\kappa$2 are both zero.

In the present embodiment, the point-of-view converting means 105C (described later in detail) permits to convert an image shot by the car-carried camera into an image viewed from a desired virtual point of view. Specifically, the image viewed from the virtual point of view is an image which is to be seen if a camera is placed at a desired place and at a desired orientation. Thus, the point-of-view parameters of the virtual point of view can be expressed by the same camera parameters as described above. Here, in the virtual camera lens distortion is unnecessary to consider, and hence both of the lens distortion coefficients $\kappa$1 and $\kappa$2 can be set to be zero.

FIG. 46 shows the data stored in a point-of-view parameter table 102C in the form of a table. The items in the second to the tenth [sic; tenth] columns, from left to right, of the contents describe in FIG. 46 show an example of the point-of-view parameters. The contents indicates that the virtual point of view is located at a coordinates (0, 0, z2), that the orientation is 0 degree relative to the Y-Z plane, −90 degrees relative to the X-Z plane, and no rotation around the optical axis, that the focal length is f2, and that the lens distortion coefficients $\kappa$1 and $\kappa$2 are both zero.

The mapping means 104C maps each pixel constituting the input image from the car-carried camera, into a space model 103C depending on the camera parameters. That is, it perspectively projects each image shot by the car-carried camera into the space model 103C.

Here, the space model 103C is a three-dimensional model where the mapping means 104C maps the image from the camera into the three-dimensional space coordinate system. The model used is, for example, a model consisting of a plane, a curved surface, or a plane and a curved surface. In the present embodiment, for the simplicity of description, a plane model of the road surface is used as an example of the simplest space model 103C. The method of mapping the image by the car-carried camera into said plane model is described below.

In practice, such a simple model causes a problem, for example, that an object having a height component is substantially deformed. Thus, a space model consisting of several planes, a screen plane consisting of planes and curved surfaces, and the like are more preferable. Further, when an accurate three-dimensional model of the obstacles in the surroundings of the vehicle can be obtained in real time, an synthesized image with higher precision is obtainable using such a three-dimensional model.

Before the description of the mapping process by the mapping means 104C, the method for converting the plane-of-view coordinates to the world coordinates is described below. FIG. 47 is a diagram used for the assistance of the description of the mapping of a point in the U-V coordinate system being set in the plane (plane of view hereafter) including the image into a point in the world coordinate system. This conversion is performed in the following procedure.

Procedure 1: Set a coordinate system in which the plane of view is Z=f (lens focal length) and the Z axis passes through the center of the camera image on the plane. This is called the plane-of-view coordinate system (let the origin be Oe).

Procedure 2: Let the coordinates of a point Pv (u, v) (this point corresponds to a pixel of the camera shot image) of FIG. 47 [sic; 47] in the plane-of-view coordinate system be Pe (Xe, Ye, Ze). Then, using the focal length f of the camera, the relation between Pe and Pv is expressed by the above-mentioned Equations 1 and 2 (where Ze=f in this case).

The above-mentioned two equations can determine the coordinates, in the plane-of-view coordinate system, of each pixel of the image projected onto the plane of view.

Procedure 3: Obtain the calculation formula for establishing the correspondence between the plane-of-view coordinate system and the world coordinate system. Here, assume that the plane-of-view coordinate system is in the following relation with the reference to the world coordinate system.

Let the vector from the origin Oe of the plane-of-view coordinate system to the origin Ow of the world coordinate system be (tx, ty, tz).

Thus, the positional shift between the two coordinate systems vanishes by the parallel displacement of the plane-of-view coordinate system by (tx, ty, tz).

When the camera position is known in the world coordinate system, the (tx, ty, tz) is easily obtained by inverting the sign of the coordinates of the position.

Let the rotation matrix for aligning the orientation of each axis of the plane-of-view coordinate system with that of the world coordinate system be the above-mentioned Equation (0) [sic; (0)].

This rotation matrix can be easily obtained by obtaining the rotation matrix around each of the X, Y, and Z axes based on the parameters ($\alpha$, $\beta$, $\gamma$) indicating the orientation and the rotation around the camera optical axis in the camera parameter table 102C and by making the composition of them. Here, when a point is represented by Pw (Xw, Yw, Zw) in the world coordinate system and by Pe (Xe, Ye, Ze) in the plane-of-view coordinate system, the relation of Equation (8) holds among Pe (Xe, Ye, Ze), Pw (Xw, Yw, Zw), (tx, ty, tz), and the above-mentioned rotation matrix.

Using these Equations (1), (2), and (8), a pixel Pv (u, v) on the plane of view can be converted to the coordinates Pw (Xw, Yw, Zw) in the world coordinate system.

The position of each pixel constituting the image shot by the car-carried camera is generally represented by the coordinates on a plane including the image plane. The detail thereof has been described above in FIG. 30.

FIG. 47 shows the example in which X-Z plane is used for the plane to generate the space model 103C.

The point-of-view converting means 105C composes an image shot by a camera installed at an arbitrary virtual point of view from the result of the mapping of the car-carried camera image into the space data 103C by the mapping means 104C. The outline of the method has been described above with regard to the above-mentioned point-of-view converting means 105A.

Meanwhile, during the composition of the image viewed from a camera placed at said arbitrary point of view by the point-of-view converting means 105C, a situation can occur that no color is being mapped in a point of the space model 103C corresponding to a pixel of said synthesized image. In that case, it may be replaced with a color, such as black, identifiable as a part without an object, or the color of the point in question may be interpolated or extrapolated from the periphery points having a mapped color.

The camera parameter correcting means 106C corrects the camera parameters independently for each camera.

FIG. 48 is a conceptual diagram showing an example of the configuration of an operating section for correcting the camera parameters by camera parameter correcting means 106C.

In the present embodiment, the apparatus comprises:

camera selection buttons 901C for selecting a camera to be corrected;

zoom buttons (forward and backward) 904C for moving forward and backward in the direction of the optical axis of the camera;

parallel displacement buttons (up, down, right, and left) 902C for displacing the camera in parallel to a direction perpendicular to the optical axis of the camera; and a joystick 903C for changing the orientation of the camera and for correcting the rotation around the optical axis of the camera; wherein (a) the three-dimensional position of the camera can be changed by operating the zoom button 904C and the parallel displacement button 902C, and (b) the rotation angle of the camera can be changed by the joystick 903C, wherein the following information of the camera parameters is corrected along with the above-mentioned operations (a) and (b):

(a) X, Y, and Z coordinates of the camera position in the three-dimensional space coordinate system (b) angle $\alpha$ relative to the Y-Z plane, among the camera orientation angle $\beta$ relative to the X-Z plane, among the camera orientation rotation angle $\gamma$ around the optical axis of the camera.

The corrected result is reflected immediately in Equation (8). The rotation matrix shown in Equation (0) is recalculated in Equation (8) using the new camera angle, and the (tx, ty, tz) is replaced by the new camera position. Then, an image is synthesized as the result of the correction operation using the altered Equation (8), whereby the operator can check whether the correction operation by himself is correct or not at a glance.

With regard to he operation of the joystick 903C, at least the following two kinds of operation are indispensably necessary:

(1) the operation of moving the rod of the joystick 903C to up, down, right, and left, which corresponds to the adjustment of the direction of the optical axis of the camera; and (2) the operation of rotating the rod itself of the joystick 903C, which corresponds to the adjustment of the rotation around the optical axis of the camera.

With regard to (1) among these operations of the joystick 903C, the operator can easily and intuitively grasp the direction of the camera, when the operation contents and the result are displayed as if the rod of the joystick 903C is identical to the optical axis of the camera.

For this purpose, the orientation of the camera is moved in the reversed direction of the movement of rod of the joystick 903C in the same amount instead that the direction of the moving of the optical axis of the camera is set in the same direction as the movement of rod of the joystick 903C. Then, this orientation of the camera is written into the camera parameter table 102C, as the altered orientation of the camera.

Further, in order to perform such correction as if correcting a rearview mirror, it is preferable to carry out it in the place where the camera is actually installed while watching the image of the direction of the camera orientation. For this purpose, in the present correction process, it is preferable to align the virtual point of view being set for the display, with the position and the orientation of the yet-corrected camera to be corrected. As such, the situation that the orientation and the position of the camera are changed by the correction can be grasped at a glance. The position of the virtual point of view may be restored to the original position on completion of the correction.

FIG. 49 is a block diagram showing an example of the configuration of an art relevant to the image generating apparatus in accordance with the present invention.

This configuration, in comparison with the configuration of FIG. 42, further comprises a mapping table 108C for retaining the correspondence relation between the pixels of a camera input image and the synthesized image.

FIG. 50 is a conceptual diagram showing a mapping table 108C, in the form of a table. The table is composed of the same number of the cells as the number of the pixels of the screen displayed by the displaying means 107C. That is, the table is configured such that:

the number of the columns of the table is the horizontal number of the pixels of the display screen; and that the number of the lines of the table is the vertical number of the pixels of the display screen.

Each pixel has the data of:

camera number; and pixel coordinates of the image shot by said camera. For example, the top left cell of FIG. 50 indicates the top left or (0, 0) part of the display screen. In response to the data contents (1, 10, 10) stored in said cell, the mapping means 104C performs the process of "displaying the data of the pixel (10, 10) of the image shot by the first camera onto the (0, 0) of the display screen."

Meanwhile, in order to generate the mapping table 108C, it is necessary to calculate the correspondence between the camera input image and the synthesized image. This calculation can be performed easily by the mapping means 104C and the point-of-view converting means 105C. More specifically, the following processes 1 to 2 are performed for all the cameras.

1. Select a camera and let its camera number be Cn.

2. Perform the following processes 2.1 to 2.3 for all the pixels constituting the camera image.

2.1 The mapping means 104C maps the pixel (let the coordinates be the coordinates 1) into the space model 103C

2.2 The point-of-view converting means 105C obtains the coordinates (coordinates 2) on the plane of view when the pixel mapped in 2.1 is viewed from the virtual point of view.

2.3 Write the data of the combination of (Cn, coordinates 1) into the cell corresponding to the coordinates 2 in the mapping table 108C. Here, in case that the display region of each camera is given, the data is written in only when the coordinates 2 is within the display region.

When the mapping table 108C has been generated, the displaying means 107C replaces the camera image into the display image directly using the table, instead of displaying the synthesized image using the process result of the mapping means 104C and the point-of-view converting means 105C. This method permits to speed up the composition process of the image from the plurality of cameras.

An embodiment of each means constituting an image generating apparatus in accordance with the present invention has been described above. The flow of the correction process of the image generating apparatus in accordance with the present invention is described below.

FIG. 51 is a flow chart showing the flow of the process of correcting the camera parameters. FIGS. 52 and 53 are conceptual diagrams used for the assistance of the description of the process of correcting the camera parameters. FIGS. 52(*a*) and 52(*b*) show a display screen during the correction of the camera parameters. FIGS. 53(*a*) and 53(*b*) show a display screen during the time without the correction of the camera parameters (that is, normal state).

Process 1201: Select a camera to be corrected using the camera selection buttons and the like. In that case, a situation is displayed that the synthesized image is shifted as FIG. 53(*a*).

Process 1202: Change the virtual point of view correspondingly to the position and the orientation of the selected camera and compose the image. When the virtual point of view is changed, an image viewed from the point-of-view position of the selected camera is displayed on the screen as shown in FIG. 52(*a*), whereby the situation of the shift of the camera from the point of view can be grasped.

Process 1203: Correct the three-dimensional space position and the orientation of the camera using the zoom buttons 904C, the parallel displacement buttons 902C, and the joystick 903C. The virtual point of view is kept fixed during the correction process. After a proper correction, the situation without a shift is displayed on the screen as shown in FIG. 52(*b*).

Process 1204: On completion of the correction of the camera in question, write the corrected camera parameters into the camera parameter table 102C.

Process 1205: When another camera needs correction, select said camera next and repeat the above-mentioned Processes 1201 to 1204. Otherwise, proceed to the next Process 1206.

Process 1206: Restore the virtual point of view changed in Process 1202 into the virtual point of view of a time before the correction process of the camera, and compose the image. As a result of the composition, the image without a shift is displayed on the screen as shown in FIG. 52(*b*). Checking it, the correction process of the camera parameters is terminated.

As shown in the conceptual diagrams of FIGS. 52 and 53, with regard to the part of the border between the images by the car-carried cameras, when a marker (for example, a line) which is not so disturbing to the eye is marked in the border section, it is easily understood which camera is displayed where.

As such, in the present invention, an image viewed from an arbitrary virtual point of view is synthesized using the images from a limited number of cameras. In case that the position and the orientation of the camera are shifted due to vibration and the like during the running of the vehicle, said shift has been difficult to correct in the prior art. In accordance with the present invention, the driver obtains an optimal image by moving the position and changing the orientation of the point of view only for the camera having a shift while checking the displayed image when necessary. This process is realized by the camera parameter correcting means for correcting the point of view, and is carried out as if a rearview mirror is adjusted.

Therefore, even when a shift occurs in a part of the synthesized image, the driver can easily correct the shift without a large cost and trouble for the adjustment.

Further, in the present invention, the point-of-view converting means changes the virtual point of view into the position of the car-carried camera to be corrected thereby to compose the image during the correction operation of the point of view by the driver. Thus, the correction of the orientation and the position of the car-carried camera can be performed as if a rearview mirror is corrected.

Furthermore, in the present invention, the camera parameters, such as the orientation and the position, of the point of view being virtually set are corrected instead of correcting the orientation of an actual camera. Thus, the mechanism for changing the orientation of the camera becomes unnecessary, whereby the cost of the apparatus can be reduced.

FIG. 54 is a block diagram showing another embodiment of the present invention. The same means as that of FIG. 42 is assigned with the same numeral, and hence the description is omitted. The new point is to comprise guide data storing means 110C for storing the guide data for guiding the correction of the camera parameters indicating the characteristics of a camera. The guide data is superposed onto the input image by the image synthesizing means 109C, and displayed by the displaying means 107C. The guide data can be generated by an arbitrary generating method and, for example, is generated by the following method and used.

The configuration of FIG. 55 further comprises, in addition to that of FIG. 54, characteristics generating means 111C for generating a point source of light at a predetermined place of a vehicle and characteristics extracting means 112C capable of extracting the characteristics, wherein the characteristics extraction result can be stored into storing means 110C as said guide data.

For example, FIG. 56 is characterized by the point source of light. The rear [sic; rear] side of the vehicle is equipped with several lamps 113C (a). This lamp 113C corresponds to the characteristics generating means 111C. Images of the rear [sic; rear] side of the body of the vehicle shot by the cameras 1 and 2 (*f*) attached on the rear trunk [sic; rear trunk] is shown in (b and c). The characteristics extracting means 112C extracts the luminous characteristics from the image by image processing (d and e).

FIGS. 57 (*a*) to (*e*) show an example in which a line segment of a part of the vehicle is taken as the characteristics.

That is, the line segment in the rear right corner part of the vehicle is extracted by the image processing.

The positional relation of these of the point source of light and the line segment is invariant relatively to the camera regardless of the movement of the vehicle. Accordingly, when the direction and the like of the camera is changed due to vibration, the camera parameters can be corrected using the invariant characteristics. The detailed method for this is described below.

In FIG. 58, a closed circle indicates the place [sic; place] where a point source of light should be present. An open circle indicates a point source of light shot when the camera is shifted. An image in the shifted state is obtained as shown in (a). Then, using the joystick 903C to correct the parameters as described above, the circles coincides (b and c). As such, the calibration can be performed easily.

Figure 59A:
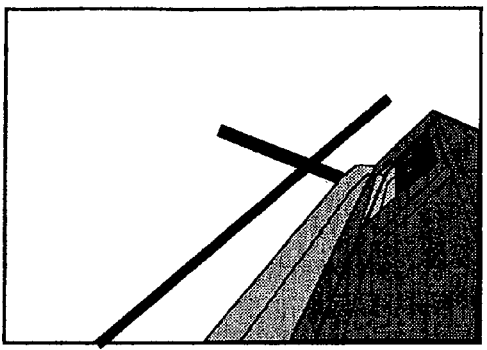
Figure 59B:
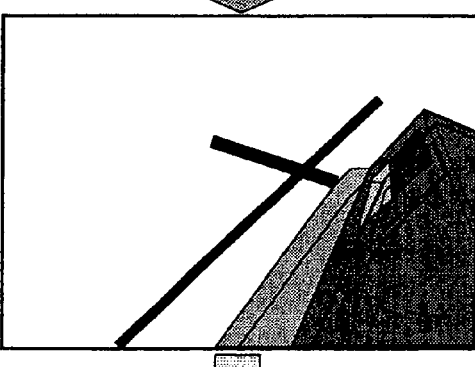
Figure 59C:
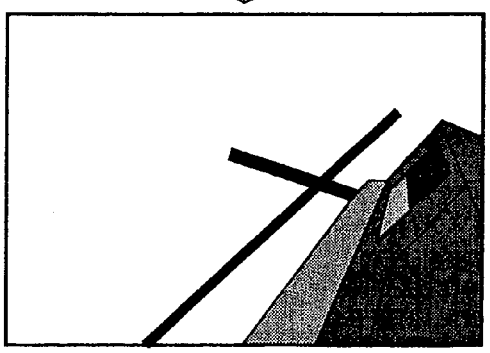

FIGS. 59(a) to 59(c) shows an example of the calibration using the above-mentioned line segment.

Here, the above-mentioned characteristics can be generated by another method such as the irradiation of pattern light.

Another embodiment of the present invention is described below.

FIG. 60 is a block diagram showing an example of the configuration of an image generating apparatus in accordance with the present invention (an example of Claim 55).

An apparatus for monitoring the surroundings of a vehicle in accordance with the present embodiment has, as the basic configuration, the configuration comprising: a plurality of cameras 101D attached for grasping the situation of the surroundings of a vehicle; a camera parameter table 102D for storing the camera parameters indicating the characteristics of cameras 101D; mapping means 104D for mapping the images input from the cameras 101D, into a space model 103D generated by modeling the situation of the surroundings of the vehicle; a point-of-view parameter table 108D for storing the point-of-view parameters including at least position and direction; point-of-view converting means 105D for synthesizing a single image viewed from a desired virtual point of view using the data generated by the mapping means 104D; point-of-view parameter correcting means 106D for correcting the parameters of said virtual point of view; and displaying means 107D for junctioning and displaying the image converted by the point-of-view converting means 105D.

The detail of each component constituting the present embodiment is described below.

The camera 101D is a TV camera for shooting an image of a space to be monitored, such as the surroundings of a vehicle. The camera is attached on the vehicle as shown in FIG. 43.

The camera parameter table 102D is a table for storing the camera parameters. The camera parameter is as described above.

As a preparation for the detailed description of the camera parameter table 102D, a three-dimensional space coordinate system based on the vehicle is defined. This is as described above in FIG. 44.

The data stored in the camera parameter table 102D is the same as that of FIG. 45.

In the present embodiment, the point-of-view converting means 105D (described later in detail) permits to convert an image shot by the car-carried camera into an image viewed from a desired virtual point of view. Specifically, the image viewed from the virtual point of view is an image which is to be seen if a camera is placed at a desired place and at a desired orientation. Thus, the point-of-view parameters of the virtual point of view can be expressed by the same camera parameters as described above.

FIG. 61 is a diagram showing the data stored in the point-of-view parameter table 108D, in the form of a table. In FIG. 61, three sets of the point-of-view parameters are stored, and each set corresponds to each of three car-carried cameras in one-to-one correspondence.

For example, the image shot by the camera 1 is converted to an image viewed from the virtual point of view 1 by the point-of-view conversion, and the image shot by the camera 2 is converted to an image viewed from the virtual point of view 2 by the point-of-view conversion.

As such, by setting a virtual point of view for each camera, when a shift occurs on the display screen in a junction part between the image of the camera in question and the image of another camera due to the positional shift and the like of the camera, the changing of the parameters of the virtual point of view only the shifted camera image of which is watched permits an intuitive correction of the shift. The detail of the method of the correction is described later in the explanation of the point-of-view parameter correcting means.

The items in the second to tenth [sic; tenth] columns of the contents describe in FIG. 61 show an example of the point-of-view parameters. It is as follows from left to right.

That is, the example of the second line of FIG. 61 describes that the virtual point of view 1 is located at a coordinates (0, 0, z2), that the orientation is 0 degree relative to the Y-Z plane, −90 degrees relative to the X-Z plane, and no rotation around the line-of-sight axis, that the focal length is f2, and that the lens distortion coefficients κ1 and κ2 are both zero.

The mapping means 104D maps each pixel constituting the input image from the car-carried camera, into a space model 103D depending on the camera parameters. That is, it perspectively projects each image shot by the car-carried camera into the space model 103D.

Here, the space model 103D is a three-dimensional model where the mapping means 104D maps the image from the camera into the three-dimensional space coordinate system. The model used is, for example, a model consisting of a plane, a curved surface, or a plane and a curved surface. In the present embodiment, for the simplicity of description, a plane model of the road surface is used as an example of the simplest space model 103D. The method of mapping the image by the car-carried camera into said plane model is described below.

In practice, such a simple model causes a problem, for example, that an object having a height component is substantially deformed. Thus, a space model consisting of several planes, a screen plane consisting of planes and curved surfaces, and the like are more preferable. Further, when an accurate three-dimensional model of the obstacles in the surroundings of the vehicle can be obtained in real time, an synthesized image with higher precision is obtainable using such a three-dimensional model.

Before the description of the mapping process by the mapping means 104C, the method for converting the plane-of-view coordinates to the world coordinates is necessary to describe, however, this is the same as described above with regard to FIG. 47.

The position of each pixel constituting the image shot by the car-carried camera is generally represented by the coordinates on a plane including the image plane. The detail thereof has been described above in FIG. 47 [sic; FIG. 47].

The point-of-view converting means 105D composes an image shot by a camera installed at an arbitrary virtual point of view from the result of the mapping of the car-carried camera image into the space data 103D by the mapping means 104D. The outline of the method has been described above with regard to the point-of-view converting means 105A.

Meanwhile, during the composition of the image viewed from a camera placed at said arbitrary point of view by the point-of-view converting means 105D, a situation can occur that no color is being mapped in a point of the space model 103D corresponding to a pixel of said synthesized image. That case has been described above.

FIG. 62 is a conceptual diagram showing the situation that each pixel constituting the input image from a car-carried camera is mapped onto a plane of the space model 103D by the mapping means 104D and that an image shot by a camera installed at the virtual point of view is synthesized from the result mapped onto the plane.

The point-of-view parameter correcting means 106D can correct the parameters of the virtual point of view being set for each camera, independently for each camera.

FIG. 63 is a conceptual diagram showing an example of the configuration of an operating section for correcting the virtual-point-of-view parameters by point-of-view parameter correcting means 106D.

In the present embodiment, the apparatus comprises:
point-of-view selection buttons 1001 for selecting a virtual point of view to be corrected;
zoom buttons (forward and backward) 1004 for moving forward and backward on the center axis of the line of sight from the virtual point of view;
parallel displacement buttons (up, down, right, and left relative to an image plane) 1002 for displacing the virtual point of view in parallel to a direction perpendicular to the line of sight from the point of view; and
a joystick 1003D for changing the direction of the line of sight from the virtual point of view and for correcting the rotation around the direction of the line of sight from the virtual point of view; wherein
(a) the three-dimensional position of the virtual point of view can be changed by operating the zoom button 1004D and the parallel displacement button 1002D, and
(b) the direction of the line of sight from the virtual point of view can be changed by the joystick 1003D, wherein
the following information of the virtual-point-of-view parameters in question is corrected and overwritten on the point-of-view parameter table 108D along with the above-mentioned operations (a) and (b):
(a) X, Y, and Z coordinates of the virtual-point-of-view position in the three-dimensional space coordinate system
(b) angle α relative to the Y-Z plane, among the direction of the line of sight from the virtual point of view
angle β relative to the X-Z plane, among the direction of the line of sight from the virtual point of view
rotation angle β around the center axis of the line of sight from the virtual point of view.

The corrected result is reflected immediately in Equation (8). The rotation matrix shown in Equation (0) is re-calculated in Equation (8) using the new direction of the line of sight, and the (tx, ty, tz) is replaced by the coordinates of the new virtual-point-of-view position.

Then, an image is synthesized as the result of the correction operation using the altered Equation (8). By watching the synthesized image, the operator can check whether the correction operation by himself is correct or not at a glance.

Among the operation of the parameter correction of the virtual point of view, the operation of changing the orientation, the position, and the rotation of the virtual point of view is intuitively understandable for the operator when the contents of the operation agrees with the behavior of the image of the operation result. For this purpose, in the following three operations among the operation of the parameter correction, the operation direction of the operation of changing the orientation, the position, and the rotation of the virtual point of view is set reverse to the actual change direction of the point-of-view parameters, as is described in Claim 57 of the present invention:

(1) the operation of moving the rod of the joystick 1003D to up, down, right, and left, which corresponds to the adjustment of the direction of the line of sight from the virtual point of view;

(2) the operation of rotating the rod itself of the joystick 1003D, which corresponds to the adjustment of the rotation around the line of sight from the virtual point of view; and (3) the operation of the parallel displacement buttons 1002D, which corresponds to the operation of displacing the virtual point of view in parallel to a direction perpendicular to the line of sight from the point of view.

That is, with regard to the joystick 1003D for example, the direction of the line of sight is moved in the reversed direction of the movement of rod of the joystick 1003D in the same amount instead that the direction of the moving of the direction of the line of sight is set in the same direction as the movement of rod of the joystick 1003D. Then, the moved state is written into the point-of-view parameter table 102D, as the altered direction of the line of sight. For example, when the joystick 1003D is tilted to right by 10 degrees, the point-of-view parameter is then set to a value in which the direction of the line of sight is tilted to left by 10 degrees relatively to the current line of sight. Similarly, when the joystick 1003D is rotated clockwise by 5 degrees, the point-of-view parameter is then set to a value in which the rotation angle around the center axis of the line of sight is rotated anticlockwise by 5 degrees. This situation is the same also for the operation of the parallel displacement button 1004D.

FIG. 64 is a block diagram showing an example of the configuration of an art relevant to the image generating apparatus in accordance with the present invention.

This configuration, in comparison with the configuration of FIG. 60, further comprises a mapping table 109D for retaining the correspondence relation between the pixels of a camera input image and the synthesized image.

A conceptual diagram showing a mapping table 109D in the form of a table has the same contents as FIG. 50, and hence the detail is omitted. The table is composed of the same number of the cells as the number of the pixels of the screen displayed by the displaying means 107D.

In such an image generating apparatus, when the point-of-view parameter is corrected by the point-of-view parameter correcting means, the part, in which an alteration occurs due to the correction, of the correspondence relation between the pixels of the camera input image and the synthesized image is re-calculated by the above-mentioned procedure.

When the mapping table 109D has been generated, the displaying means 107D replaces the camera image into the display image directly using the table, instead of displaying the synthesized image using the process result of the mapping means 104D and the point-of-view converting means 105D. This method permits to speed up the composition process of the image from the plurality of cameras.

Another method is described below for the fast correction of the mapping table in case that the position, the orientation, and the like of the virtual point of view is changed by said point-of-view parameter correcting means.

FIG. 65(a) is a block diagram showing an example of the configuration of an art relevant to an image generating apparatus in accordance with the present invention. FIG. 65(b) is a conceptual diagram showing an example of a car-carried camera synthesized image before the point-of-view parameter correction. FIG. 65(c) is a conceptual diagram showing an example of a car-carried camera synthesized image after the point-of-view parameter correction.

The present image generating apparatus has the configuration, in addition to the previous apparatus, further comprising: mapping table correcting means 110D for re-calculating said mapping table using the point-of-view parameter altered by the process of the point-of-view parameter correcting means; and a buffer 111D for temporarily storing the data being under the process of the mapping table correcting means 110D.

The mapping table correcting means 110D can alter the contents of the above-mentioned mapping table without performing the complicated calculation of Equation (8), by reflecting the correction result of the point-of-view parameter into Equation (8). The method of altering the mapping table is described below sequentially.

FIGS. 66(a) to 66(c) are conceptual diagrams used for the assistance of the description of the method of altering the mapping table. In these figures, a gray parallelogram indicates the image plane before the virtual-point-of-view correction, and a white parallelogram indicates the image plane after the virtual-point-of-view correction. The configuration of the operating section for the correction of the virtual-point-of-view parameters is assumed to be as shown in FIG. 63.

Process 1: Prepare previously the buffer 111D for temporarily storing the alteration result of the mapping table.

Process 2: Obtain the point-of-view parameter correction information of any of parallel displacement, direction, rotation, and zoom by the point-of-view parameter correcting means. Calculate the data (table conversion data hereafter) of the correspondence relation between the display coordinates (u, v) before the virtual-point-of-view correction and the display coordinates (u', v') after the correction, by any of the following four processes correspondingly to the contents of the information, and then write it into the buffer 111D.

(1) The Operation of the Parallel Displacement Button

In case of parallel displacement, acquire the displacement distance (du, dv) before and after the displacement in the unit of pixel from the parallel displacement button as shown in FIG. 66(a). Obtain the relation between the coordinates P1 before the alteration and the coordinates P1' after the alteration using Equation (10), and then write the above-mentioned relation into the buffer 111D.

$$P_1:(u_1,v_1) \rightarrow P'_1:(u'_1,v'_1)=(u_1-du, v_1-dv) \quad \text{Equation 10}$$

(2) The Operation of the Direction Correction by the Joystick

In case of the direction of the line of sight from the virtual point of view, acquire the difference ($\theta, \phi$) between the angles before and after the alteration as shown in FIG. 66(b). Obtain the relation between the coordinates P2 before the alteration and the coordinates P2' after the alteration using Equations (11) and (12), and then write the above-mentioned relation into the buffer 111D.

$$u'_2 = \frac{u - d \cdot \tan\theta}{1 + \frac{u_2}{d} \cdot \tan\theta} \quad \text{Equation 11}$$

$$v'_2 = \frac{u - d \cdot \tan\phi}{1 + \frac{v_2}{d} \cdot \tan\phi} \quad \text{Equation 12}$$

(3) The Operation of Rotation by the Joystick

In case of the correction of rotation around the direction of the line of sight from the virtual point of view, acquire the rotation angle $\rho$ before and after the alteration as shown in FIG. 66(c). Obtain the relation between the coordinates P3 before the alteration and the coordinates P3' after the alteration using Equation (13), and then write the above-mentioned relation into the buffer 111D.

$$P_3:(u_3, v_3) \rightarrow P'_3:(u'_3, v'_3) = (u_3 v_3)\begin{pmatrix} \cos\rho\sin\rho \\ -\sin\rho\cos\rho \end{pmatrix} \quad \text{Equation 13}$$

(4) The Operation of the Zoom Button

In case of the correction of zoom (magnification), acquire the magnification k before and after the alteration from the zoom button. Obtain the relation between the coordinates P4 before the alteration and the coordinates P4' after the alteration using Equation (14), and then write the above-mentioned relation into the buffer 111D.

$$P_4: (u,v_4) \rightarrow P'_4:(u'_4,v'_4)=(k \cdot u_4, k \cdot u_4) \quad \text{Equation 14}$$

Process 3: Alter the mapping table by referring to the buffer 111D. The contents of the alteration of the coordinates 1 of each pixel of the mapping table is written by the above-mentioned Process 2, for example, as the following table conversion data in the buffer 111D.

(coordinates before alteration: P, coordinates after alteration: P')

By referring to the data, when all the cell in the mapping table satisfy the following conditions (a) and (b), alter the coordinates 1:P before alteration of the cell into the coordinates P' after alteration of said table conversion data.

(a) The camera number of the cell coincides with the number of the car-carried camera corresponding to the virtual point of view which is the objective of the correction.

(b) The coordinates 1:P before alteration of the cell coincides with the coordinates of the left side term of said table conversion data.

Here, the cell in which the camera number of the cell coincides with the number of the car-carried camera corresponding to the virtual point of view which is the objective of the correction but in which the correction of the coordinates 1 is not performed is concluded to be out side of the field of view from the virtual point of view in which the correction has been performed. Thus, coordinate values of the region outside of the display area of the displaying means are written in. In that case, the displaying means can display a color, such as black, indicating the out-field when undisplayable coordinates are input.

An embodiment of each means constituting an image generating apparatus in accordance with the present invention has been described above. The flow of the correction process of the image generating apparatus in accordance with the present invention is described below.

FIG. 67 is a flow chart showing the flow of the process of correcting the point-of-view parameters in the image generating apparatus of the present invention. FIGS. 68(a) to 68(c) are conceptual diagrams used for the assistance of the description of the process of correcting the point-of-view parameters.

1. (Process 1501) Select a virtual point of view to be corrected using the point-of-view selection buttons 1001D and the like. In that case, a situation is displayed that the synthesized image is shifted as FIG. 68(a).

2. (Process 1502) As described in Claim 58 of the present invention, replace the virtual point of view in correction by a tentative virtual point of view (for example, a point of view before correction) and then fix it.

3. (Process 1503) Correct the three-dimensional space position of the virtual point of view and the direction of the line of sight using the zoom buttons 1004D, the parallel displacement buttons 1002D, and the joystick 1003D. Since the point of view is fixed by the above-mentioned Process 2 during the correction process, the work of the point-of-view correction can be carried out as if a camera placed at the point of view is adjusted by hand. If the correction is proper, the situation without a shift is displayed, for example, as shown in FIG. 68(c), after the screen shown in FIG. 68(b) is displayed.

4. (Process 1504) On completion of the correction of the virtual point of view in question, write the corrected point-of-view parameters into the point-of-view parameter table 108D.

5. (Process 1505) When another virtual point of view needs correction, select said virtual point of view next and repeat the above-mentioned Processes 1501 to 1504. Otherwise, proceed to the next Process 1506.

6. (Process 1506) Release the state that the virtual point of view is fixed to the tentative virtual point of view. As a result of the composition, the situation without a shift is displayed on the screen as shown in FIG. 52(b). Checking it, the correction process of the point-of-view parameters is terminated.

As shown in the conceptual diagrams of FIGS. 68(a) to 68(c), with regard to the part of the border between the images by the car-carried cameras, when a marker (for example, a broken line) which is not so disturbing to the eye is marked in the border section, it is easily understood which camera is displayed where.

As such, in the present invention, an image viewed from an arbitrary virtual point of view is synthesized using the images from a limited number of cameras. In case that the position and the orientation of the camera are shifted due to vibration and the like during the running of the vehicle, the work to align the shifted image with the other image has been difficult in the prior art because of the prior art uses the method such that the shift is restored by the fine adjustment of the camera itself. However, in the present invention, by introducing the concept of virtual point of view, the image having a shift can be solely corrected by the point-of-view parameter correcting means while watching the image viewed from the virtual point of view as if a camera placed at the point of view is adjusted. At that time, the corrected state of the movement and the orientation of the point-of-view position are fed back successively as an image. Accordingly, the worker of the correction can obtain the optimal image by checking the display image successively. Therefore, the work of the alignment of the images becomes substantially easy in comparison with the prior art, and a small shift does not require the adjustment of the camera parameters using a large apparatus.

Further, in the present invention, the camera parameters, such as the orientation and the position, of the point of view being virtually set are corrected instead of correcting the orientation of an actual camera. Thus, the mechanism for changing the orientation of the camera becomes unnecessary, whereby the cost of the apparatus can be reduced.

INDUSTRIAL APPLICABILITY

An image generating apparatus of the present invention is applicable in the fields of the monitoring of the surroundings of a vehicle, the monitoring of the inside of a shop, and the like, and capable of easily synthesizing a synthesized image having the feeling as if actually viewed from a virtual point of view, using the images shot by respective cameras.

Further the apparatus has a feature that a shift in the direction of a camera can be easily corrected in the image.

The invention claimed is:

1. An image generating apparatus comprising:
at least one camera provided on a vehicle;
a space reconstructing unit operable to generate a space data by mapping an input image from said at least one camera into a predetermined space model of a predetermined three-dimensional space;
a converting unit operable to generate a synthesized image by referencing to said space data, said synthesized image including a shape of the vehicle and a surrounding space of the vehicle, said synthesized image arranged in a manner as looked down from a virtual viewpoint located outside the vehicle, said virtual viewpoint being different from a viewpoint of the camera; and
a displaying unit operable to display the synthesized image.

2. An image generating apparatus of claim 1 comprising a camera parameter table for storing a camera parameter indicating characteristics of said camera, wherein said space reconstructing unit performs the mapping depending on said camera parameter.

3. An image generating apparatus of claim 1 wherein said space model is a predetermined plane in said three-dimensional space.

4. An image generating apparatus of claim 3 wherein said camera is attached on said vehicle and said predetermined plane is the road surface under the vehicle.

5. An image generating apparatus of claim 1 wherein, during the constitution of a predetermined point P of said space model as a pixel from said virtual viewpoint, in case that said point P corresponds to an image shot by one camera, said converting unit determines a color of said pixel using a color of pixels of the image from the camera.

6. An image generating apparatus of claim 1 wherein, during the constitution of a predetermined point P of said space model as a pixel from said virtual viewpoint, in case that said point P corresponds to an image shot by a plurality of cameras, said converting unit determines a color of said pixel using a color of pixels of the images from said plurality of cameras.

7. An image generating apparatus of claim 1 wherein, during the constitution of a predetermined point P of said space model as a pixel from said virtual viewpoint, in case that said point P does not correspond to an image shot by any camera, said converting unit determines a color of said pixel using a color interpolated by the color of the periphery of said point P or using a color that is identifiable as a part where there is no object.

8. An image generating apparatus of claim 2 comprising calibrating means of obtaining the camera parameter indicating said camera characteristics by input or calculation.

9. An image generating apparatus of claim 8 comprising characteristic point extracting means of acquiring, by manual input or automatic extraction, a plurality of characteristic points necessary to obtain the camera parameter by said calculation, wherein
said calibrating means calculates at least any of an attachment position of the camera, an attachment angle of the camera, a lens distortion correction value of the camera, and a focal length of the camera using the characteristic point extracted by said characteristic point extracting means.

10. An image generating apparatus of claim 9 wherein said characteristic point extracting means includes the function of extracting a plurality of characteristic points a coordinate value of which is known in said three-dimensional space, and wherein
said calibrating means calculates said camera parameter using said plurality of characteristic points.

11. An image generating apparatus of claim 10 wherein said camera is attached on said vehicle and wherein a marker provided in a part of the vehicle is used as the plurality of characteristic points, the coordinate value of which is known in said three-dimensional space.

12. An image generating apparatus of claim 10 comprising characteristic point generating means of generating, within a field of view of said camera, a plurality of characteristic points the coordinate value of which is known in said three-dimensional space.

13. An image generating apparatus of claim 12 wherein said characteristic point generating means has the function of irradiating a pattern light as said characteristic point within the field of view of said camera.

14. An image generating apparatus of any of claims 8 to 13 comprising a temperature sensor for measuring a temperature and a temperature correction table for storing an amount of variation in said camera parameter which changes in response to the temperature, wherein
said calibrating means has the function of monitoring the temperature of said temperature sensor successively and of correcting said camera parameter depending on said temperature correction table in response to a temperature change.

15. An image generating apparatus of claim 14 wherein said temperature sensor is attached in the vicinity of or in association with each of said camera.

16. An image generating apparatus of any of claims 4 or 11, wherein said space data generated by said space reconstructing unit is temporarily stored in a space data buffer, and wherein said apparatus comprises: movement direction detecting means for detecting a movement direction of said vehicle; movement distance detecting means for detecting a movement distance of the vehicle in a unit time; and space data converting means for converting the space data stored in said space data buffer using at least either the movement direction of the vehicle detected by said movement direction detecting means or the movement distance of the vehicle detected by said movement distance detecting means.

17. An image generating apparatus of claim 1 wherein said camera is attached on said vehicle, and wherein said apparatus comprises: camera correction indicating means of detecting a situation requiring the calibration of the camera thereby indicating a camera calibration when the camera calibration is necessary; and correction history recording means of recording a date and time or a running distance when said camera calibration is performed.

18. An image generating apparatus of claim 17 wherein said camera correction indicating means has the function of referencing to said correction history recording means thereby indicating the camera calibration to the driver when a predetermined time has elapsed since a time of the previous calibration or when the running distance since the time of the previous calibration has reached a predetermined distance.

19. The image generating apparatus of claim 1 wherein a relative positional relationship of the space model with respect to the vehicle is fixed.

20. An image generating method comprising:
generating a space data by mapping an input image from at least one camera provided on a vehicle, located in a predetermined three-dimensional space, into a predetermined space model of said predetermined three-dimensional space; and
generating a synthesized image by referencing to the space data, said synthesized image arranged in a manner as looked down from a virtual viewpoint located outside the vehicle, said virtual viewpoint being different from a viewpoint of the camera;
wherein said synthesized image includes a shape of the vehicle and a surrounding space of the vehicle.

21. An image generating method of claim 20 wherein said space model is a plane constituting a part of said three-dimensional space.

22. An image generating method of claim 20 wherein said mapping is performed depending on a camera parameter indicating camera characteristics.

23. An image generating method of claim 22 comprising a calibrating step of obtaining the camera parameter indicating said camera characteristics by input or calculation.

24. An image generating method of claim 23 wherein said calibrating step is a step of obtaining the camera parameter by calculation, and wherein said method comprises a characteristic point extracting step of acquiring, by manual input or automatic extraction, a plurality of characteristic points necessary for the calculation of said camera parameter.

25. An image generating method of claim 24 comprising a characteristic point generating step of generating, within a field of view of said camera, a plurality of characteristic points a coordinate value of which is known in said three-dimensional space.

26. An image generating method of claim 25 wherein said characteristic point generating step includes at least the step of irradiating a light pattern as said characteristic point within the field of view of said camera.

27. An image generating method of claim 25 wherein said camera is attached on said vehicle, and wherein said method comprises: a movement direction detecting step of detecting a movement direction of said vehicle; a movement distance detecting step of detecting a movement distance of said vehicle in a unit time; and a space data converting step of converting the space data using both the movement direction of the vehicle detected by said movement direction detecting step and the movement distance of the vehicle detected by said movement distance detecting step.

28. An image generating method of claim 25 wherein said camera is attached on said vehicle, and wherein
said method comprises: a camera correction indicating step of detecting a situation requiring a calibration of said camera thereby indicating a camera calibration when the camera calibration is necessary; and a correction history recording step of recording a date and time or a running distance when the camera calibration is performed.

29. An image generating apparatus of claim 1 wherein said camera is attached on said vehicle and said space reconstructing unit comprises space model generating means of generating said space model.

30. An image generating apparatus of claim 1 wherein said space model is a model of one or more planes, a model of one or more curved surfaces, or a model of the combination of one or more planes and one or more curved surfaces.

31. An image generating apparatus of claim 29 wherein said space model generating means generates, as said space model, at least a first plane of a road surface and at least one second plane intersecting said first plane.

32. An image generating apparatus of claim 31 comprising: a distance sensor for measuring a distance; and obstacle detecting means of measuring, as a situation of surroundings of said vehicle, at least a distance to an obstacle existing in the surroundings of the vehicle by said distance sensor, and wherein
said second plane is generated by said space model generating means when the distance from the vehicle to the obstacle detected by said obstacle detecting means is smaller than a predetermined value.

33. An image generating apparatus of claim 32 wherein said second plane generated by said space model generating means is removed from said space model when said distance from the vehicle to the obstacle is larger than said predetermined value.

34. An image generating apparatus of claim 29 wherein said space model generating means generates said space model in response to a situation of surroundings of said vehicle.

35. An image generating apparatus of claim 34 comprising: a distance sensor for measuring a distance; and obstacle detecting means for measuring, as the situation of the surroundings of said vehicle, at least a distance to an obstacle existing in the surroundings of the vehicle by said distance sensor.

36. An image generating apparatus of claim 34 wherein said vehicle situation is a condition of a road surface in the surroundings of said vehicle, and wherein said apparatus comprises road-surface characteristics detecting means of detecting characteristics of the condition of the road surface.

37. An image generating apparatus of claim 36 wherein a white line indicating a parking space, an end point of the white line, or a corner of intersecting white lines is used as said characteristics of the condition of the road surface.

38. An image generating apparatus of claim 34 further comprising: movement direction detecting means of detecting a movement direction of said vehicle; and movement distance detecting means of detecting a movement distance of the vehicle in a unit time; and wherein said apparatus successively corrects said space model depending on a present position of characteristics on a road surface obtained from process results of said movement direction detecting means and said movement distance detecting means.

39. An image generating apparatus of claim 36 comprising characteristics correcting means of correcting a process result while displaying the process result of said road-surface characteristics detecting means on said displaying unit.

40. An image generating apparatus comprising: at least one camera provided on a vehicle; a camera parameter table for storing a camera parameter indicating camera characteristics; mapping means for mapping the input image from said camera, into a predetermined space model of the three-dimensional space using said camera parameter; a converting means for synthesizing an image by referencing to said space data mapped by said mapping means, said synthesized image arranged in a manner as looked down from a virtual viewpoint located outside the vehicle; and camera parameter correcting means for correcting the parameter of said camera, wherein the virtual viewpoint is different from a stereoscopic image formed from input images, and the synthesized image includes a shape of the vehicle and a surrounding space of the vehicle.

41. An image generating apparatus of claim 40 wherein said converting means switches said virtual viewpoint according to a time of process or a time of normal operation of said camera parameter correcting means.

42. An image generating apparatus of claim 41 wherein said converting means determines said virtual viewpoint depending on the camera parameter of any of said cameras in the time of process of said camera parameter correcting means.

43. An image generating apparatus of claim 42 wherein said converting means determines said virtual viewpoint depending on a camera parameter of the camera being under the correction, in the time of process of said camera parameter correcting means.

44. An image generating apparatus of any of claims 40 to 43 wherein a direction of an operation of changing the direction of the viewpoint is set to be reverse to the direction of said viewpoint, in said converting means.

45. An image generating apparatus of any of claims 40 to 43, further comprising displaying means, operable to display the synthesized image, wherein said displaying means displays a mark indicating a boundary, in superposition on the synthesized image in a boundary part where respective images contact when displaying the image from each camera.

46. An image generating apparatus of claim 40 comprising: guide data recording means of storing guide data serving as a guide for the correction of said camera parameter; and displaying means of displaying the input image from said camera and said guide data in superposition.

47. The image generating method of claim 20 wherein a relative positional relationship of the space model with respect to the vehicle is fixed.

48. An image generating apparatus of claim 46 wherein said guide data is characteristics of a body of said vehicle represented by a point and/or a line segment.

49. An image generating apparatus of claim 46 wherein said guide data is obtained using: characteristic point generating means for generating, within a field of view of said camera, a plurality of characteristic points, a coordinate value of which is known in the three-dimensional space; characteristic point extracting means of extracting said plurality of characteristic points; and said plurality of extracted characteristic points.

50. An image generating apparatus comprising: at least one camera provided on a vehicle; image inputting means of inputting an image from said camera; a camera parameter table for storing a camera parameter indicating camera characteristics; mapping means for mapping, using said camera parameter, each pixel constituting the input image into a predetermined space model of a predetermined three-dimensional space generated by a modeling of a situation of surroundings of the vehicle; a point-of-view parameter table for storing a virtual-point-of-view parameter including at least the data of a position and an orientation for each of a plurality of virtual viewpoint; converting means of synthesizing an image viewed from each of said plurality of virtual viewpoints of said point-of-view parameter table in said predetermined three-dimensional space by referencing to the space data mapped by said mapping means, said synthesized image arranged in a manner as looked down from the plurality of virtual viewpoints located outside the vehicle; point-of-view parameter correcting means of correcting the contents of said point-of-view parameter table; and displaying means of displaying the image converted by said converting means, wherein each of the virtual viewpoints is different from a viewpoint of a stereoscopic image formed from input images, and wherein said synthesized image includes a shape of the vehicle and a surrounding space of the vehicle.

51. An image generating apparatus of claim 50 wherein said plurality of virtual viewpoints correspond to said cameras, respectively.

52. An image generating apparatus of claim 50 or 51 wherein a direction of operation is set to be reverse to an actual alteration of the point-of-view parameter at least for the operations in orientation, position, and rotation among the operations of changing said virtual-point-of-view parameter in said point-of-view parameter correcting means.

53. An image generating apparatus of any of claims 50 or 51 wherein, when said point-of-view parameter correcting means corrects said virtual-point-of-view parameter, a fixed tentative virtual viewpoint is provided, and a progress of the correction of the virtual viewpoint being under the correction is successively displayed as the synthesized image viewed from said tentative virtual viewpoint.

54. An image generating apparatus of any of claims 50 or 51 wherein said displaying means displays a mark indicating a boundary, in superposition on the synthesized image in the boundary part where respective images contact when displaying the image from each camera.

55. An image generating apparatus comprising:
at least one camera provided on a vehicle; space reconstructing means of mapping input images from said plurality of cameras, into a space model representing a predetermined three-dimensional space; converting means of synthesizing the input images of said cameras into a single virtual image, said synthesized image arranged in a manner as looked down from a virtual viewpoint located outside the vehicle, the virtual viewpoint being different from a viewpoint of each input image and different from a viewpoint of a stereoscopic image formed from input images; and displaying means of displaying the image converted by said converting means, wherein said synthesized image includes a shape of the vehicle and a surrounding space of the vehicle.

56. An image generating apparatus comprising:
at least one camera provided on a vehicle; space reconstructing means of mapping an input image from said camera, into a predetermined space model of a predetermined three-dimensional space; converting means of synthesizing an image by referencing to space data mapped by said space reconstructing means, said synthesized image arranged in a manner as looked down from a virtual viewpoint located outside the vehicle; and displaying means of displaying the image converted by said converting means, wherein the virtual viewpoint is different from a point on a line segment which connects respective viewpoints of input images from which a stereoscopic image is formed, wherein said synthesized image includes a shape of the vehicle and a surrounding space of the vehicle.

57. An image generating apparatus comprising:
at least one camera provided on a vehicle; space reconstructing means of mapping input images from said at least one camera, into a space model representing a predetermined three-dimensional space; converting means of synthesizing the input images of said cameras into a single virtual image, said synthesized image arranged in a manner as looked down from a virtual viewpoint located outside the vehicle, the virtual viewpoint being different from a viewpoint of each input image, and different from a point on a line segment which connects respective viewpoints of the input images from which a stereoscopic image is formed; and displaying means of displaying the image converted by said converting means, wherein said synthesized image includes a shape of the vehicle and a surrounding space of the vehicle.

58. An image generating method comprising:
generating a space data by mapping an input image from at least one camera provided on an outer surface side of a vehicle, located in a predetermined three-dimensional space, into a predetermined space model of said predetermined three-dimensional space; and
generating a synthesized image by referencing to the space data, said synthesized image arranged in a manner as looked down from a virtual viewpoint located outside the vehicle, said virtual viewpoint being different from a viewpoint of the camera, wherein said synthesized image includes a shape of the vehicle and a surrounding space of the vehicle.

59. An image generating apparatus comprising:
at least one camera provided on a vehicle; a camera parameter table for storing a camera parameter indicating camera characteristics; mapping means for mapping an input image from said camera, into a predetermined space model of a three-dimensional space using said camera parameter; converting means for synthesizing an image by referencing to space data mapped by said mapping means, said synthesized image arranged in a manner as looked down from a plurality of virtual viewpoints located outside the vehicle; and camera parameter correcting means for correcting the parameter of said camera, wherein each of the virtual viewpoints is different from a point on a line segment which connects respective viewpoints of input images from which a stereoscopic image is formed, wherein said synthesized image includes a shape of the vehicle and a surrounding space of the vehicle.

60. An image generating apparatus comprising:
at least one camera provided on a vehicle; image inputting means of inputting an image from said camera; a camera parameter table for storing a camera parameter indicating camera characteristics; mapping means for mapping, using said camera parameter, each pixel constituting the input image into a predetermined space model of a predetermined three-dimensional space generated by modeling of a situation of surroundings of the vehicle; a point-of-view parameter table for storing a virtual-point-of-view parameter including at least data of a position and an orientation for each of a plurality of viewpoints; converting means of synthesizing an image by referencing to the space data mapped by said mapping means, said synthesized image arranged in a manner as looked down from the plurality of virtual viewpoints located outside the vehicle; point-of-view parameter correcting means of correcting contents of said point-of-view parameter table; and displaying means of displaying the image converted by said converting means, wherein each of the virtual viewpoints is different from a point on a line segment which connects respective viewpoints of input images from which a stereoscopic image is formed, wherein said synthesized image includes a shape of the vehicle and a surrounding space of the vehicle.

61. An image generating apparatus comprising:

at least one camera provided on a vehicle;

space reconstructing means of mapping an input image from said camera, into a predetermined space model of a predetermined three-dimensional space, said space model having a fixed relative positional relationship with respect to said vehicle;

converting means of synthesizing an image by referencing to space data mapped by said space reconstructing means, said synthesized image arranged in a manner as looked down from a virtual viewpoint located outside the vehicle, said virtual viewpoint being different from a viewpoint of the camera; and display means of displaying the image converted by said converting means, wherein said synthesized image includes a shape of the vehicle and a surrounding space of the vehicle.

* * * * *

UNITED STATES PATENT AND TRADEMARK OFFICE
CERTIFICATE OF CORRECTION

| | | |
|---|---|---|
| PATENT NO. | : 7,307,655 B1 | Page 1 of 1 |
| APPLICATION NO. | : 09/744787 | |
| DATED | : December 11, 2007 | |
| INVENTOR(S) | : Okamoto et al. | |

It is certified that error appears in the above-identified patent and that said Letters Patent is hereby corrected as shown below:

On Page 2, item [56], References Cited, OTHER PUBLICATIONS: insert
--5,949,331   9/1999   Schofield et al.
JP 3-099952   4/1991
JP 7-186833   7/1995
JP 64-14700   1/1989
JP 5-310078   11/1993
JP 10-164566   6/1998
JP 6-234341   8/1994
JP 10-262240   9/1998
Japanese Search Report for PCT/JP99/05509 dated February 15, 2000--

At Column 57, line 67, "requiring the calibration" should read --requiring calibration--

At Column 60, line 11, "from a stereoscopic image" should read --from a viewpoint of a stereoscopic image--

At Column 61, line 1, "least the data" should read --least data--

At Column 61, line 2, "virtual viewpoint;" should read --virtual viewpoints;--

Signed and Sealed this

Twenty-sixth Day of August, 2008

JON W. DUDAS
*Director of the United States Patent and Trademark Office*